(12) United States Patent
Kim et al.

(10) Patent No.: US 8,032,010 B2
(45) Date of Patent: Oct. 4, 2011

(54) IMAGE RECORDING/REPRODUCING APPARATUS AND CONTROL METHOD THEREOF

(75) Inventors: Jong-phil Kim, Suwon-si (KR); Hye-jin Choi, Suwon-si (KR); Chul-min Kim, Hwaseong-si (KR); Yun-ju Kang, Suwon-si (KR); Beom-eun Kim, Seoul (KR); Ju-yup Lee, Seongnam-si (KR); Eung-sun Kim, Suwon-si (KR); Chang-rok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1492 days.

(21) Appl. No.: 10/748,871

(22) Filed: Dec. 31, 2003

(65) Prior Publication Data

US 2004/0189827 A1    Sep. 30, 2004

(30) Foreign Application Priority Data

| Date | | Number |
|---|---|---|
| Jan. 2, 2003 | (KR) | 10-2003-0000113 |
| Jan. 2, 2003 | (KR) | 10-2003-0000115 |
| Jan. 6, 2003 | (KR) | 10-2003-0000653 |
| Jan. 18, 2003 | (KR) | 10-2003-0003515 |
| Feb. 5, 2003 | (KR) | 10-2003-0007276 |
| Feb. 10, 2003 | (KR) | 10-2003-0008340 |
| Feb. 10, 2003 | (KR) | 10-2003-0008341 |
| Feb. 11, 2003 | (KR) | 10-2003-0008554 |
| Feb. 12, 2003 | (KR) | 10-2003-0008918 |
| Feb. 13, 2003 | (KR) | 10-2003-0009175 |
| Feb. 18, 2003 | (KR) | 10-2003-0010153 |
| Feb. 27, 2003 | (KR) | 10-2003-0012223 |
| Mar. 5, 2003 | (KR) | 10-2003-0013813 |
| Mar. 5, 2003 | (KR) | 10-2003-0013814 |
| Mar. 5, 2003 | (KR) | 10-2003-0013815 |
| Mar. 6, 2003 | (KR) | 10-2003-0014103 |
| Mar. 7, 2003 | (KR) | 10-2003-0014273 |
| Mar. 12, 2003 | (KR) | 10-2003-0015534 |
| Mar. 12, 2003 | (KR) | 10-2003-0015535 |
| Mar. 12, 2003 | (KR) | 10-2003-0015536 |
| Mar. 14, 2003 | (KR) | 10-2003-0016021 |

(51) Int. Cl.
*H04N 5/78* (2006.01)
*H04N 5/92* (2006.01)
(52) U.S. Cl. ...................... 386/314; 386/326
(58) Field of Classification Search .............. 386/104, 386/105, 106, 125, 46, 120
See application file for complete search history.

(56) References Cited

U.S. PATENT DOCUMENTS 5,371,849 A    12/1994 Peaslee et al.
(Continued)

FOREIGN PATENT DOCUMENTS

CN    1304533 A    7/2001
(Continued)

*Primary Examiner* — Peter-Anthony Pappas
*Assistant Examiner* — Asher Khan
(74) *Attorney, Agent, or Firm* — Roylance, Abrams, Berdo and Goodman, LLP

(57) ABSTRACT

An image recording/reproducing apparatus and a control method thereof to provide the functions of recording image files in a recording medium and reproducing and editing the image files recorded in the recording medium. The apparatus and method enables a user to easily select and manipulate functions of the apparatus using a menu display, and can record, reproduce and edit the image files according to the function selected by the user. The apparatus and method, therefore allows the user to easily select and manipulate the functions using a displayed menu, and more efficiently manage and easily search for the recorded image files.

57 Claims, 83 Drawing Sheets

U.S. PATENT DOCUMENTS

| | | | |
|---|---|---|---|
| 5,847,771 A | 12/1998 | Cloutier et al. | |
| 5,907,659 A | 5/1999 | Yamauchi et al. | |
| 5,969,719 A * | 10/1999 | Tsujimoto | 715/727 |
| 6,404,418 B1 | 6/2002 | Leem | |
| 6,574,419 B1 | 6/2003 | Nonomura et al. | |
| 6,833,848 B1 * | 12/2004 | Wolff et al. | 715/719 |
| 6,856,332 B2 | 2/2005 | Kim | |
| 6,976,229 B1 | 12/2005 | Balabanovic et al. | |
| 7,315,389 B2 * | 1/2008 | Kuwata et al. | 358/1.15 |
| 2001/0055465 A1 * | 12/2001 | Inoue | 386/46 |
| 2001/0056434 A1 * | 12/2001 | Kaplan et al. | 707/104.1 |
| 2002/0012522 A1 * | 1/2002 | Kawakami et al. | 386/52 |
| 2002/0018069 A1 | 2/2002 | Kim | |
| 2002/0033889 A1 * | 3/2002 | Miyazaki | 348/232 |
| 2002/0056081 A1 | 5/2002 | Morley et al. | |
| 2002/0136539 A1 * | 9/2002 | Nakaya | 386/125 |
| 2002/0141580 A1 * | 10/2002 | Okuyama | 380/201 |
| 2003/0031181 A1 * | 2/2003 | Rowley et al. | 370/394 |
| 2003/0048848 A1 * | 3/2003 | Li et al. | 375/240.25 |
| 2003/0123853 A1 * | 7/2003 | Iwahara et al. | 386/69 |
| 2004/0001704 A1 * | 1/2004 | Chan et al. | 386/96 |
| 2005/0120655 A1 | 6/2005 | Wolff et al. | |
| 2005/0283741 A1 | 12/2005 | Balabanovic et al. | |
| 2008/0181577 A1 | 7/2008 | Yamauchi et al. | |

FOREIGN PATENT DOCUMENTS

| | | |
|---|---|---|
| EP | 1 041 566 A1 | 10/2000 |
| EP | 0 949 825 B1 | 11/2000 |
| JP | 07-036654 | 2/1995 |
| JP | 08-044526 | 2/1996 |
| JP | 09-322111 | 12/1997 |
| JP | 2000-020206 | 1/2000 |
| JP | 2000-152166 | 5/2000 |
| JP | 2000-251406 | 9/2000 |
| JP | 2001-197426 | 7/2001 |
| JP | 2001-218160 A | 8/2001 |
| JP | 2002-152666 | 5/2002 |
| JP | 2002-152721 | 5/2002 |
| JP | 2002-369132 A | 12/2002 |
| JP | 2003-59244 A | 2/2003 |
| KR | 10-1997-0003166 B1 | 3/1997 |
| KR | 1999-026435 | 4/1999 |
| KR | 1999-028864 | 4/1999 |
| KR | 10-1999-0037678 | 5/1999 |
| KR | 1999-0045974 | 6/1999 |
| KR | 1999-0085034 | 12/1999 |
| KR | 10-2000-0077406 A | 12/2000 |
| KR | 10-2001-0059873 A | 7/2001 |
| KR | 10-2001-0065128 A1 | 7/2001 |
| KR | 2001-0054613 | 7/2001 |
| KR | 2002-0013164 A | 2/2002 |
| KR | 2002-0019429 | 3/2002 |
| KR | 10-2002-0071691 A | 9/2002 |
| KR | 10-2002-0094050 A | 12/2002 |
| KR | 2003-0008731 | 1/2003 |
| WO | WO 00/55857 A1 | 9/2000 |
| WO | WO 02-079902 A2 | 10/2002 |

* cited by examiner

FIG. 7

| MENU | | | 513 |
|---|---|---|---|
| ⊕ Digital Recorder | ⊕ Program List | ⊕ Combine | ~513a |
| ⊕ DVD Player | ⊕ Parental Lock | ⊕ Divide | ~513b |
| ⊕ Juke Box | ⊕ Edit | ⊕ Delete | ~513c |
| ⊕ Photo Album | ⊕ Recording | ⊕ Partial Delete | ~513d |
| ⊕ Set-Up | | | |
| | | | ~433 |
| Instructions | ◁△▷ Move  ↻ Return  ⏎ Enter  [Menu] Exit | | |

FIG. 8

| MENU | | | |
|---|---|---|---|
| ✚ Digital Recorder | ✚ HDD Playlist | ~531 | |
| ✚ DVD Player | ✚ HDD Edit | ~532 | |
| ✚ Juke Box | ✚ CD Playlist | ~533 | |
| ✚ Photo Album | ✚ CD Copy to HDD | ~534 | |
| ✚ Set-Up | | | |
| Instructions | ◁△▽▷ Move　◯ Return　⏎ Enter　[Menu] Exit | | |

FIG. 9

| MENU | | | |
|---|---|---|---|
| ✥ Digital Recorder | ✥ HDD Playlist | ~541 | |
| ✥ DVD Player | ✥ HDD Edit | ~542 | |
| ✥ Juke Box | ✥ CD Playlist | ~543 | |
| ✥ Photo Album | ✥ CD Copy to HDD | ~544 | |
| ✥ Set-Up | | | |
| | | | |
| Instructions | ◁△▷ Move  ↻ Return  ⏎ Enter  [Menu] Exit | | |

FIG. 10

| | | 601 | 602 | 603 | 604 |
|---|---|---|---|---|---|
| 410 | Program List | | | | Total |
| 430 | | | Title | Date | Length |
| | 1 | | Art | 24.12.01 11:12 | 30min |
| | 2 | | Bear | 15.01.02 10:17 | 55sec |
| | 3 | | Scene | 17.03.02 14:15 | 43min |
| | 4 | | Adventure | 12.07.02 09:20 | 12min |
| 450 | Instructions | | Move  Return  Enter  Menu Exit | | |

| | | Title | Date | Length |
|---|---|---|---|---|
| Program List | | | | Total |
| 1 | | Tiger | 24.12.01 11:12 | 30min |
| 2 | | Bear | 15.01.02 10:17 | 55sec |
| 3 | | Scene | 17.03.02 14:15 | 43min |
| 4 | | Adventure | 12.07.02 09:20 | 12min |
| Instructions | | ◊ Move  ◯ Return  ⊡ Enter  [Menu] Exit | | |

FIG. 32

| Juke Box | Root | Total : 125 |
|---|---|---|
| Mark  Name | | |
| 📁  Classic | | |
| 📁  Beatles | | |
| MP3  Say Goodnight | | |
| MP3  If | | |
| MP3  I miss you so much | | |
| 🧭  Memory | | |
| Instructions | ◁△▽▷ Move  ↻ Return  ⏎ Enter  [Menu] Exit | |

FIG. 33

| Juke Box | Beatles | Total : 3 |
|---|---|---|
| Mark    Name<br>MP3     I want to hold your hand<br>MP3     Hey Jude<br>MP3     Something | | |
| Instructions | ⬍ Move  ↻ Return  ⏎ Enter  [Menu] Exit | |

FIG. 34

| Photo Album | Root | Total : 54 |
|---|---|---|
| Mark  Name | | |
| 📁  Flower | | |
| 📁  River | | |
| 📷  The Bridge | | |
| 📷  People 1 | | |
| 📷  People 2 | | |
| Instructions | ✧ Move  ↻ Return  ⏎ Enter  [Menu] Exit | |

FIG. 37

| Juke Box | Beatles | Total : 166 |
|---|---|---|

| No | Mark | Name |
|---|---|---|
| 1 | MP3 | I want to hold your hand |
| 2 | MP3 | Hey Jude |
| 3 | MP3 | Something |
| 4 | MP3 | Across The Universe |
| 5 | MP3 | A Day In The Life |
| 6 | MP3 | All My Loving |
| 7 | MP3 | And I Love Her |
| 8 | MP3 | Black Bird |
| 9 | MP3 | Can't Buy Me Love |

Instructions  Move  Return  Enter  [Menu] Exit
◁ First ▷ Last   FF Page Up  REW Page Down

FIG. 38

| Juke Box | Beatles | Total : 166 |
|---|---|---|
| No Mark Name | | |
| 1 MP3 I want to hold your hand | | |
| 2 MP3 Hey Jude | | |
| 3 MP3 Something | | |
| 4 MP3 Across The Universe | | |
| 5 MP3 A Day In The Life | | |
| 6 MP3 All My Loving | | |
| 7 MP3 And I Love Her | | |
| 8 MP3 Black Bird | | |
| 9 MP3 Can't Buy Me Love | | |
| Instructions | ⇅ Move ↻ Return ⏎ Enter [Menu] Exit | |
| | ◁ First ▷ Last   FF Page Up  REW Page Down | |

FIG. 39

| Juke Box | Beatles | Total : 166 |
|---|---|---|
| No Mark Name | | |
| 10 MP3 Come Together | | |
| 11 MP3 Don't Let me down | | |
| 12 MP3 Eleanor Rigby | | |
| 13 MP3 For No One | | |
| 14 MP3 Get Back | | |
| 15 MP3 Girl | | |
| 16 MP3 Good Day Sunshine | | |
| 17 MP3 Good Night | | |
| 18 MP3 Hello, goodbye | | |
| Instructions | ◊ Move  ◯ Return  ⏎ Enter  [Menu] Exit | |
| | ◁ First  ▷ Last   FF Page Up  REW Page Down | |

FIG. 40

| Juke Box | Beatles | Total : 166 |
|---|---|---|
| No Mark Name | | |
| 163 MP3 Come Together | | |
| 164 MP3 Don't Let me down | | |
| 165 MP3 Eleanor Rigby | | |
| 166 MP3 For No One | | |
| Instructions | ▲▼ Move ↻ Return ⏎ Enter [Menu] Exit ◁ First ▷ Last   FF Page Up  REW Page Down | |

FIG. 43

| Juke Box | Root | Total : 125 |
|---|---|---|
| Mark | Name | |
| 📁 | Classic | |
| 📁 | Beatles | |
| V MP3 | Say Goodnight | |
| V MP3 | If | |
| MP3 | I miss you so much | |
| MP3 | Memory | |
| V MP3 | The Whistler's Song | |
| MP3 | Shape of My Heart | |
| MP3 | Holiday | |
| Instructions | ◁△▷▽ Move ↻ Return ⏎ Enter [Menu] Exit | |

FIG. 49

| File List | | | | Total : 453 |
|---|---|---|---|---|
| Mark | Name | | | |
| 📁 | Classic | | | |
| ⊘ | Say Goodnight | | | |
| ⊘ | If | | | |
| ⊘ | I miss you so much | | | |
| ⊘ | Memory | | | |
| MP3 | More than words | | | |
| 📷 | The Bridge | | | |
| Instructions | ◁△▽▷ Move | ◯ Return | ● Edit | [Menu] Exit |

FIG. 50

| Auto Play | 📁 Root | Total : 4 |

Mark  Name
 ⊘   I want to hold your hand
 ⊘   Hey Jude
 ⊘   Something
 ⊘   Let It Be Instructions   ⬄ Move   ↻ Return   ● Edit   [Menu] Exit

FIG. 51

| File List | |
|---|---|
| Mark    Name | |
| Instructions | ◁△▷ Move  ↻ Return   ⊛ Edit   [Menu] Exit |

FIG. 59

| HDD | MP3 | CD | MP3 | |
|---|---|---|---|---|
| Mark | Name | Mark | Name | |
| MP3 | Faithfully | √ MP3 | Changes | |
| MP3 | Love Hurts | MP3 | Video kills the | |
| | | √ MP3 | Take it Easy | |
| | | √ MP3 | Anywhere is | |
| | | ⋮ | | 2590 |
| | | Select all | Clear all | Copy to HDD |
| Instructions | ◁△▽▷ Move  ↻ Return  ⏎ Enter  [Menu] Exit | | | |
| | ◁◁ ▷▷ Prev/Next Page | | | |

FIG. 63

| Photo Album | Root | Total : 54 |
|---|---|---|
| Mark      Name | | |
| 📁    Flower | | |
| 📁    River | | |
| ✓ 📷   June | | |
| ✓ 📷   School | | |
| ✓ 📷   People | | |
| ✓ 📷   Sunflower | | |
| ✓ 📷   Cosmos | | |
| ✓ 📷   Dandelion | | |
| Instructions | ✧ Move  ↺ Return  ⏎ Enter  [Menu] Exit<br>▶ Play List | |

FIG. 71

| MENU | | |
|---|---|---|
| ⊕ DIGITAL RECORDER | ⊕ LANGUAGE | 1Hr |
| ⊕ DVD PLAYER | ⊕ CHANNEL | 2Hr |
| ⊕ JUKE BOX | ⊕ CLOCK SETTING | 3Hr |
| ⊕ PHOTO ALBUM | ⊕ BUFFER TIME | 4Hr |
| ⊕ SET-UP | ⊕ AUDIO OPTION | AUTO |
| | ⊕ DISPLAY OPTION | OFF |
| | ⊕ TV TYPE | |
| INSTRUCTIONS | ◁▷ MOVE  ↺ RETURN  ⏎ ENTER  [Menu] EXIT | |

550

| Program List | 421-6 | 421-7 | 421-8 |
|---|---|---|---|
| Icon | Title | Date | Length |
|  | Art | 2003. 1. 2 | 00:20 |
|  | K2 | 2003. 1.20 | 01:30 |
|  | Pretty women | 2003. 2. 3 | 02:00 |
|  | Beach | 2003. 3. 2 | 01:45 |
| Instructions | ◁△▷▽ Move  ↻ Return  ↵ Enter  [Menu] Exit ◁◁ ▷▷ Prev / Next page | | |

421-1, 421-2, 421-3, 421-4, 421-5

(A)

(B)

IMAGE RECORDING/REPRODUCING APPARATUS AND CONTROL METHOD THEREOF

CROSS-REFERENCE TO RELATED APPLICATIONS

This application claims priority under 35 U.S.C. §119 to Korean Patent Application No. 2003-14273, filed in the Korean Intellectual Property Office on Mar. 7, 2003; Korean Patent Application No. 2003-08554, filed in the Korean Intellectual Property Office on Feb. 11, 2003; Korean Patent Application No. 2003-15536, filed in the Korean Intellectual Property Office on Mar. 12, 2003; Korean Patent Application No. 2003-13814, filed in the Korean Intellectual Property Office on Mar. 5, 2003; Korean Patent Application No. 2003-13815, filed in the Korean Intellectual Property Office on Mar. 5, 2003; Korean Patent Application No. 2003-12223, filed in the Korean Intellectual Property Office on Feb. 27, 2003; Korean Patent Application No. 2003-03515, filed in the Korean Intellectual Property Office on Jan. 18, 2003; Korean Patent Application No. 2003-00113, filed in the Korean Intellectual Property Office on Jan. 2, 2003; Korean Patent Application No. 2003-10153, filed in the Korean Intellectual Property Office on Feb. 18, 2003; Korean Patent Application 2003-08918, filed in the Korean Intellectual Property Office on Feb. 12, 2003; Korean Patent Application No. 2003-08341, filed in the Korean Intellectual Property Office on Feb. 10, 2003; Korean Patent Application No. 2003-00653, filed in the Korean Intellectual Property Office on Jan. 6, 2003; Korean Patent Application No. 2003-07276, filed in the Korean Intellectual Property Office on Feb. 5, 2003; Korean Patent Application No. 2003-15535, filed in the Korean Intellectual Property Office on Mar. 12, 2003; Korean Patent Application No. 2003-14103, filed in the Korean Intellectual Property Office on Mar. 6, 2003; Korean Patent Application No. 2003-13813, filed in the Korean Intellectual Property Office on Mar. 5, 2003; Korean Patent Application 2003-15534, filed in the Korean Intellectual Property Office on Mar. 12, 2003; Korean Patent Application 2003-16021, filed in the Korean Intellectual Property Office on Mar. 14, 2003; Korean Patent Application No. 2003-08340, filed in the Korean Intellectual Property Office on Feb. 10, 2003; Korean Patent Application 2003-09175, filed in the Korean Intellectual Property Office on Feb. 13, 2003; and Korean Patent Application No. 2003-00115, filed in the Korean Intellectual Property Office on Jan. 2, 2003, in the Korean Intellectual Property Office, the entire content of each is incorporated herein by reference.

BACKGROUND

1. Field of the Invention

The present invention relates to an image recording/reproducing apparatus and a control method thereof which provide functions of recording image files in a recording medium, and reproducing and editing the image files recorded in the recording medium, and more particularly, to an image recording/reproducing apparatus and a control method thereof which enables a user to easily select and manipulate functions of the apparatus using a menu display, and which can record, reproduce and edit the image files according to the function selected by the user.

2. Description of the Related Art

An image recording/reproducing apparatus records image files in a recording medium and also reproduces the recorded image files. A few examples of such an image recording/reproducing apparatus are video cassette recorders (VCR) and digital video disc players (DVDP).

Recently, with the development of the technologies in image signal processing and compression, the use of mass entertainment media has been shifted from audio media to video media with the increasing use of the image files. The number of image files which are recorded in image recording/reproducing apparatus therefore, have increased, and the scheme of managing the recorded image files more efficiently and searching for the image files more easily has now become a matter of primary concern.

Also, as the electronic appliance becomes multifunctional, the image recording/reproducing apparatus has become more complicated and multifunctional. Accordingly, a need exists for a system and method to select and use diverse functions provided in the image recording/reproducing apparatus more easily.

SUMMARY

An aspect of the present invention is to solve at least the above-identified problems and/or disadvantages and to provide at least the advantages described hereinafter. Accordingly, it is an object of the present invention to provide an image recording/reproducing apparatus which provides functions of recording image files in recording medium, and reproducing and editing the recorded image files, in which the user can easily select and manipulate the functions using the menu display. In doing so, the user can manage the recorded image files more effectively and search for the image files more easily.

Specifically, it is a first aspect of the present invention to provide an image recording/reproducing apparatus and method thereof which can perform the random access capable of displaying or reproducing the file selected by the user among a plurality of image files recorded in the recording medium by quickly reading the selected file, thereby enabling the file to be searched for more quickly.

It is a second aspect of the present invention to provide an image recording/reproducing apparatus and method thereof which can correct the name of the image file recorded in the recording medium to allow the user to easily search for a desired file.

It is a third aspect of the present invention to provide an image recording/reproducing apparatus and method thereof which can reproduce and display the moving picture files recorded in the recording medium on a file list menu as moving pictures to allow the user to easily search for the image file recorded in the recording medium.

It is a fourth aspect of the present invention to provide an image recording/reproducing apparatus and method thereof which can display the list of image files recorded in a recording medium along with the icons according to the kind of image file, thereby easily illustrating to the user the kind of the image file.

It is a fifth aspect of the present invention to provide an image recording/reproducing apparatus and method thereof which can continuously reproduce the image files recorded in the recording medium in the order of their storage in the recording medium.

It is a sixth aspect of the present invention to provide an image recording/reproducing apparatus and method thereof which can easily edit the image file.

It is a seventh aspect of the present invention to provide an image recording/reproducing apparatus and method thereof which can partially delete the moving picture.

It is a eighth aspect of the present invention to provide an image recording/reproducing apparatus and method thereof which enables the user to recognize the folder in which the presently displayed file is located more easily by providing a play list menu designed to enable the user to easily recognize the name of the folder in which the image file is recorded.

It is a ninth aspect of the present invention to provide an image recording/reproducing apparatus and method thereof which can display the 'Play List' of the image file recorded in the recording medium on the screen, and easily and quickly select the file using the displayed 'Play List'.

It is a tenth aspect of the present invention to provide an image recording/reproducing apparatus and method thereof which can display the diverse still picture files while the music file is reproduced, thereby embodying the music replay and the slide show at the same time.

It is an eleventh aspect of the present invention to provide an image recording/reproducing apparatus and method thereof which can automatically reproduce the files when the recording medium containing the files is inserted, irrespective of the kinds of files. In doing so, the apparatus is not required to perform a separate manipulation to easily reproduce the file recorded in the recording medium.

It is a twelfth aspect of the present invention to provide an image recording/reproducing apparatus and method thereof which can display the additional information on the music CD on the screen when reproducing the music CD, thereby allowing the user to acquire the information on the music CD and easily select the desired song.

It is a thirteenth aspect of the present invention to provide an image recording/reproducing apparatus and method thereof which can skip and copy the files having the same file name when the files recorded in the optical recording medium are copied into the mass storage magnetic recording medium.

It is a fourteenth aspect of the present invention to provide an image recording/reproducing apparatus and method thereof which can compress and store the audio data having a CD-DA standard, thereby effectively using the recording medium.

It is a fifteenth aspect of the present invention to provide an image recording/reproducing apparatus and method thereof which can adaptively adjust a size of the still picture based on a size of the predetermined display area and display the still picture in the predetermined display area. In doing so, the apparatus displays the still picture having the aspect ratio and/or display size suitable to the display area to embody the thumbnail providing a more natural visual effect.

It is a sixteenth aspect of the present invention to provide an image recording/reproducing apparatus and method thereof which can provide the menu for enabling the user to easily select and manipulate functions supported by the image recording/reproducing apparatus.

It is a seventeenth aspect of the present invention to provide an image recording/reproducing apparatus and control method thereof which is capable of reproducing the recorded program from the beginning as needed, while also continuously recording the externally-received program during the time-delay viewing function. In the time-delay viewing function, an externally-received program is both recorded and reproduced at the same time.

It is a eighteenth aspect of the present invention to provide an image recording/reproducing apparatus and control method thereof which is capable of automatically picking up the title name of the DVD program and recording the picked-up title onto the user data area when copying the DVD program onto the HDD.

It is a nineteenth aspect of the present invention to provide an image recording/reproducing apparatus and control method thereof which is capable of storing the files in the appropriate place of the divided HDD with pointers according to the attributes of the respective files, and discriminatingly displaying the size of the files as stored and the remaining capacity of the memory area according to the attributes of the files.

It is a twentieth aspect of the present invention to provide an image recording/reproducing apparatus and control method thereof which is capable of using the flash memory efficiently by storing icon data in the HDD, storing relevant link information in the flash memory, and also providing animation effects where icons are moved by using the icon data stored in the HDD.

It is a twenty-first aspect of the present invention to provide an image recording/reproducing apparatus and control method thereof which is capable of selecting files of certain folders for display in the file list, and also selecting files of other folders and different types of recording medium for additional display in the file list.

In order to achieve the above aspects and/or other features of the present invention, an image recording/reproducing apparatus which records and reproduces a plurality of still image files and sound files with respect to a recording medium and provides a display apparatus with a screen of play list indicating sound files being currently reproduced is provided. The recording/reproducing apparatus comprises a display menu for supporting the display such that the plurality of still image files recorded in the recording apparatus are alternately displayed in a first predetermined area of the screen of play list; a decoder for decoding the still image files and the sound files recorded in the recording apparatus; a memory for storing the still image files and the sound files as decoded; and a main control unit for processing such that, when the display menu is selected during the reproducing of the sound files stored in the memory, the plurality of still image files recorded in the recording medium are decoded and stored in the memory while the decoder is idle, and one or more files among the stored still image files are alternately displayed on a second predetermined area of the screen of play list.

When the display menu is selected, the main control unit performs a process to decode the plurality of still image files which are recorded in the same folder as the sound files of the sound file list.

According to an embodiment of the present invention, a control method for an image recording/reproducing apparatus is also provided. The image recording/reproducing apparatus records and reproduces a plurality of still image files and sound files with respect to a recording medium and provides a display apparatus with the files. The provided control method comprises the steps of applying a reproducing command to the recording medium with respect to the sound files; displaying a screen of play list indicating a list of sound files, and decoding and storing the sound files; selecting a display menu provided at a first predetermined area of the screen of play list such that the plurality of still image files recorded in the recording apparatus are alternately displayed while the stored sound files are reproduced; decoding and storing the still image files recorded in the recording apparatus while the stored sound files are reproduced; and alternately displaying the still image files on a second predetermined area of the screen of play list while the sound files are reproduced.

Further provided is the step of displaying a screen of period setting menu when the display menu of the screen of play list is selected. A screen of period setting menu is for setting a display period of the plurality of still image files. The plurality of still image files are displayed on the second predetermined area according to the set period.

BRIEF DESCRIPTION OF THE DRAWINGS

The above objects and other advantages of the present invention will become more apparent by describing in detail preferred embodiments thereof with reference to the attached drawings in which:

FIG. 7 is a view illustrating an example submenu of a menu item 'Edit' according to an embodiment of the present invention;

FIG. 8 is a view illustrating an example submenu of a menu item 'Juke Box' according to an embodiment of the present invention;

FIG. 9 is a view illustrating an example submenu of a menu item 'Photo Album' according to an embodiment of the present invention;

FIG. 10 is a view illustrating an example menu displayed on a TV screen when a menu item 'Program List' as illustrated in FIG. 6 is selected;

FIG. 16 is a view illustrating an example menu displayed when a corrected file name is input onto an input window of a virtual input menu of FIG. 15;

FIG. 17 is a view illustrating an example menu displayed as a result of correcting the file name in accordance with an embodiment of the present invention;

FIG. 32 is a view illustrating another example of a menu displayed on a TV screen when a menu item 'HDD Play List' as illustrated in FIG. 8 is selected;

FIG. 33 is a view illustrating an example menu successively displayed on a TV screen when a folder 'Beatles' of FIG. 32 is selected;

FIG. 34 is a view illustrating an example menu displayed on a TV screen when a menu item 'HDD Play List' as illustrated in FIG. 9 is selected;

FIG. 37 is a view illustrating an example menu successively displayed when a folder 'Beatles' of FIG. 32 is selected;

FIG. 38 is a view illustrating an example menu that indicates a file list of FIG. 37 where a cursor is moved by manipulating a remote controller;

FIG. 39 is a view illustrating an example menu that indicates the next page of the file list of FIG. 37 by manipulating a remote controller;

FIG. 40 is a view illustrating an example menu that indicates the last page of the file list according to an embodiment of the present invention;

FIG. 43 is a view illustrating still another example of a menu displayed on a TV screen when a menu item 'HDD Play List' as illustrated in FIG. 8 is selected;

FIG. 49 is a view illustrating an example menu 'File List' displayed on a screen of a television receiver (TV) when a disc is inserted into a disc player according to an embodiment of the present invention;

FIG. 50 is a view illustrating an example menu 'Auto Play List' displayed on a TV screen when a disc is inserted into a disc player according to an embodiment of the present invention;

FIG. 51 is a view illustrating another example of a menu 'File List' displayed on a TV screen when a disc is inserted into a disc player according to an embodiment of the present invention;

FIG. 59 is a view illustrating an example menu that indicates a sound file list successively displayed when a lower folder of HDD as illustrated in FIG. 58 and a lower folder of CD are selected;

FIG. 63 is a view illustrating another example of a menu displayed on a TV screen when a menu item 'HDD Play List' as illustrated in FIG. 9 is selected;

FIG. 71 is a view illustrating an example screen of sub-menus of the 'Set-up' menu according to an embodiment of the present invention;

DETAILED DESCRIPTION OF THE PREFERRED EMBODIMENTS

Figure 1:
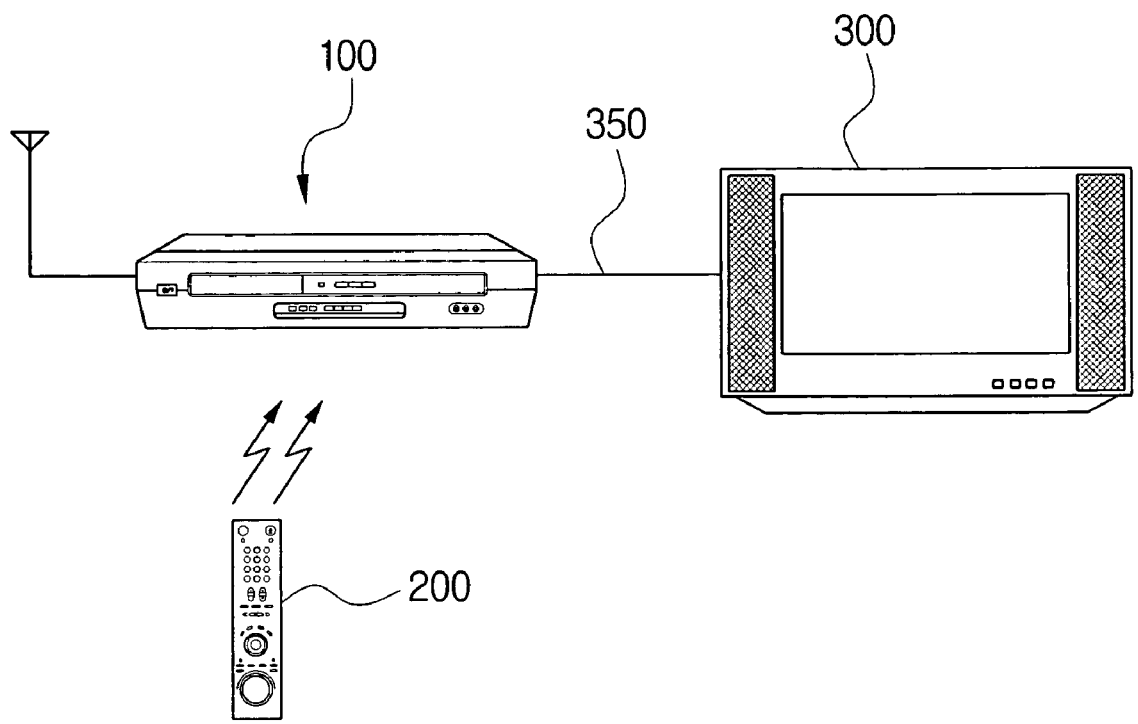
FIG. 1 is a view illustrating an example of a display system adopting an image recording/reproducing apparatus according to an embodiment of the present invention.

Now, an image recording/reproducing apparatus and a control method thereof according to the present invention will be described in detail with reference to the annexed drawings in which, like reference numerals refer to like elements.

FIG. 1 is a view illustrating an example display system adopting an image recording/reproducing apparatus according to an embodiment of the present invention. Referring to FIG. 1, the image recording/reproducing apparatus 100 is connected to a television receiver (TV) 300 that is a display device through a transmission cable 350.

The image recording/reproducing apparatus 100 processes a signal received from a remote controller 200 that is an external input device, and transmits display information to the TV 300. In this example, the external input device may be an input device, such as a wired keyboard as well as the remote controller 200, that outputs wireless signals such as infrared rays.

The image recording/reproducing apparatus 100 is constructed so that it can receive at least one video signal provided from a number of video sources. The video source may include media that can transmit signals such as ground-wave television broadcasts, satellite broadcasts, cables, computer lines and modem lines.

That is, the image recording/reproducing apparatus 100 is constructed so as to receive at least one of the video source signals via a mechanism such as a satellite dish type antenna, a local cable, a digital broadcast source (DBS), a general antenna, an internet, other computer sources, a camcorder, a disc player, a set top box, etc.

Also, the image recording/reproducing apparatus 100 is provided with a mass storage device for recording the received video signals. The mass storage device may be a HDD.

Figure 2:
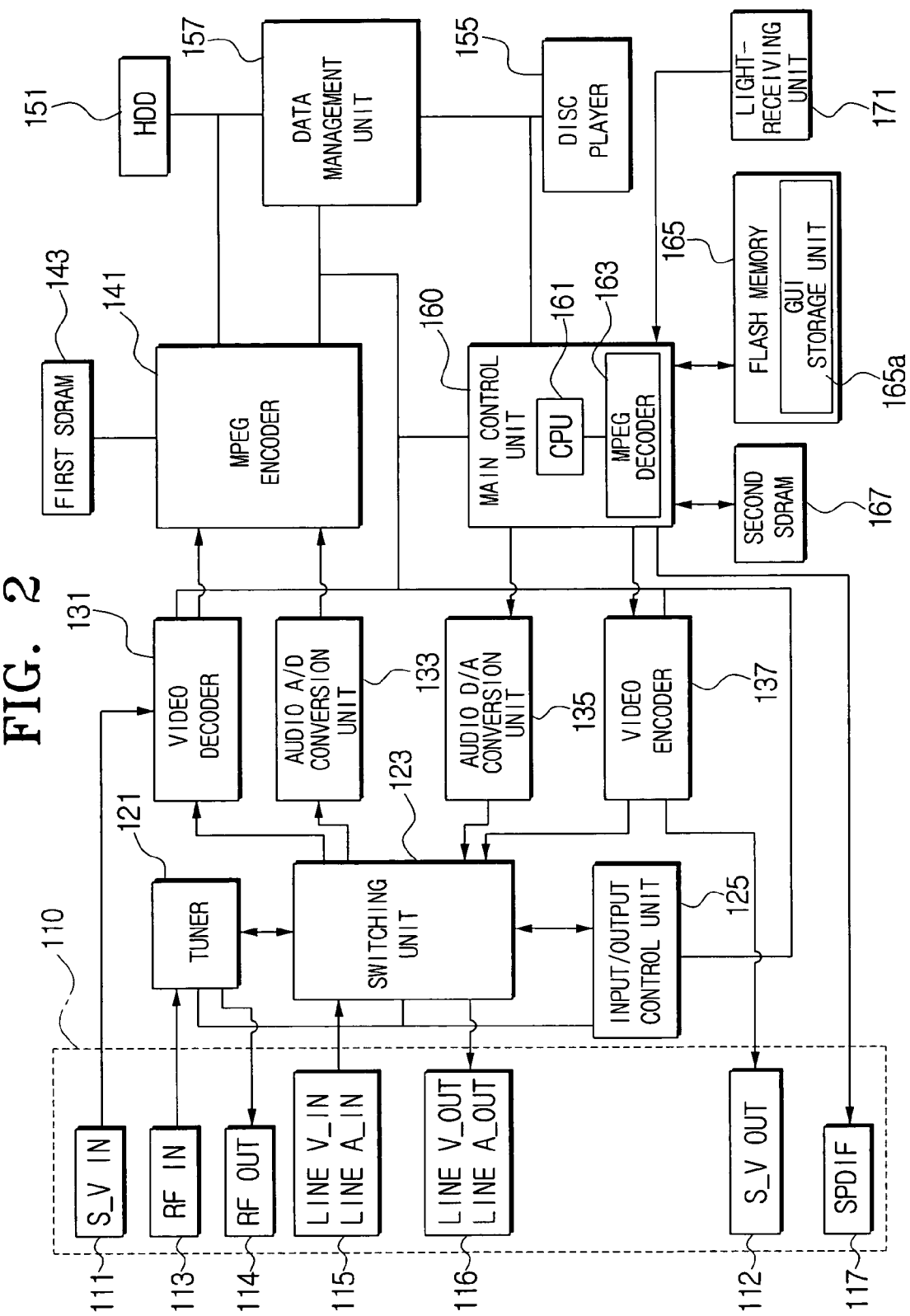
FIG. 2 is a block diagram of the image recording/reproducing apparatus of FIG. 1.

FIG. 2 is a block diagram of an image recording/reproducing apparatus according an embodiment of the present invention. Referring to FIG. 2, the image recording/reproducing apparatus 100 includes an input/output terminal unit 110, a tuner 121, a switching unit 123, an input/output control unit 125, a video decoder 131, an audio analog-to-digital (A/D) converter 133, an audio digital-to-analog (D/A) converter 135, a video encoder 137, an MPEG encoder 141, a HDD 151, a disc player 155, a data management unit 157, a main control unit 160, a flash memory 165, a light-receiving unit 171, and a first and second SDRAM 143 and 167.

The input/output terminal unit 110 receives video signals generated from diverse video signal sources, and outputs the received video signal or video signal reproduced from the HDD 151.

The input/output terminal unit 110 includes a super-video input terminal (S-V IN) 111 and output terminal (S-V OUT) 112, an RF input terminal (RF IN) 113 and output terminal (RF OUT) 114, a line video/audio input terminal (LINE V_IN, LINE A_IN) 115, and output terminal (LINE V_OUT, LINE A_OUT) 116, and a digital audio signal output terminal (i.e., serial parallel digital interface (SPDIF)) 117.

The super-video input terminal 111 is a terminal for receiving a digital luminance signal (Y) and digital chrominance signal (Cr, Cb) that are separated from each other, and is connected to a digital camcorder, DVD player, set top box, etc.

The super-video output terminal 112 is a terminal for transmitting the separated digital luminance signal (Y) and digital chrominance signal (Cr, Cb) to the TV 300.

The RF input terminal 113 is a terminal for receiving ground-wave broadcasting signals, and is typically connected to an antenna.

The RF output terminal 114 is a terminal for transmitting a broadcasting signal selected by a tuner 121, described in greater detail below, to an outside source, and is connected to the TV 300.

The line video/audio input terminal 115 is a terminal for receiving an analog signal in which the luminance signal (Y) and the chrominance signal are mixed, and is connected to a camcorder, DVD player, set top box, etc., that supports the output of an analog video signal.

The line video/audio output terminal 116 is a terminal for transmitting the analog signal in which the luminance signal (Y) and the chrominance signal are mixed, and is connected to the TV 300 that supports the display of the analog video signal.

The digital audio output terminal 117 is a terminal for outputting a digital audio signal transmitted from the main control unit 160 to an outside source.

The tuner 121 adjusts a received channel so that a channel broadcasting signal, which is requested by the input/output control unit 125 as controlled by the main control unit 160, can be received through the RF input terminal 113.

The switching unit 123, under the control of the input/output control unit 125, controls the input/output terminals which are connected to the switching unit 123 and can be selectively connected together.

The video decoder 131, under the control of the main control unit 160, decodes and outputs the signal received through the super-video input terminal 111 or the switching unit 123.

The audio A/D conversion unit 133 converts the analog audio signal input through the switching unit 123 into a digital audio signal.

The MPEG encoder 141, under the control of the main control unit 160, encodes the audio signal output from the audio A/D conversion unit 133 and the video signal output from the video decoder 131 using a set compression format system, and records the data subject to recording in the HDD 151. Preferably, the MPEG encoder 141 performs an encoding using an MPEG-2 compression format.

The first SDRAM 143 is a memory used when the MPEG encoder 141 performs an encoding operation.

The data management unit 157 manages the replay of data recorded in the HDD 151 and/or disc player 155 and the recording of the data therein. That is, the data management unit 157, under the control of the main control unit 160, manages the recording of data recorded in the disc player 155 in the HDD 151, recording of data recorded in the HDD 151 in the disc player 155, and the recording of data encoded in the MPEG encoder 141 in the HDD 151.

The disc player 155 is built in the image recording/reproducing apparatus 100, and performs the recording/reproducing operation under the control of the main control unit 160. As an example of the disc player 155, a DVD player may be provided for loading a DVD and/or CD in order to reproduce data recorded in the DVD and/or CD.

The light-receiving unit 171 is applied as an interface, and receives a user's manipulation signal sent from the remote controller 200, which is an external input device, and outputs the received signal to the main control unit 160.

The main control unit 160 processes the user's manipulation signal received through the light-receiving unit 171, and controls respective constituent elements.

The main control unit 160 includes a central processing unit (CPU) 161 and an MPEG decoder 163 for decoding an MPEG-compressed signal, which are combined and integrated into one chip. The MPEG decoder 163 may also be separated into a separate chip and connected to the main control unit 160.

The flash memory 165 stores various kinds of programs related to functions performed by the main control unit 160 and data. The flash memory 165 has a Graphic User Interface (GUI) storage unit 165*a* installed therein for storing programs for processing menus displayed on the TV screen.

The second SDRAM 167 is connected to the main control unit 160 and is used as a temporary storage.

The audio D/A conversion unit 135 converts a digital audio signal output from the MPEG decoder 163 of the main control unit 160 into an analog audio signal, and outputs the analog audio signal to the switching unit 123.

The video encoder 137 encodes a video signal output from the video decoder 131 or the MPEG decoder 163, and outputs the encoded video signal to the switching unit 123.

The input/output control unit 125, under the control of the main control unit 160, controls the tuner 121 and the switching unit 123.

In the image recording/reproducing apparatus 100 as constructed above, the main control unit 160 loads an operating program mounted in the flash memory 165 at an initial operation of the apparatus and processes various kinds of functions which can be supported by the operating program, corresponding to signals received from the remote controller 200 through the light-receiving unit 171.

Figure 3:
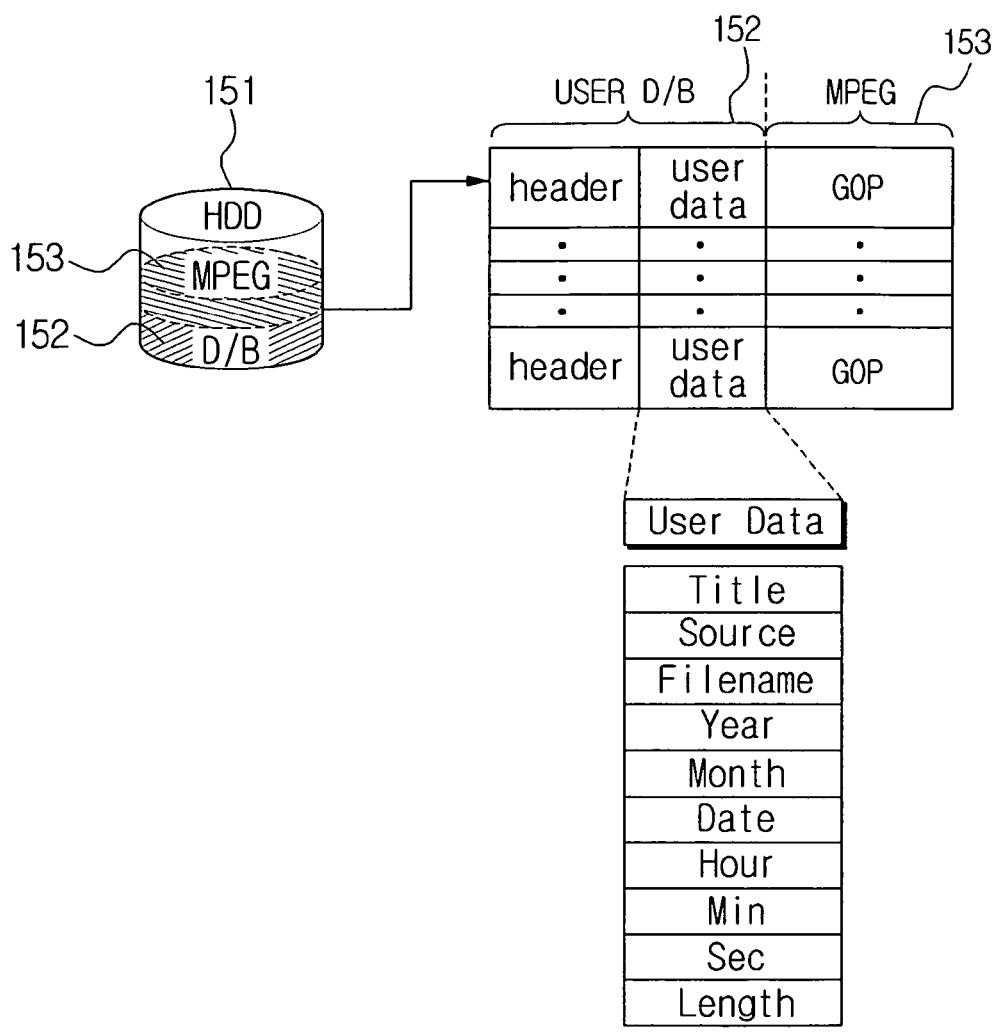
FIG. 3 is a view illustrating an example of a divided storage space of an HDD of FIG. 2.

FIG. 3 is a view illustrating the structure of the HDD 151 of the image recording/reproducing apparatus that has divided storage spaces.

The storage space of the HDD 151 as shown in FIG. 3, includes a user database (D/B) area 152 where user data, such as additional information on a moving picture file, a still picture file and an audio file, is recorded, and a data area 153 for recording Group of Pictures (GOP) data that is video and/or audio data encoded by the MPEG encoder 141.

In the user D/B area 152, header information which includes position information of the moving picture file, still picture file, audio file and additional information on the files, is recorded. Here, the additional information recorded in the user D/B area 152 includes title information of the files, source information, file name information, file replay length information, edit time information, replay time information, etc. Also, the edit time information includes information on year, month, date, hour, minute and second of edits to the file that is the subject of edit.

Figure 4:
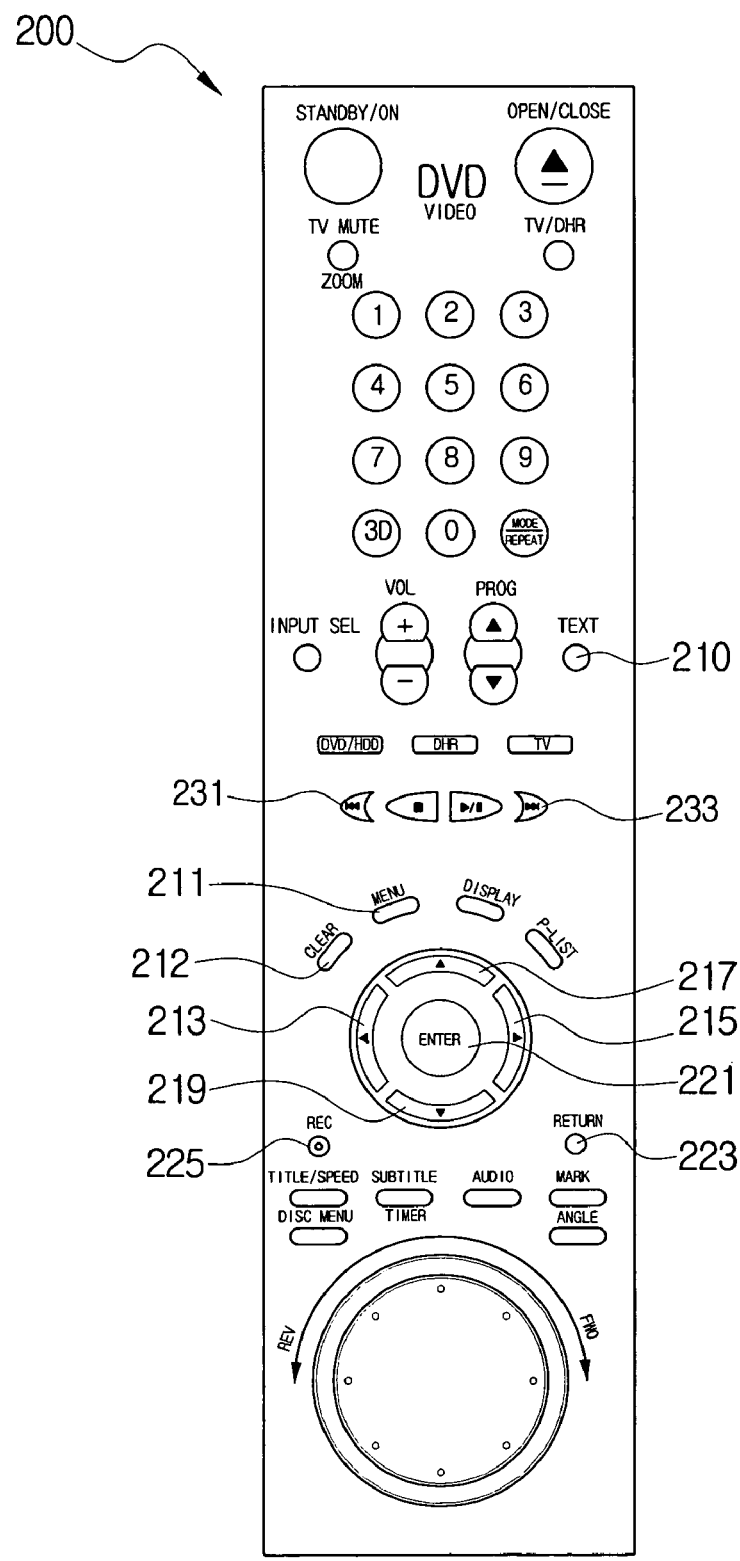
FIG. 4 is a view illustrating an example of a remote controller of FIG. 1.

Hereinafter, manipulation of menu display and related elements will be described with reference to FIG. 4 illustrating a remote controller 200 that is an external input device of the image recording/reproducing apparatus 100.

In FIG. 4, the reference numeral 211 denotes a menu key used to instruct the loading and closing of the menu display, and 213, 215, 217 and 219 denote left, right, up and down direction keys used to indicate the movement of a cursor with respect to a menu item indicated on the displayed menu. Also, the reference numeral 221 denotes an enter key used to select the menu, and 223 denotes a return key used to return to the previous picture.

The remaining keys are known as keys for manipulating the image recording/reproducing apparatus 100 and the TV 300. Since the functions of the remaining keys can be easily recognized through characters marked adjacent to the corresponding keys, the detailed explanation thereof will be omitted.

The selection of functions of the image recording/reproducing apparatus 100 is performed in a manner wherein a menu is displayed on the screen of the TV 300, and one of menu items presented on the displayed menu is selected using the remote controller 200.

Hereinafter, a display menu provided to the TV 300 through an output terminal connected to the TV 300, for example, the line video/audio output terminal 116, and which is displayed by executing a menu-display processing program stored in the GUI storage unit 165*a* by the main control unit 160, will be described with reference to FIGS. 5 to 8.

Figure 5:
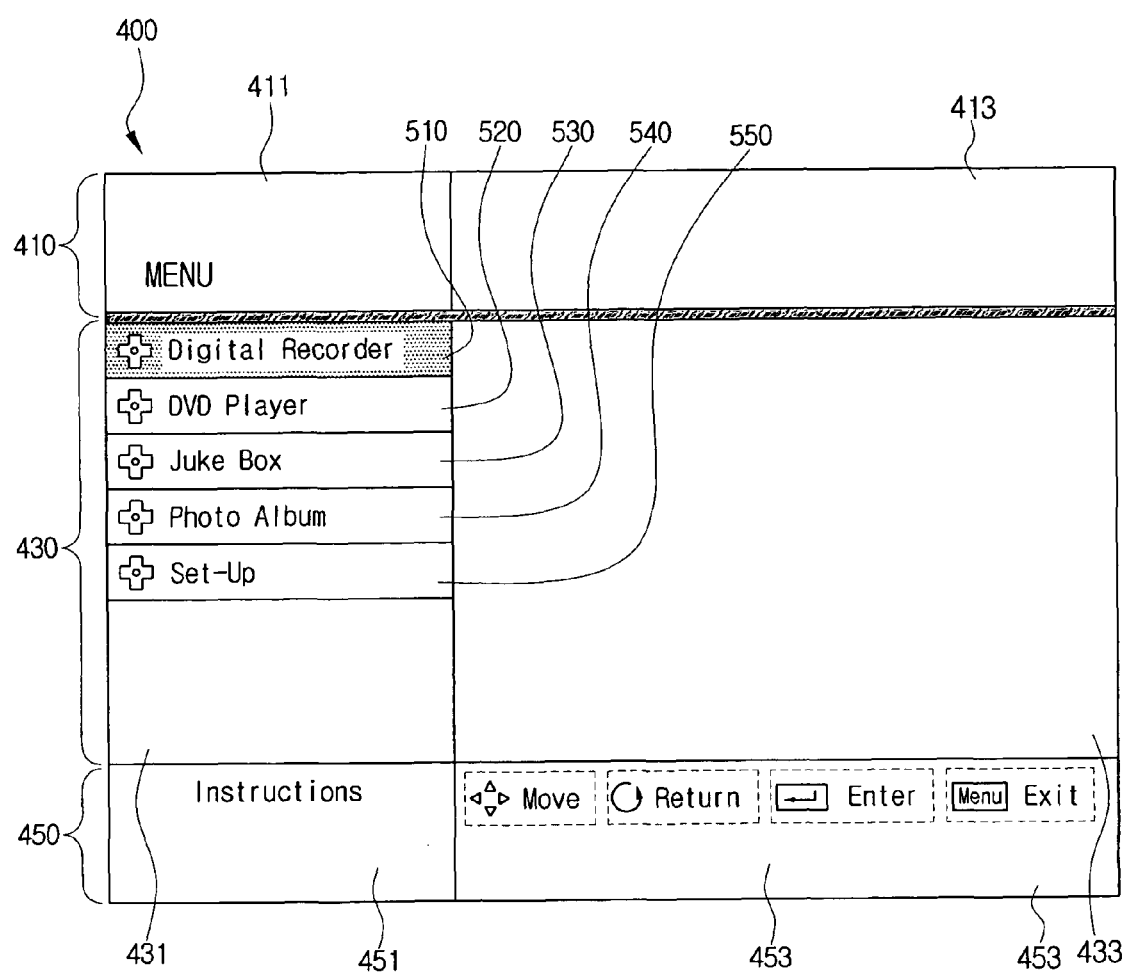
FIG. 5 is a view illustrating an example of an initial menu displayed on a TV screen when a menu key of FIG. 4 is selected.

In order to display an initial menu on the TV 300, the menu key 211 of the remote controller 200 should be pressed. FIG. 5 shows an example of the initial menu displayed on the TV 300. Referring to FIG. 5, the displayed initial menu 400 is divided into an upper area 410, an intermediate area 430, and a lower area 450, and each area is horizontally divided into a first block 411, 431 and 451, and a second block 413, 433 and 453, respectively.

On the first block 411 of the upper area, a 'MENU' indicating the initial menu 400 is displayed, and on the first block 431 of the intermediate area, initial menu items are displayed. On the first block 451 of the lower area, 'Instructions' which indicate key manipulation information of the remote controller 200 that is related to the use of the displayed initial menu 400 are displayed. On the second block 453 of the lower area, keys that are provided in the remote controller 200 and their functions are displayed.

The initial menu items displayed on the first block 431 of the intermediate area include a menu item 'Digital Recorder' 510 for managing files recorded in the HDD 151, a menu item 'DVD Player' 520 for setting the use environment of the disc player 155, a menu item 'Juke Box' 530 for managing audio files of the files recorded in the HDD 151 and the files read out from the disc player 155, a menu item 'Photo Album' 540 for managing still picture files of the files recorded in the HDD 151 and the files read out from the disc player 155, and a menu item 'Set Up' 550 for setting the environment of the image recording/reproducing apparatus 100.

By locating the cursor on one of the initial menu items 510 to 550 indicated on the first block 431 of the intermediate area using the up and down keys 217 and 219 of the remote controller 200 and pressing the enter key 221 on the displayed initial menu 400, the corresponding menu item on which the cursor is located is selected.

If submenus of the selected initial menu item exist, the submenus are displayed on the second block 433 of the intermediate area. If no submenu of the selected initial menu exists, the function corresponding to the selected initial menu item is performed.

Figure 6:
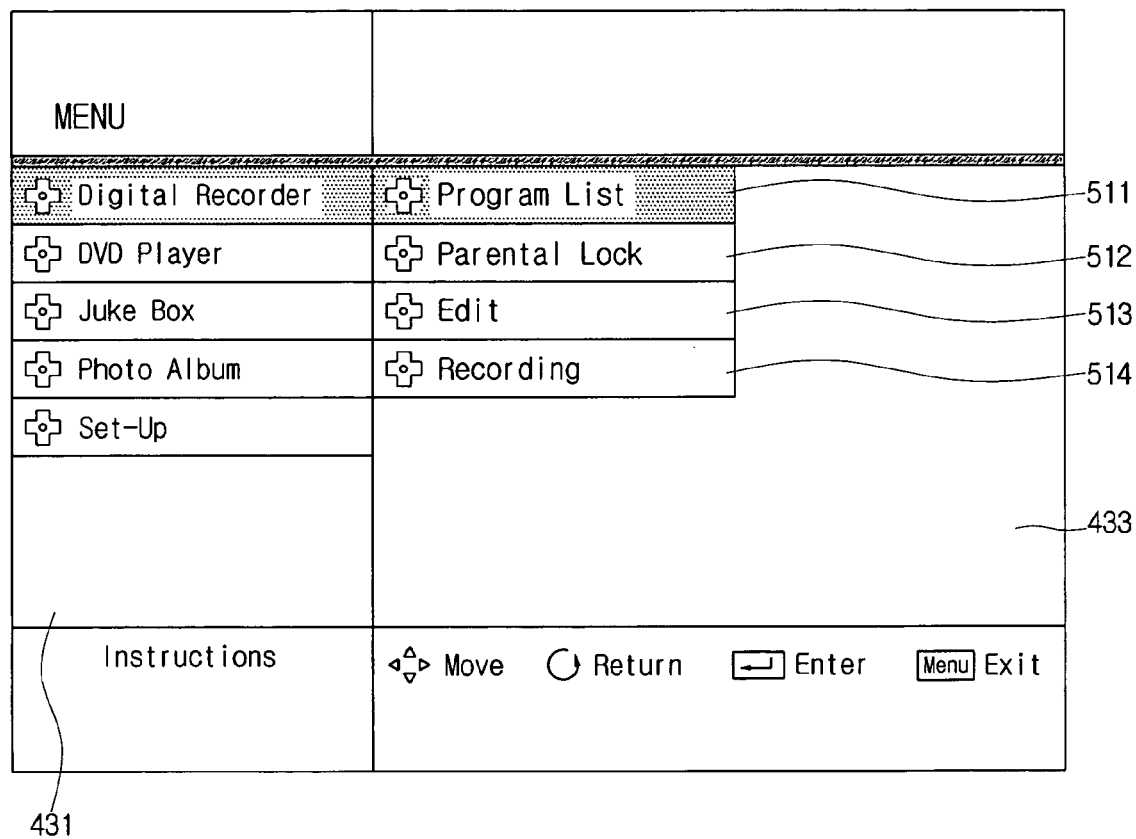
FIG. 6 is a view illustrating an example submenu of a menu item 'Digital Recorder' according to an embodiment of the present invention.

FIG. 6 shows the submenus of the menu item 'Digital Recorder' 510, which in this example is selected from among the initial menu items 510 to 550 as illustrated in FIG. 5. The submenus of the menu item 'Digital Recorder' 510, which are displayed on the second block 433 of the intermediate area, include a menu item 'Program List' 511 for indicating a list of image files stored in the HDD 151, a menu item 'Parental Lock' 512 for restricting the viewing of specified programs (for example, programs for adults), a menu item 'Edit' 513 for editing the image files stored in the HDD 151, and a menu item 'Recording' 514 for recording broadcast programs according to a predetermined time.

FIG. 7 shows the submenus in the submenu item 'Edit' 513, which in this example is selected from among the submenu items 511 to 514 as illustrated in FIG. 6. The submenus in the submenu item 'Edit' 513, which are displayed on the second block 433 of the intermediate area, include a menu item 'Combine' 513*a* for selecting and combining the files recorded in the HDD 151 into one file, a menu item 'Divide' 513*b* for dividing one file into two or more files, a menu item 'Delete' 513*c* for deleting any one of the files recorded in the HDD 151, and a menu item 'Partial Delete' 513*d* for deleting a part of the files recorded in the HDD 151.

FIG. 8 shows the submenus of the menu item 'Juke Box' 530, which in this example is selected from among the initial menu items 510 to 550 as illustrated in FIG. 5. The submenus of the menu item 'Juke Box' 530, which are displayed on the second block 433 of the intermediate area, include a menu item 'HDD Play List' 531 for indicating a list of audio files among the files recorded in the HDD 151, a menu item 'HDD Edit' 532 for editing the audio files among the files recorded in the HDD 151, a menu item 'CD Play List' 533 for indicating a list of audio files among the files recorded in the CD inserted in the disc player 155, and a menu item 'CD Copy to HDD' 534 for copying the audio files recorded in the CD into the HDD 151.

FIG. 9 shows the submenus of the menu item 'Photo Album' 540, which in this example is selected from among the initial menu items 510 to 550 as illustrated in FIG. 5. The submenus of the menu item 'Photo Album' 540, which are displayed on the second block 433 of the intermediate area, include a menu item 'HDD Play List' 541 for indicating a list of still picture files among the files recorded in the HDD 151, a menu item 'HDD Edit' 542 for editing the still picture files among the files recorded in the HDD 151, a menu item 'CD Play List' 543 for indicating a list of the still picture files among the files recorded in the CD inserted in the disc player 155, and a menu item 'CD Copy to HDD' 544 for copying the still picture files recorded in the CD into the HDD 151.

Hereinafter, with reference to FIGS. 10 to 14, a random access function capable of reading and displaying or reproducing the file selected by a user from among a plurality of image files recorded in the recording apparatus according to the first embodiment of the present invention will be described.

First, if the menu item 'Program List' 511 is selected from among the menu items 511 to 514 as illustrated in FIG. 6, a program list menu as shown in FIG. 10 is displayed on the TV 300. The program list menu includes still picture information 601 extracted from a specified part of the whole picture of the respective file, title information 602, record date information 603, and a replay time information 604 corresponding to the whole length of the file.

If the enter key is pressed after the cursor is located on any one of the file items listed on the program list menu, the main control unit 160 performs a control operation to reproduce the file on which the cursor is located.

In detail, if a selection signal of a file item 'Art' among file items listed on the program list menu is received, the main control unit 160 searches for a start position of the file 'Art' recorded in the data area 153 of the HDD 151 using additional information of 'Art' recorded in the user D/B area 152 of the HDD 151. Then, the main control unit 160 performs a process operation to reproduce the searched file.

Taking the menu item 'Juke Box' as another example, a method of accessing the files recorded in the HDD 151 will be described. First, if the menu item 'HDD Play List' 531 is selected from among the menu items 531 to 534 as illustrated in FIG. 8, a play list menu as shown in FIG. 11 is displayed on the TV 300.

Figure 11:
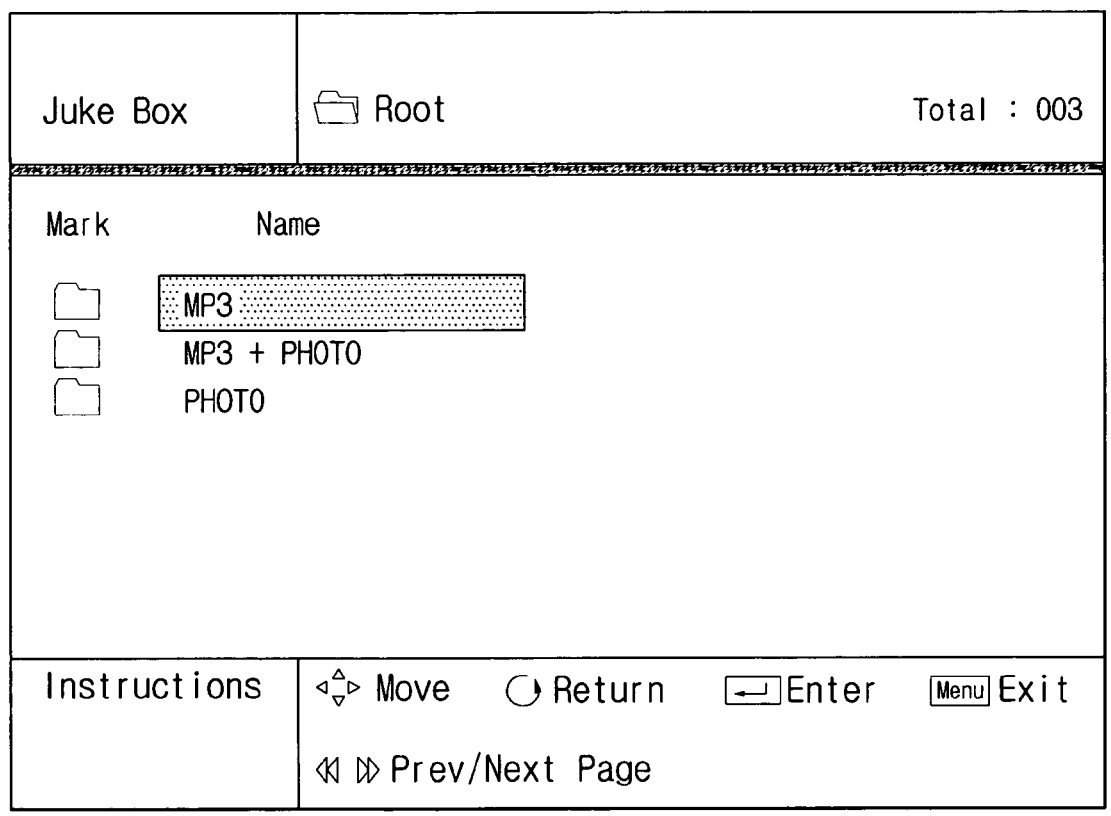
FIG. 11 is a view illustrating an example menu displayed on a TV screen when a menu item 'HDD Play List' as illustrated in FIG. 8 is selected.

Referring to FIG. 11, a folder 'MP3' is shown as a lower folder of a 'Root' folder of the HDD 151, as well as a folder 'MP3+PHOTO' and a folder 'PHOTO'. In order to select a folder subject to replay from among the lower folders listed on the play list menu, the user is required to locate the cursor on the corresponding folder by manipulating the remote controller 200 and then press the enter key 221.

Figure 12:
FIG. 12 is a view illustrating an example menu displayed on a TV screen when a menu item 'MP3 folder' as illustrated in FIG. 11 is selected.

If a selection signal of any one of the lower folders listed on the play list menu is received, the main control unit 160 performs a process operation to list the audio files recorded in the selected folder. For example, if a folder 'MP3' is selected from among the lower folders listed on the play list menu, the main control unit 160 performs a process operation to list the audio files recorded in the folder 'MP3' using the additional information on the folder 'MP3' recorded in the user D/B area 152 of the HDD 151. Accordingly, the audio files recorded in the folder 'MP3' are listed on the play list menu as shown in FIG. 12.

An audio file subject to replay is selected from among a plurality of audio files listed on the play list menu by manipulating the remote controller 200. The selected audio file can be recognized by a check mark (v) marked near the audio file name.

For example, if a replay request signal of an audio file 'Take it Easy' selected by the user is received, the main control unit 160 searches for and performs a process operation to reproduce the audio file recorded in the data area 153 of the HDD 151 using the additional information of the audio file 'Take it Easy' recorded in the user D/B area 152 of the HDD 151.

Also, it is possible to randomly access the still picture file list recorded in the HDD 151 by selecting the menu item 'HDD Play List' 541 of the menu item 'Photo Album' 540 as illustrated in FIG. 9.

Hereinafter, a method of controlling an image recording/reproducing apparatus that can perform a random access according to the embodiment of the present invention will be described with reference to FIGS. 13 and 14.

Figure 13:
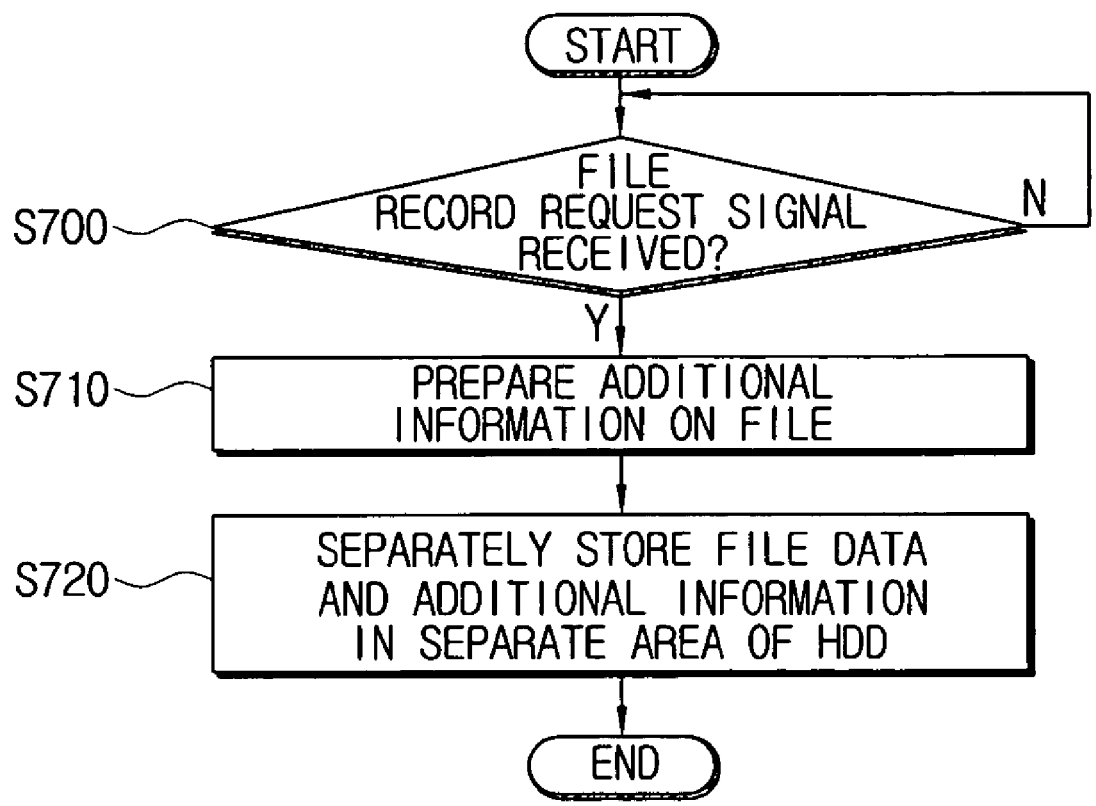
FIGS. 13 and 14 are flowcharts describing an example method of controlling an image recording/reproducing apparatus capable of performing a random access according to a first embodiment of the present invention.
Figure 14:
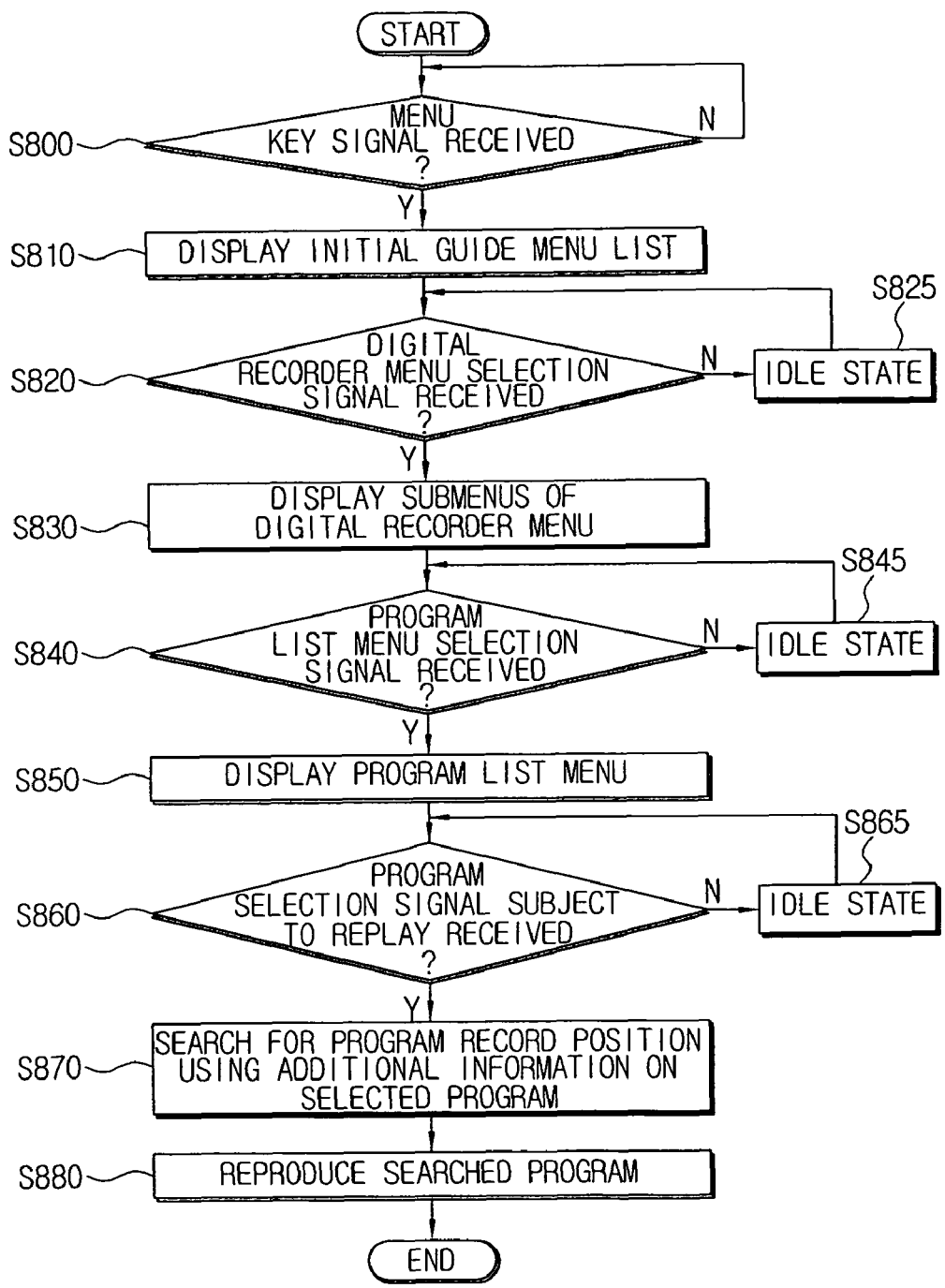

First, referring to FIG. 13, the main control unit 160 judges whether a record request signal is received through the light-receiving unit 171 (step S700). If it is judged that the record request signal is received at step S700, the main control unit 160 prepares additional information that includes record position information of the file subject to record, title information, file name information, replay time information, etc. (step S710).

If the additional information of the file subject to record is created at step S710, the main control unit 160 performs a process operation to record the file subject to record in the data area 153 of the HDD 151, and to record the additional information in the user D/B area 152 of the HDD 151 (step S720).

Next, a method of accessing the files recorded in the HDD 151 as described above will be described with reference to FIG. 14. In the embodiment of the present invention, the process of accessing the file recorded in the HDD 151 will be described, taking the selection of the menu item 'Program List' 511 from among the menu items 511 to 514 as illustrated in FIG. 6 as an example.

If the signal of the menu key 211 is received through the light-receiving unit 171 (step S800), the main control unit 160 performs a process operation to display the initial menu 400 as illustrated in FIG. 5 through the TV screen (step S810). If the menu item 'Digital Recorder' 510 is selected from among the initial menu items as illustrated in FIG. 5 (step S820), the submenus of the menu item 'Digital Recorder' 510 are displayed as shown in FIG. 6 (step S830).

If the menu item 'Program List' 511 is selected from among the submenu items as illustrated in FIG. 6 (step S840), the main control unit 160 performs a process operation to display the program list menu as illustrated in FIG. 10 through the screen of the TV 300 (step S850).

If the file subject to replay is selected from among the file items listed on the program list menu by the user (step S860), the main control unit 160 searches for the record position of the data area 153 of the HDD 151 using the additional information of the file recorded in the user D/B area 152 of the HDD 151 (step S870). Then, the main control unit 160 performs a process operation to reproduce the file corresponding to the searched position (step S880).

If the selection is not received at steps S820, S840 and S860, an idle state is maintained as at steps S825, S845 and S865.

Hereinafter, with reference to FIGS. 15 to 19, a function of correcting the file name of the image file recorded in a recording medium according to the second embodiment of the present invention will be described.

Here, it is defined that a file, the name of which a user desires to correct, is a file before correcting a file name. A file after correction is a file the name of which is corrected. A file name of a file desired to be corrected is a file name before correction. Finally, a file name after correcting the file name is a corrected file name.

Figure 15:
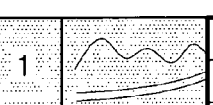
FIG. 15 is a view illustrating an example menu displayed on a TV screen when a text key of FIG. 4 is selected in a state wherein the menu displayed is as shown in FIG. 10.

First, if the menu item 'Program List' 511 is selected from among the menu items 511 to 514 as illustrated in FIG. 6, a program list menu as shown in FIG. 10 is displayed on the TV 300. Thereafter, if a text key 210 of the remote controller 200 is pressed, a virtual input menu 900 is displayed on the screen as illustrated in FIG. 15.

The virtual input menu 900 includes a keyboard menu part 910, an input window 920 and an output window 930.

The keyboard menu part 910 includes a character menu, a numeral menu and a symbol menu, and in the embodiment of the present invention shown, it is defined that the keys constitute the character menu 912. Also, if the corrected file name is input onto the input window 920 by selecting the character menu 912, the keyboard menu part includes an input menu 911 for commanding the update of the file name to the input corrected file name.

The input window 920 is provided for displaying characters corresponding to the character menu 912 if the character menu 912 is selected by manipulating the remote controller 200. In the embodiment of the present invention shown, the output window 930 is provided in addition to the input window 920, and thus a cursor is provided on the input window 920 when the virtual input menu 900 is displayed on the screen. In the case where the output window 930 is not separately provided, it is preferable that the file name, before correction, is displayed on the input window 920.

The output window 930 is a window provided for displaying the file name before correction.

Figure 19:
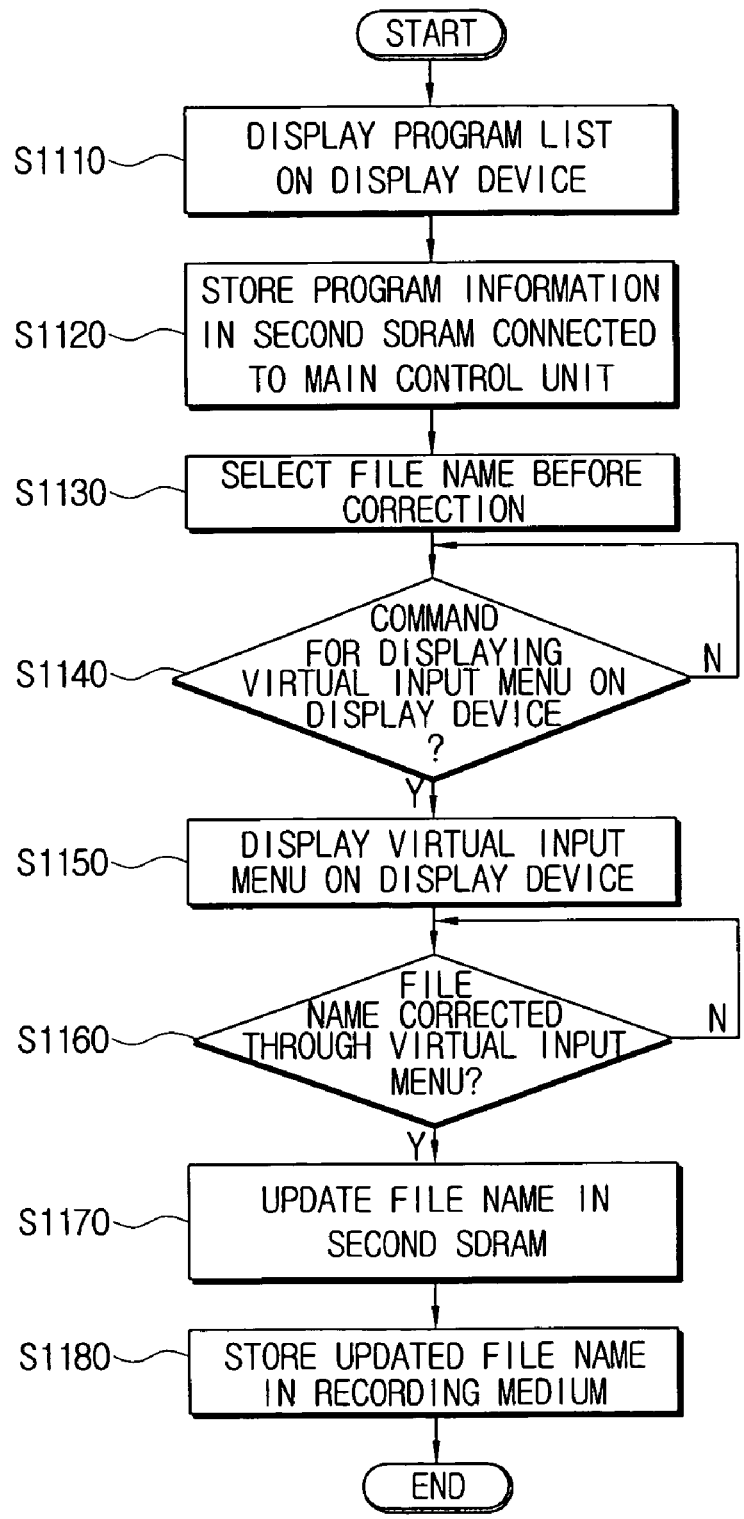
FIG. 19 is a flowchart describing an example method of controlling an image recording/reproducing apparatus capable of correcting a file name of an image file recorded in a recording medium according to a second embodiment of the present invention.

FIG. 19 is a flowchart describing an example method of controlling an image recording/reproducing apparatus capable of correcting a file name of an image file recorded on a recording medium according to the embodiment of the present invention.

Referring to FIG. 19, if the menu item 'Program List' 511 is selected from among the menu items 511 to 514 as illustrated in FIG. 6, the files recorded in the HDD 155 are listed on the intermediate area 430 of the screen of the TV 300 as shown in FIG. 10 (step S1110). At this time, information on the files listed on the intermediate area 430 is recorded in the second SDRAM 167, starting from the user D/B area 152 of the HDD 151 (step S1120). If the user locates the cursor on the file, the name of which is not corrected, by manipulating the remote controller 200, the corresponding file item is highlighted (step S1130).

Then, if a command for displaying the virtual input menu 900 on the TV 300 is input to the main control unit 160 by selecting the text key 210 of the remote controller 200 (step S1140), the virtual input menu 900 is displayed on the TV 300. At this time, as shown in FIG. 15, the file name before correction is output to the output window 930 provided on the virtual input menu 900, and the cursor is located on the input window 920 (step S1150).

Figure 16:
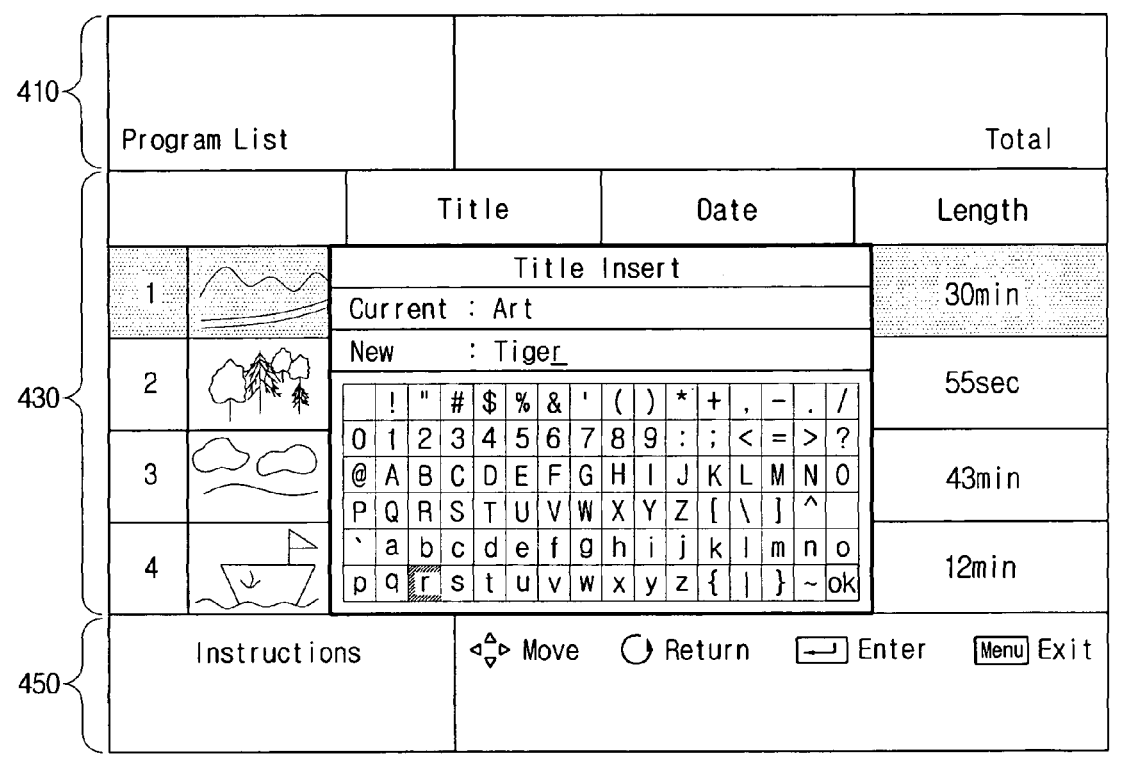

As shown in FIG. 16, if the user inputs a corrected file name 'Tiger' and selects the input menu 911 (step S1160), the file name recorded in the second SDRAM 167 is updated by the corrected file name (step S1170), and the updated file name is recorded in the user D/B area 152 of the HDD 151 (step S1180). Then, the title information 602 of the user D/B area 152 of the HDD 151 is corrected as shown in FIG. 17.

Figure 18:
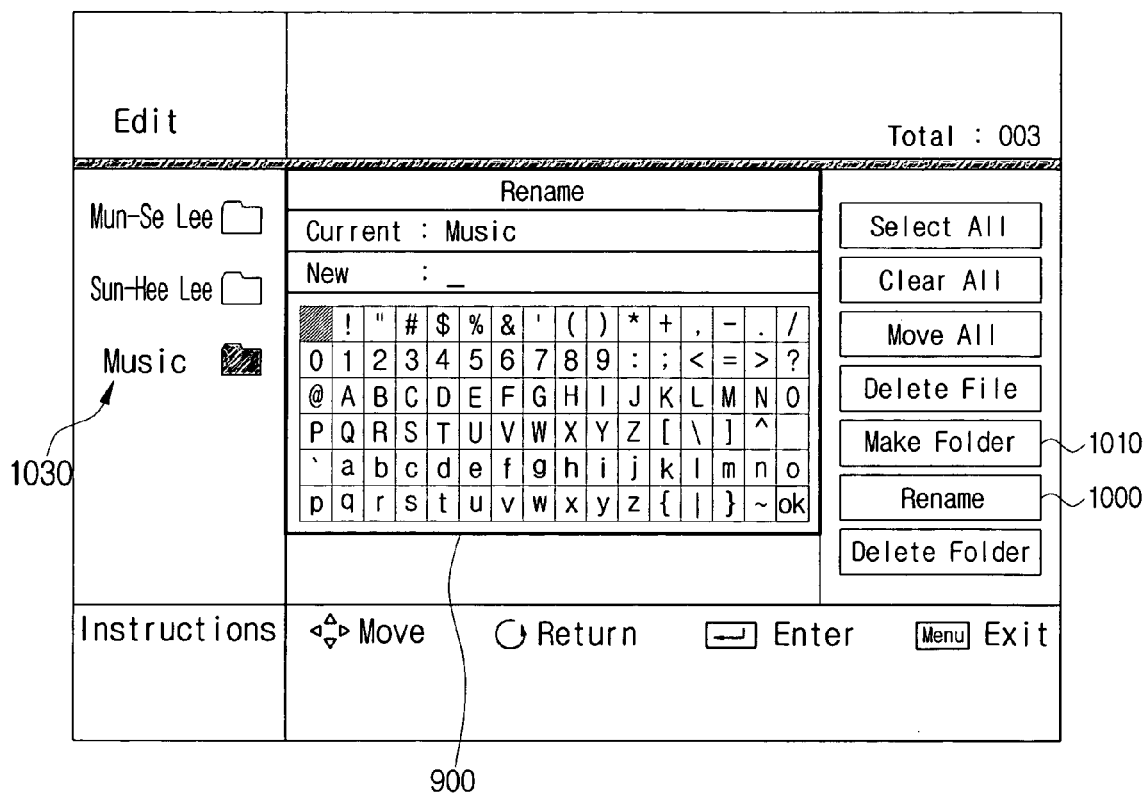
FIG. 18 is a view illustrating an example menu displayed on a TV screen when a menu item 'HDD Edit' as illustrated in FIG. 8 is selected.

Also, it is possible to correct the file name by selecting the menu item 'HDD Edit' 532 from among the menu items 531 to 534 as illustrated in FIG. 8 or the menu item 'HDD Edit' 542 from among the menu items 541 to 544 as illustrated in FIG. 9. The former will be described with reference to FIG. 18. FIG. 18 shows an example menu displayed when the menu item 'HDD Edit' 532 as illustrated in FIG. 8 is selected.

The difference between this method and the file name changing method as described above is that file name is corrected by displaying a virtual input menu 900 on the TV 300 using a file rename mark 1000 prepared in the right area of the HDD Edit menu item, without displaying the virtual input menu by selecting the text key 210 of the remote controller 200. Also, since the name of a folder created by a make folder mark 1010 is initially determined by a default value 1030, the folder name is corrected by selecting the file rename mark 1000 and displaying the virtual input menu 900 in a state wherein the make folder mark 1010 is selected.

Thus, according to the embodiment of the present invention, the user can correct the existing file name to a desired file name.

Hereinafter, with reference to FIG. 20, a function of reproducing moving picture files recorded in recording medium as moving pictures and displaying the moving pictures in a displayed file list menu according to the third embodiment of the present invention will be described.

Figure 20:
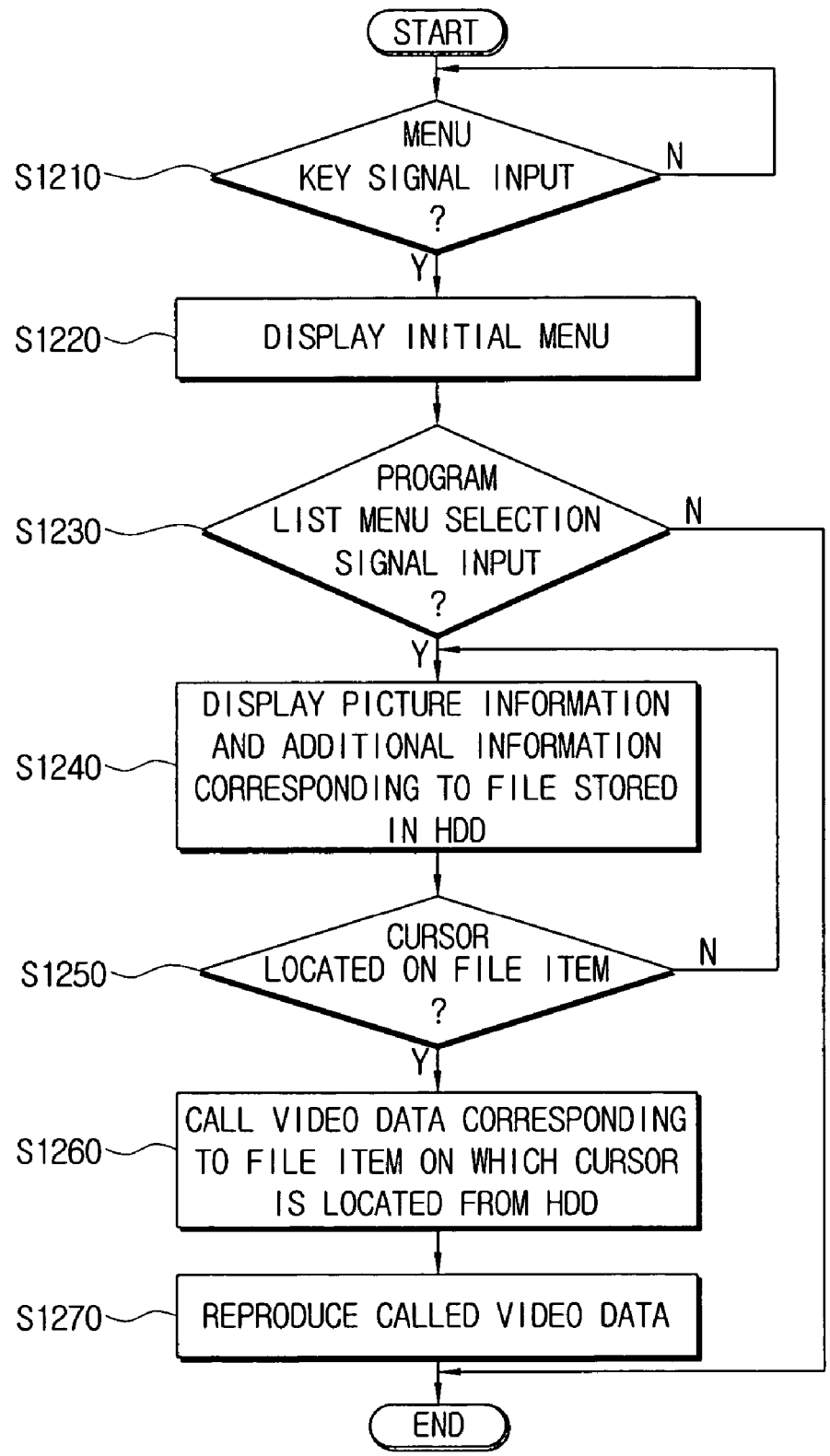
FIG. 20 is a flowchart describing an example method of controlling an image recording/reproducing apparatus capable of reproducing and displaying moving picture files recorded in a recording medium on a screen of a file list as moving pictures according to a third embodiment of the present invention.

FIG. 20 is a flowchart describing an example method of controlling an image recording/reproducing apparatus capable of reproducing and displaying moving picture files recorded in a recording medium in a displayed file list menu as moving pictures according to the third embodiment of the present invention.

First, if the menu key 211 of FIG. 4 is pressed (step S1210), the initial menu 400 as shown in FIG. 5 is displayed on the TV 300 (step S1220). Then, if the menu item 'Digital Recorder' 510 is selected from among the menu items 510 to 540 as illustrated in FIG. 5, the submenu items 511 to 514 of the menu item 'Digital Recorder' 510 are displayed as shown in FIG. 6. If the menu item 'Program List' 511 is selected from among the submenu items 511 to 514 (step S1230), the menu as illustrated in FIG. 10 is displayed on the screen (step S1240).

Next, if the cursor is located on any one of the file items displayed in the menu as illustrated in FIG. 10 (step S1250), video data corresponding to the file item on which the cursor is located is called out from the HDD 151 (step S1260).

The still picture information 601 of the file item corresponds to the first start frame of the file recorded in the HDD 151 (i.e., one reproduced frame), and the file item on which the cursor is located is reproduced by loading the video data of the corresponding file from the HDD 151 (step S1270). Accordingly, a moving picture is reproduced for the still picture information 601, and the size of the moving picture being reproduced is the same as the size of the still picture information 601. If the cursor is moved to another file item, the replay of the moving picture of the file item on which the cursor was located is stopped, and the moving picture of the file item on which the cursor is newly located is reproduced.

At this time, the still picture of the initial frame is displayed for the file item for which the replay is stopped.

In order to reproduce the moving picture faster, a high-speed replay is set by pressing the direction keys 213 and 215. For example, by pressing the left direction key 213 a first and a second time, a high-speed replay increase of ½ times and a high-speed replay increase of ¼ times can be set, respectively. In the same manner, a high-speed replay increase of 2 times can be set by pressing the right direction key 215 a first time, and a high-speed replay increase of 4 times can be set by pressing the right direction key a second time.

Hereinafter, with reference to FIGS. 21 and 22, a function of displaying icons according to the kind of image files along with a file list of image files recorded in the recording medium according to the fourth embodiment of the present invention will be described.

Figure 21:
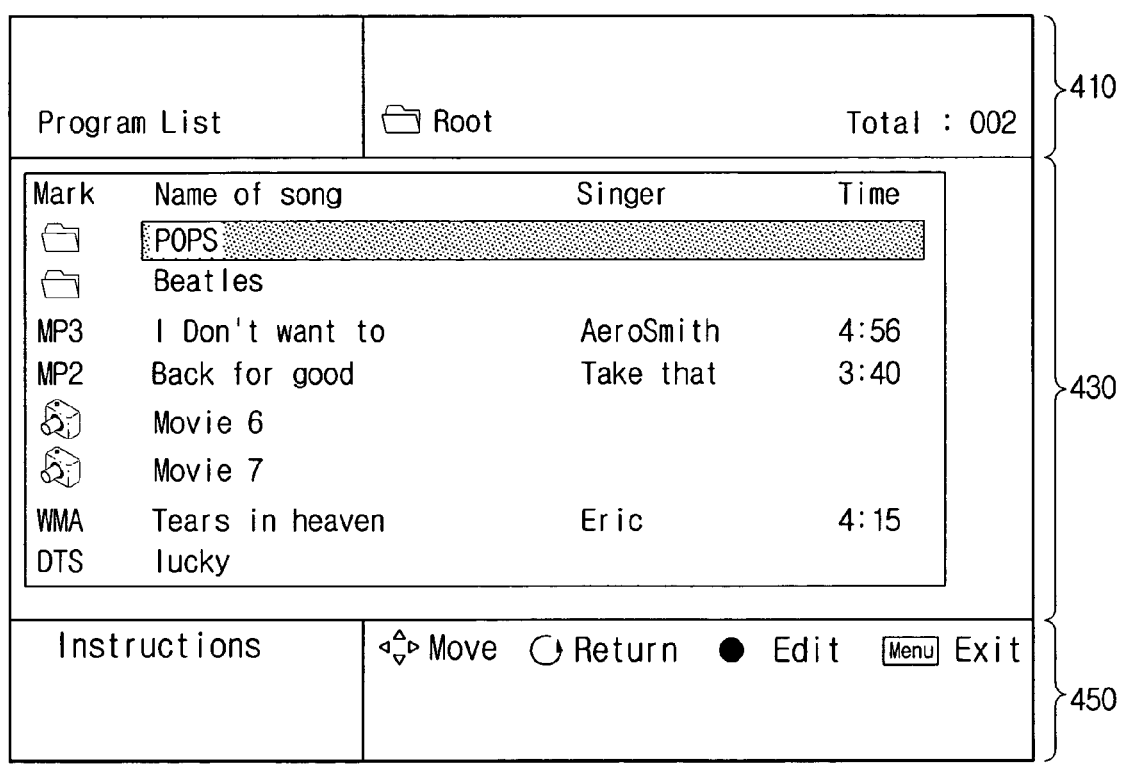
FIG. 21 is a view illustrating another example of a menu displayed on a TV screen when a menu item 'Program List' of FIG. 6 is selected.

First, if the menu item 'Program List' 511 is selected from among the menu items 511 to 514 as illustrated in FIG. 6, a program list menu as shown in FIG. 21 is displayed on the TV 300. This program list menu is different from that as illustrated in FIG. 10 in form. As described above, the image recording/reproducing apparatus 100 can provide the list in the form as illustrated in FIG. 21 in addition to the list in the form as illustrated in FIG. 10, and the user can preset this form of the list.

In the intermediate area 430 of the program list menu as illustrated in FIG. 21, file names and icons of decodable files recorded in the HDD 151 are shown.

Typically, in the HDD 151, a plurality of files can be recorded. Most files have an expander, which is used as a factor indicating the type and kind of the file.

Even identical audio files may be recorded as a plurality of files having different expanders, such as 'mp3', 'wma', 'wav', etc., and the files having different properties, such as a moving picture file, still picture file, text file, etc., as well as an audio file, may be recorded with different expanders. That is, as shown in Table 1 below, the moving picture file, still picture file and the audio file can have different expanders.

TABLE 1

| Classification | Kind of Expanders |
|---|---|
| Moving picture file | WVV, VBS, MPV, DAT, VOB, MPG, etc. |
| Still picture file | JPG, JPE, etc. |
| Audio file | WAV, MP3, MMP, AC3, DTS, DMC, ABX, MPA, WMA, ASF, etc. |

The moving picture files, still picture files and audio files having the expanders as shown in Table 1 are classified into files that can be displayed, and recorded in the flash memory 165 so that they can be corrected, modified and recorded. As shown in Table 1, the moving picture file may be recorded and displayed in the form of '*.mpg', the still picture file such as a photograph in the form of '*.jpg', and the audio file in the form of '*.wav'.

Figure 22:
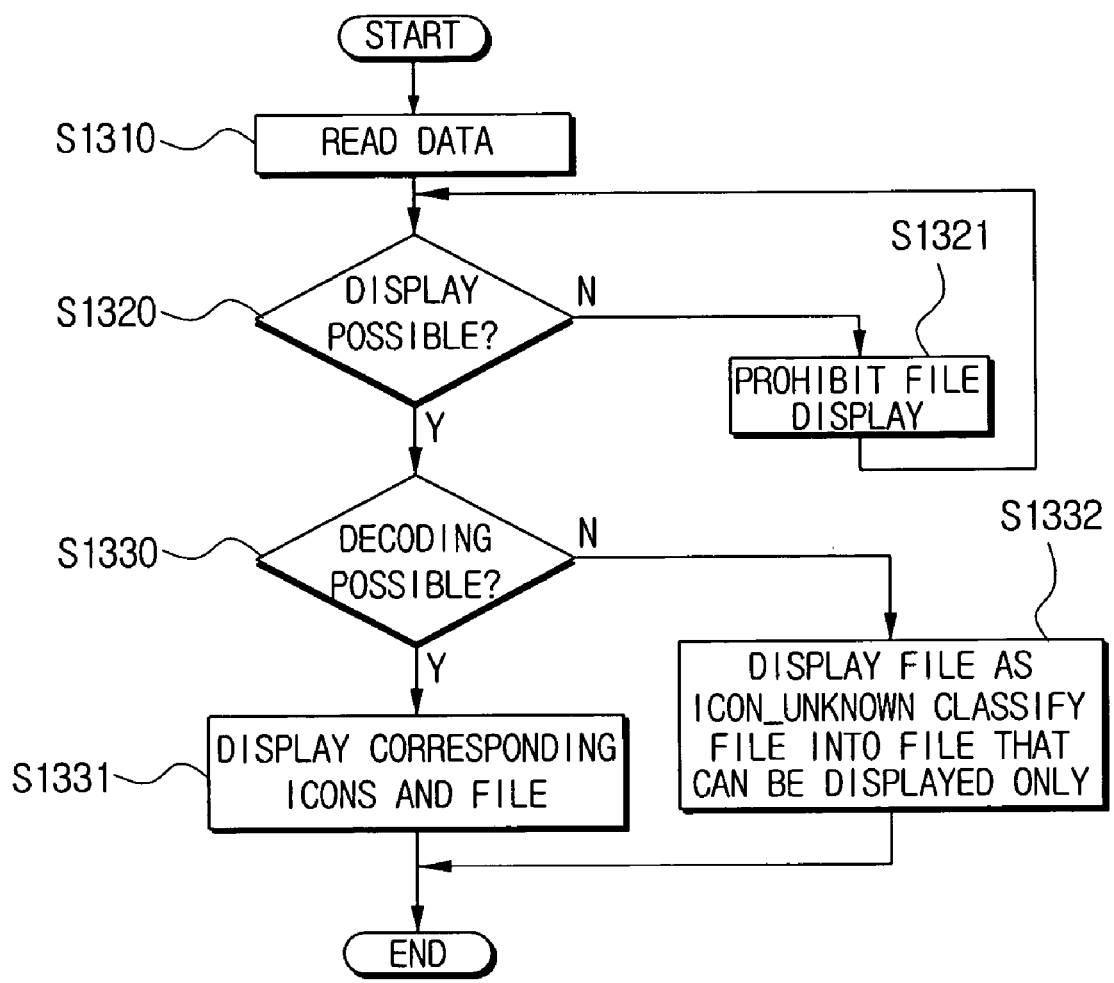
FIG. 22 is a flowchart describing an example method of controlling an image recording/reproducing apparatus capable of displaying a file list of image files recorded in a recording medium along with icons according to the kind of image file according to a fourth embodiment of the present invention.

FIG. 22 is a flowchart explaining an example method of controlling an image recording/reproducing apparatus capable of displaying a file list of image files recorded in a recording medium along with icons according to the kind of image files according to the fourth embodiment of the present invention.

Referring to FIG. 22, the main control unit 160 reads out the information on the files recorded in the HDD 151 (step S1310), and confirms the expanders from the related information of the respective files (step S1320). This is for judging whether the files can be displayed or not (e.g., whether the expanders of the respective files are compatible with one another as shown in Table 1). This is for preventing any file having no reproduced program from being displayed on the screen. If it is judged that the file cannot be displayed on the screen at step S1320, the main control unit processes the instructions to not display the corresponding file on the display device (step S1321).

Also, in order to judge whether the respective files can be reproduced, the main control unit 160 confirms whether the files are decodable (step S1330). The main control unit 160 should confirm the stream type of the file recorded in the HDD 151 in order to confirm whether the file is decodable. All the files have the expanders, but do not always have their stream types. The stream type information of 2 bytes is included only in data that can be streamed (i.e., that is decodable), among the files. Accordingly, it can be judged whether the file is decodable (i.e., whether the file can be reproduced), by confirming its stream type.

The stream type is a data type of the respective file recorded in the HDD 151, which makes it possible to discriminate the data type of the file recorded in the HDD 151, such as moving picture data, still picture data, audio data, text data, animation data, etc.

The stream type, in the case of a file having the 'mp3' expander, may be included in an 'ID3' tag for recording the additional information of the 'mp3' (for example, the name of music, singer, production date, genre, etc). Accordingly, in the case where a file having the 'mp3' expander is recorded in the HDD 151, the main control unit 160 judges whether the file is decodable by confirming the stream type included in the 'ID3' tag. For example, the decodable file may be a moving picture file, still picture file, audio file, etc., as shown in Table 2 below.

TABLE 2

Icon display method for each stream type

| Icon | Stream Type |
|---|---|
| ICON_UNKNOWN | UNKNOWN_STREAM |
| | PURE_VIDEO |
| | PURE_MLP |
| | PURE_MLP_SWAPPED |
| | PURE_WMA_SWAPPED |
| | MPEG2_TRANSPORT |
| ICON_VCD | MPEG1_SYSTEM |
| | MPEG2_PROGRAM |
| | MPEG1_PES |
| ICON_DVD | MPEG2_PES |
| ICON_DOLBY | PURE_AC3 |
| | PURE_AC3_SWAPPED |
| ICON_MP2 | PURE_MUSICAM |
| | PES_MUSICAM |
| ICON_DTS | PURE_DTS |
| | PURE_DTS_SWAPPED |
| ICON_DMC | PURE_DMC |
| | PURE_DMC_SWAPPED |
| ICON_MP3 | PURE_MP3 |
| | PURE_MP3_LSF |
| ICON_WMA | PURE_WMA |
| ICON_CDDA | PURE_CDDA |
| ICON_DVD | DVD_PROGRAM |
| ICON_JPG | PURE_JPEG |

Icons on the left side of Table 2 are designated to be displayed as different icon forms through the program list menu as illustrated in FIG. 21, and recorded in the flash memory 165. Accordingly, the main control unit 160 performs a control operation to display the icon of the stream type 'PURE_MP3' as 'MP3' as shown in FIG. 21, although the corresponding icon is 'ICON_MP3'. In the same manner, the main control unit can perform a control operation to display the icon of the stream type 'PURE_MUSICAM' or 'PES_MUSICAM' as 'MP2', the stream type 'PURE_WMA' as 'WMA', and the stream type 'PURE_DTS' or 'PURE_DTS_SWAPPED' as 'DTS', respectively. Also, it can perform a control operation to display the corresponding icon as an icon of a camera shape as shown in FIG. 21.

The icon classification table for the respective stream types of Table 2 may be prerecorded in the flash memory 165. Also, according to the icon classification table, a specified icon may be mapped and automatically recorded, or the icon may be changed, deleted or added on the program list menu by the user's key manipulation.

The main control unit 160 reads out the files that are decodable (i.e., that can be reproduced), from the files recorded in the HDD 151 by calling the corresponding icons predetermined for each stream type as shown in Table 2 from the flash memory 165, and displays the icons as shown in FIG. 21 (step S1331). That is, the main control unit provides the icons in the list of the files recorded in the HDD 151 as shown in FIG. 21.

The decodable files as illustrated in the intermediate area 430 of FIG. 21 are displayed as diverse icons according to the classification table of Table 2. Specifically, by displaying the different icons according to the kind of files, the kind of files can be more easily illustrated to the user.

If the menu item 'HDD Plat List' 531 or the menu item 'CD Play List' 533 as illustrated in FIG. 8 is selected, or if the menu item 'HDD Plat List' 541 or the menu item 'CD Play List' 543 as illustrated in FIG. 9 is selected, the main control unit 160 may display the files recorded in the HDD 151 or the files to be reproduced through the disc player 155 in the same manner as that in the program list menu as illustrated in FIG. 12.

If it is judged that the file is not decodable at step S1330, the main control unit 160 displays an icon such as 'ICON_UN-KNOWN' in the icon display region of the corresponding file (step S1332). It is preferable that the icon, such as 'ICON_UNKNOWN', is prevented from being reproduced through the user's key manipulation, but is only displayed on the screen.

Hereinafter, with reference to FIG. 23, a function of continuously reproducing image files recorded in a recording medium inserted into the disc player 155 in the order of their storage in the recording medium according to the fifth embodiment of the present invention will be described.

Figure 23:
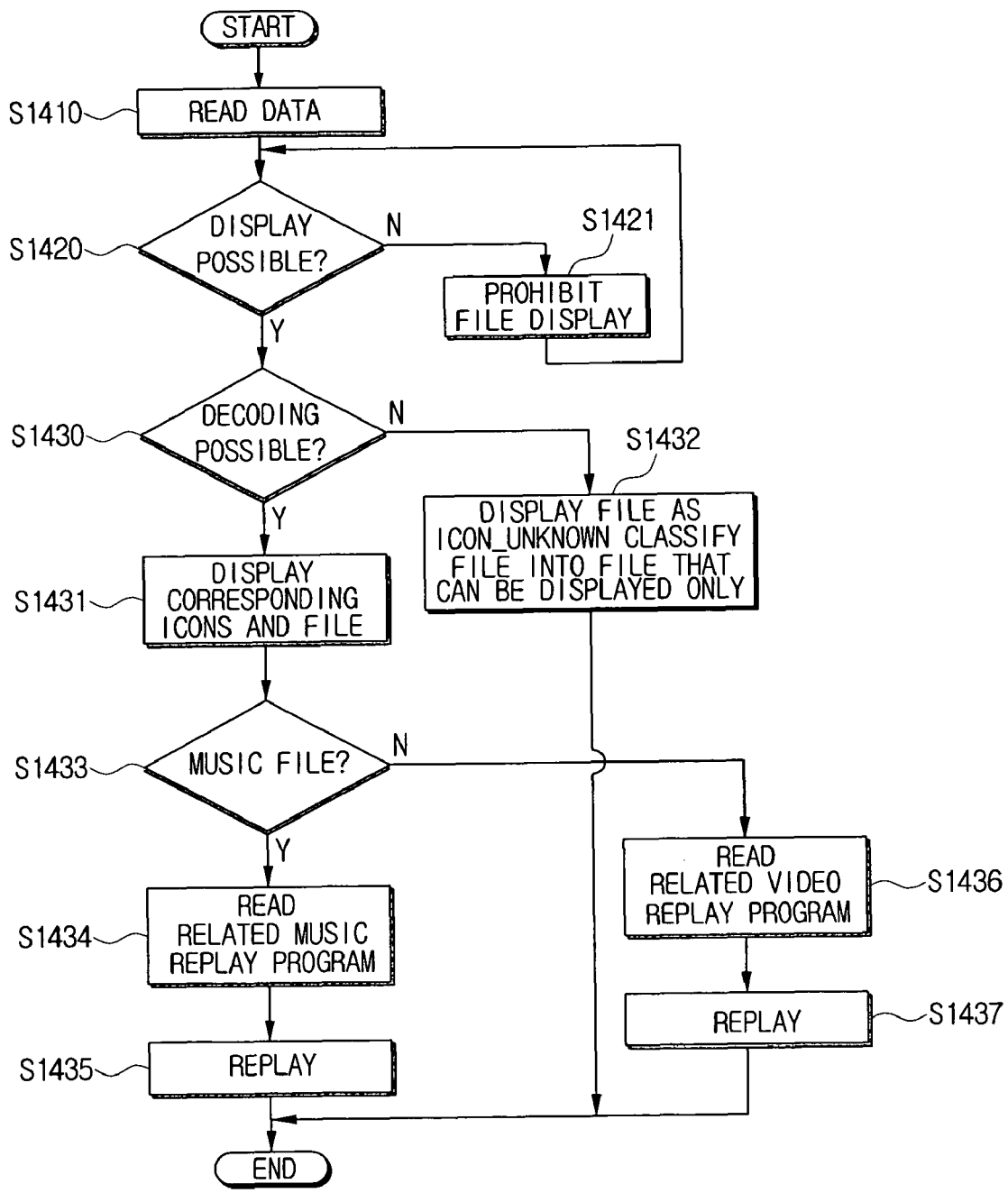
FIG. 23 is a flowchart describing an example method of controlling an image recording/reproducing apparatus capable of continuously reproducing image files recorded in a recording medium in the order of their storage in the recording medium according to the fifth embodiment of the present invention.

FIG. 23 is a flowchart describing an example method of controlling an image recording/reproducing apparatus capable of continuously reproducing image files recorded in a recording medium in the order of their storage in the recording medium according to the fifth embodiment of the present invention.

Referring to FIG. 23, the main control unit 160 reads out the information on the files recorded in a disc inserted into the disc player 155 (step S1410), and judges whether the files can be displayed by confirming the expanders of the respective files (step S1420). If it is judged that the file cannot be displayed on the screen at step S1420, the main control unit 160 performs a process operation to prevent the display of the corresponding file on the TV 300 (step S1421).

Also, in order to judge whether the respective files can be reproduced, the main control unit 160 confirms whether the files are decodable (step S1430).

The main control unit 160 displays the list of the files that can be reproduced and their corresponding icons as shown in FIG. 21 by calling the corresponding icons predetermined for each stream type as shown in Table 2 from the flash memory 165 (step S1431).

If it is judged that the file is not decodable at step S1430, the main control unit 160 displays an icon such as 'ICON_UN-KNOWN' in the icon display region of the corresponding file (step S1432).

If the user selects the file to be reproduced by manipulating the cursor, the main control unit 160 judges if the file selected by the user is a music file (step S1433).

If it is judged that the file is a music file at step S1433, the main control unit 160 reads a related music replay program (step S1434) and reproduces the music file (step S1435). Specifically, if the file 'MP3 I Don't want to' is selected from the menu displayed as illustrated in FIG. 21, the main control unit 160 calls a related function 'mp3_action' from the flash memory 165 in order to decode the file 'MP3', records a decoded value in the second SDRAM 167, and transmits data to the audio D/A conversion unit 135 so that the music file is reproduced and output to an external device. It is preferable that at step S1433, the main control unit 160 judges the kind of the file by confirming the stream type of the file recorded in the disc.

If it is judged that the file is not the music file at step S1433, the main control unit 160 judges that the selected file is a moving picture file, reads a related video replay program (step S1436) and reproduces the file (step S1437). That is, if the icon 'Movie 7' is selected from the menu as shown in FIG. 21, the main control unit 160 calls a related function 'rom_slide_show' from the flash memory 165 in order to decode a picture file, records a decoded value in the second SDRAM 167, and transmits data to the video encoder 137 so that the music file is reproduced and output to an external device.

Hereinafter, with reference to FIGS. 24 to 27, a function of editing an image file more easily according to the sixth embodiment of the present invention will be described.

Figure 24:
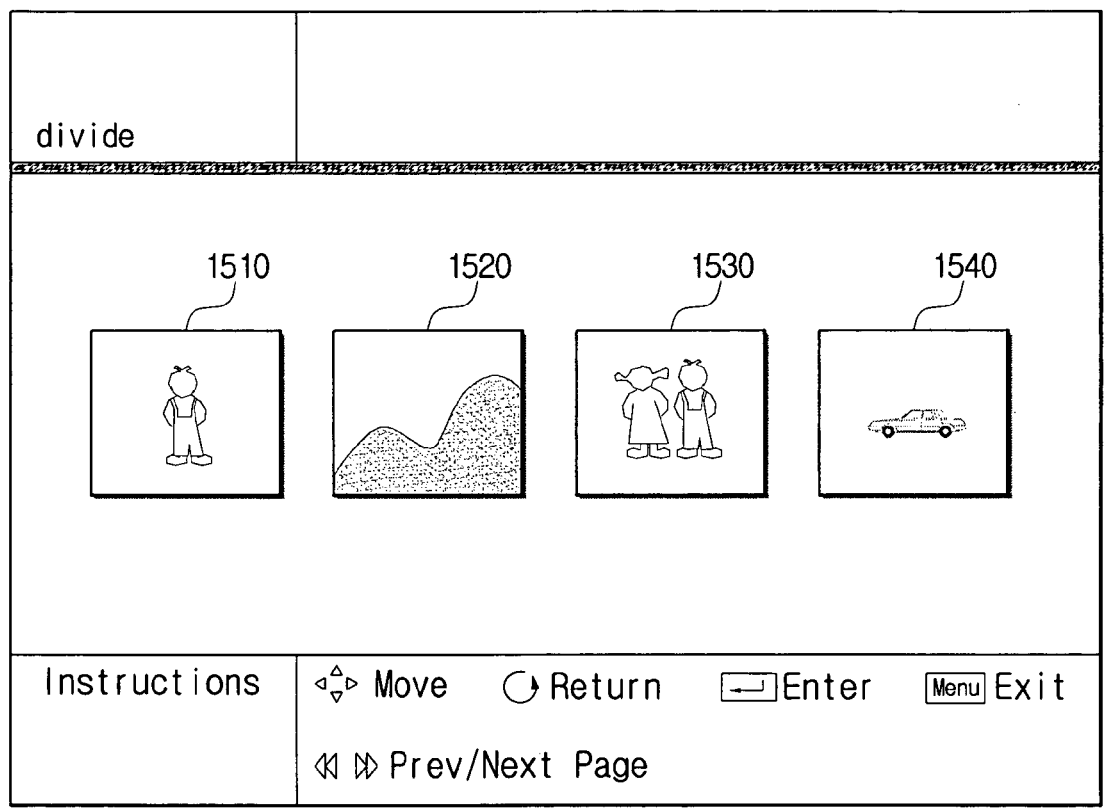
FIGS. 24 to 27 are views provided for illustrating an example menu 'Divide' according to an embodiment of the present invention.

First, if the menu item 'Divide' 513b is selected from among the menu items 513a to 513d as illustrated in FIG. 7, a menu 'Divide' as shown in FIG. 24 is displayed on the TV 300.

As shown in FIG. 24, the menu 'Divide' displays the files recorded in the HDD 151 in the form of still pictures having a predetermined size. The displayed still pictures 1510 to 1540 represent first frames reproduced when the respective files recorded in the HDD 151 are reproduced, respectively. Here, if a reference numeral 1540 is selected using the direction keys 213 and 215 of the remote controller 200, a menu as illustrated in FIG. 25 is displayed.

Figure 25:
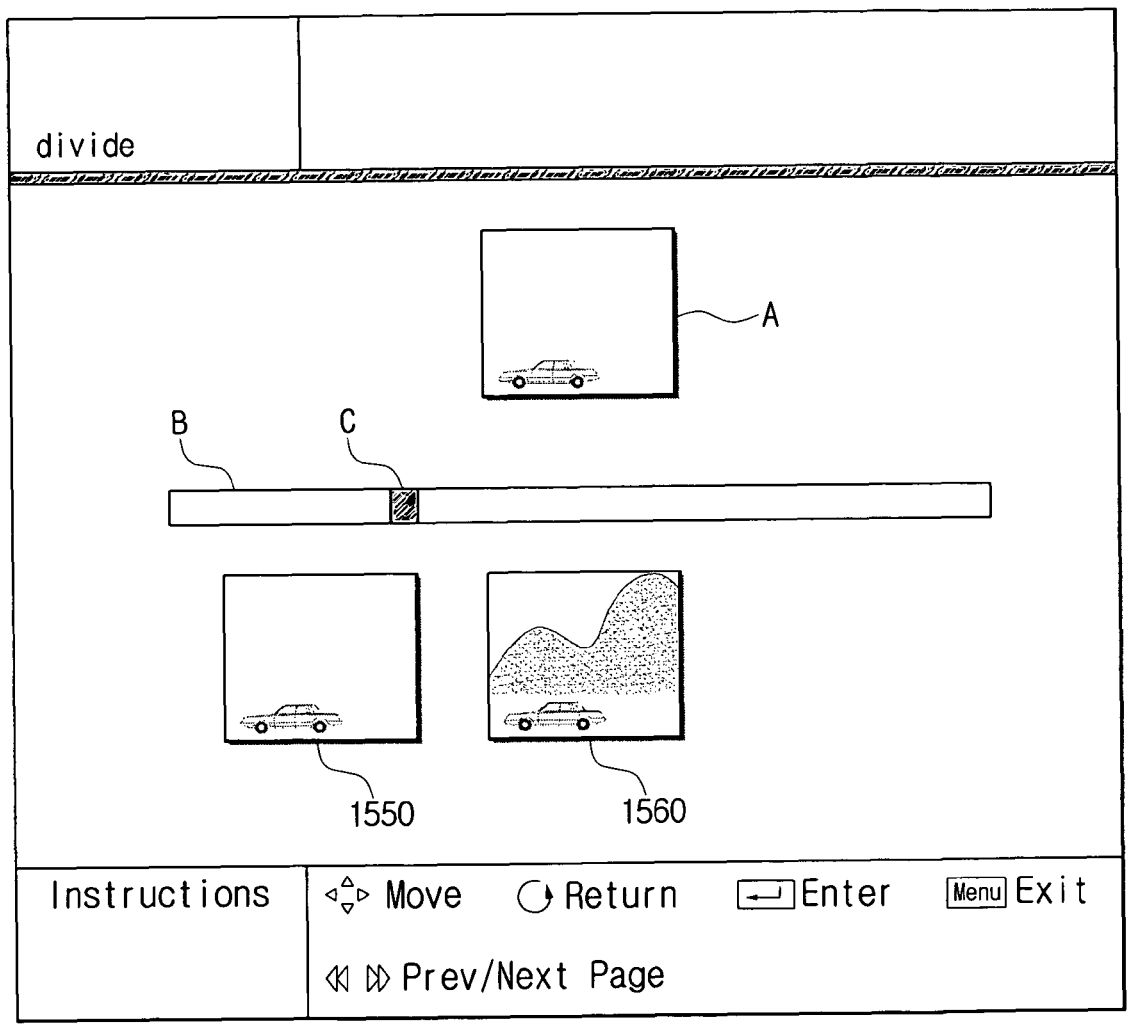

In FIG. 25, the reference numeral 'A' denotes a display window for displaying the selected file on the screen, 'B' a gauge bar, and 'C' a cursor for indicating a replay position of the file being reproduced in the display window 'A'.

The reference numerals 1550 and 1560 show frames reproduced when the enter key 221 is pressed in a state wherein the cursor is located in different areas. That is, the reference numeral 1550 denotes a still picture indicating the first frame of the selected file, and 1560 denotes an icon indicating the first frame of a divided area. Here, the size of the cursor 'C' is varied according to the replay time of the file in a manner that if the replay time of the file is short, the size of the cursor becomes small, while if the replay time of the file is long, the size of the cursor becomes large. If the replay-speed setting keys 213 and 215 are pressed, the moving speed of the cursor 'C' on a gauge bar 'B' is varied. At this time, in accordance with the frequency of pressing the low replay-speed setting key 213, the moving speed of the cursor 'C' is gradually reduced, while in accordance with the frequency of pressing the high replay-speed setting key 215, the moving speed of the cursor 'C' is gradually increased. Thus, the replay-speed setting keys 213 and 215 are used when an editor intends to rapidly search for a specified position of the file.

Figure 26:
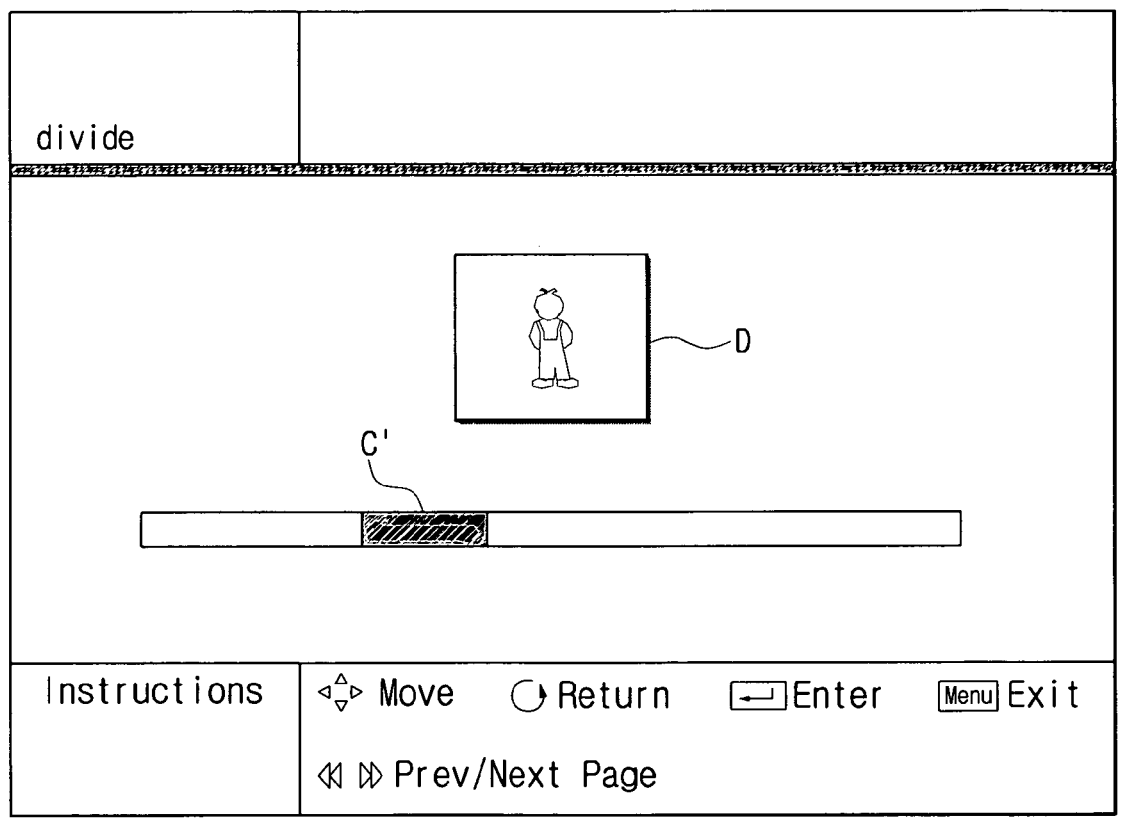
Figure 27:
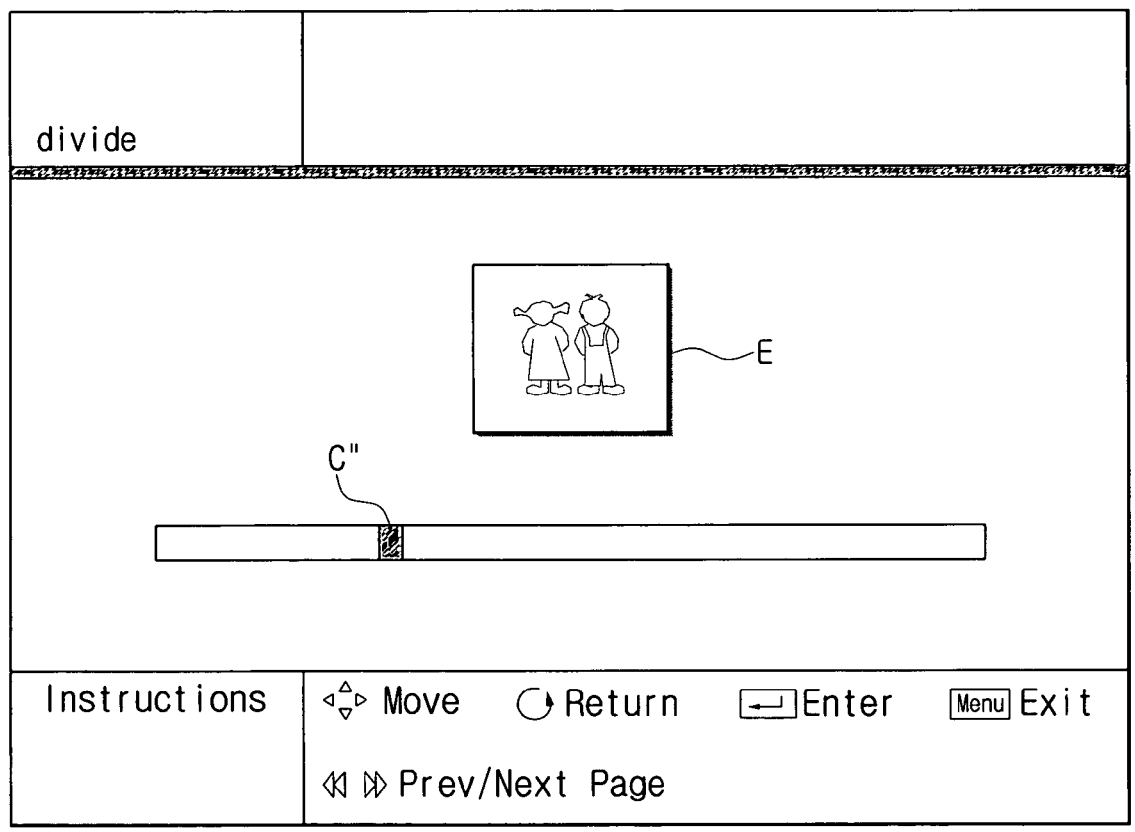

FIG. 26 shows an example menu displayed on the TV 300 when the still picture 1510 as illustrated in FIG. 24 is selected, and FIG. 27 shows an example menu displayed on the screen when the still picture 1530 as illustrated in FIG. 24 is selected.

In FIG. 26, the reference numeral 'D' is a display window for displaying the file corresponding to the still picture 1510 on a specified area of the screen. In FIG. 27, the reference numeral 'E' is a display window for displaying the file corresponding to the still picture 1530 on a specified area of the screen. Here, the file as illustrated in FIG. 26 is a file having a replay time of 30 minutes, and the file as illustrated in FIG. 27 is a file having a replay time of 3 hours.

As illustrated, the cursors C' and C" of FIGS. 26 and 27 have different sizes in accordance with the replay times of the files. Here, if the cursors have the same size irrespective of the replay times of the files, for example, if the sizes of the cursors as illustrated in FIGS. 26 and 27 are the same, the movement of the cursor C' should be very fast in comparison to that of the cursor C". However, although the size of the cursor becomes larger, the moving speed of the cursor is not greatly changed in comparison to that of the cursor C" as illustrated in FIG. 27. Accordingly, when editing the file while viewing the picture being reproduced on the display window, the editor can easily recognize the replay time of the file that is reproduced by the editor. Also, the speed of the cursor is not abruptly changed according to the replay times of the files, and this facilitates the editing work.

Hereinafter, with reference to FIGS. 28 to 31, a function of partially deleting a moving picture file according to the seventh embodiment of the present invention will be described.

Figure 28:
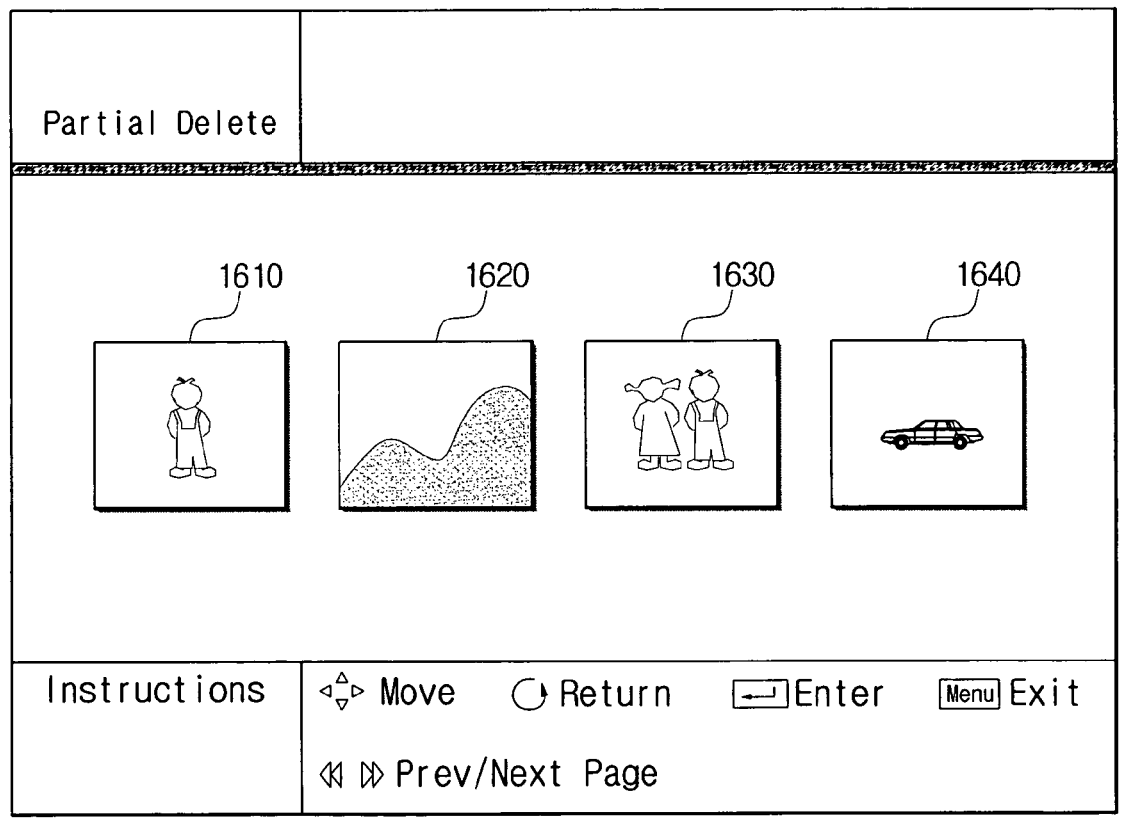
FIGS. 28 and 29 are views provided for illustrating an example menu 'Partial Delete' according to an embodiment of the present invention.

First, if the menu item 'Partial Delete' 513d is selected from among the menu items 513a to 513d as illustrated in FIG. 7, a menu 'Partial Delete' as shown in FIG. 28 is displayed on the TV 300.

In the menu 'Partial Delete' as illustrated in FIG. 28, the moving picture files recorded in the HDD 151 are displayed in the form of specified still pictures 1610 to 1640. The still pictures 1610 to 1640 are GOP data extracted from a specified part of the GOP data included in the respective moving picture files.

Figure 29:
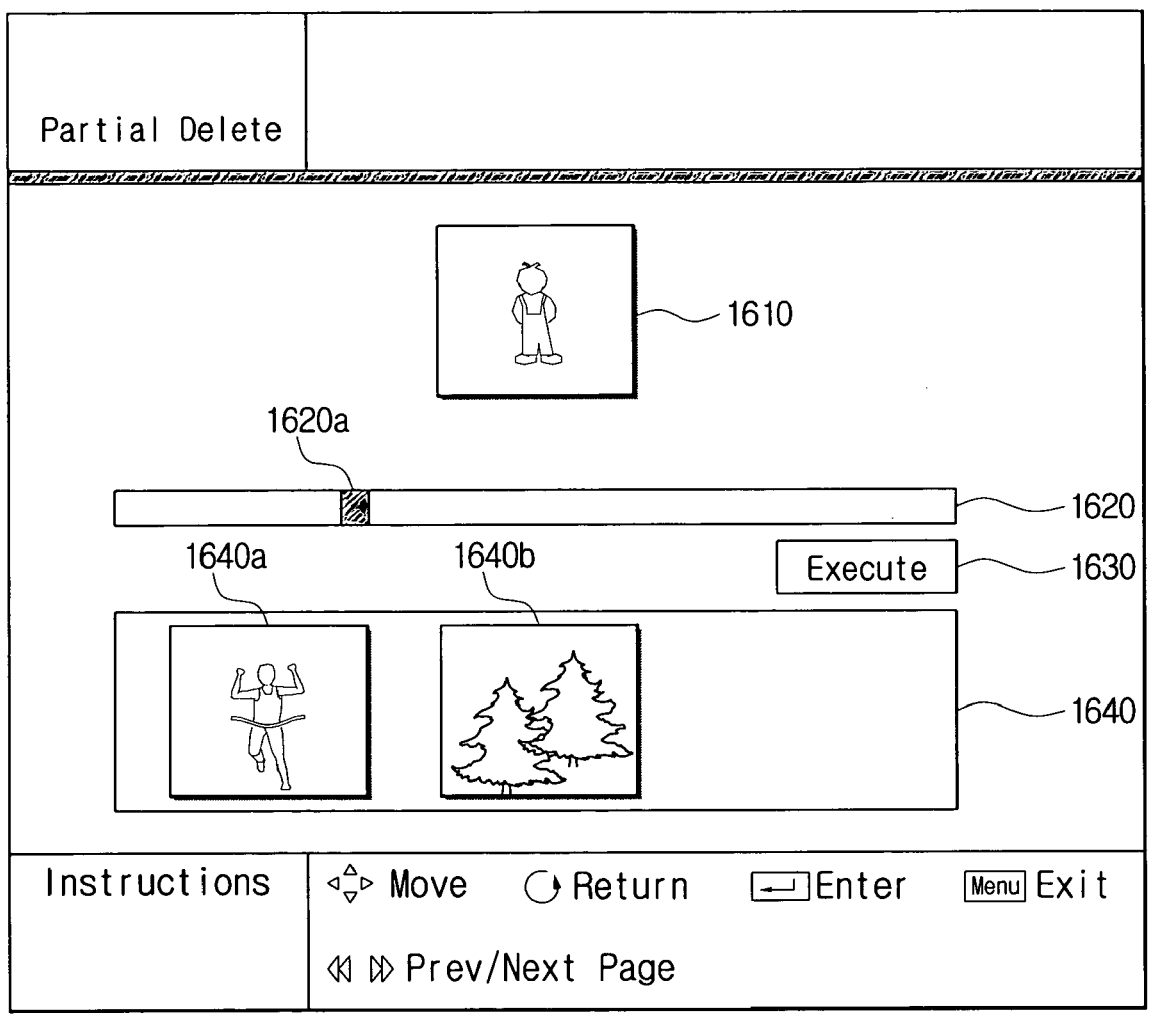

If any one of the still pictures 1610 to 1640 as illustrated in FIG. 28 is selected, a menu as illustrated in FIG. 29 is displayed on the screen.

In the menu of FIG. 29, a display window 1610 in which a moving picture file corresponding to the selected still picture is reproduced. Also shown is a gauge bar 1620 that corresponds to the length of the moving picture file displayed in the display window 1610, a cursor 1620a for indicating the replay time of the file being reproduced in the display window 1610, and an editing window 1640 for displaying the still pictures corresponding to the parts to be deleted from the reproduced video displayed in the display window 1610. Also, after completion of the partial deleting and editing, a menu 'Execute' 1630, which is an execution key for executing the partial deleting function, is displayed.

Hereinafter, the process of performing a partial deletion according to the embodiment of the present invention will be described in detail with reference to FIGS. 30 and 31.

First, if the menu item 'Partial Delete' 513d is selected from among the menu items 513a to 513d as illustrated in FIG. 7, the menu 'Partial Delete' as shown in FIG. 28 is displayed on the TV 300, in which the moving picture files 1610 to 1640 recorded in the HDD 151 are displayed (step S1711).

One of the moving picture files displayed in the menu 'Partial Delete' of FIG. 28 is selected (step S1713). The main control unit 160 reads out the moving picture file corresponding to the selected still picture from the HDD 151, and records the file in the second SDRAM 167 for the following partial deletion function. That is, the main control unit 160 controls the MPEG decoder 163 to decode the moving picture file recorded in the second SDRAM 167, and reproduces and displays the decoded moving picture file in the display window 1610 of the menu as illustrated in FIG. 29. That is, the selected moving picture file is reproduced and displayed in the display window 1610, and the cursor 1620a moves along the gauge bar 1620, which corresponds to the entire length of the moving picture file, in accordance with the replay position of the picture being reproduced in the display window 1610.

Any part of the file subject to deletion can be determined on the basis of the reproduced picture being displayed in the display window 1610, and at this time, the replay of the picture being displayed in the display window 1610 can be performed at a high speed.

The user selects the part subject to deletion while viewing the reproduced picture being displayed in the display window 1610. That is, if the picture corresponding to the start position of the part to be deleted is displayed in the displayed window 1610, the start position of the part to be deleted is selected by pressing the enter key 221 of the remote controller 200 (step S1717). Simultaneously with pressing the enter key 221, the picture corresponding to the selected start position is displayed in the editing window 1640 as a still picture 1640a (step S1719).

Thereafter, if the picture corresponding to an end position of deletion is displayed in the display window 1610, the end position of the deletion is selected by pressing the enter key 221 (step S1721). In addition, the picture corresponding to the selected end position is displayed in the editing window 1640 as a still picture 1640*b* (step S1723).

In the process as described above, the still pictures 1640*a* and 1640*b* of the start position and the end position, which correspond to the deleted part, are displayed in the editing window 1640 allowing the user to recognize the deleted part. Here, it is possible to select a plurality of deleted parts.

Then, if the menu 'Execute' 1630 is executed in order to delete the selected part displayed in the editing window 1640 (step S1725), the selected part displayed in the editing window 1640 is deleted (step S1729).

The partial deletion process as described above is from a viewpoint of the user, and the partial deletion process from a viewpoint of the image recording/reproducing apparatus will now be described with reference to FIG. 30.

Figure 30:
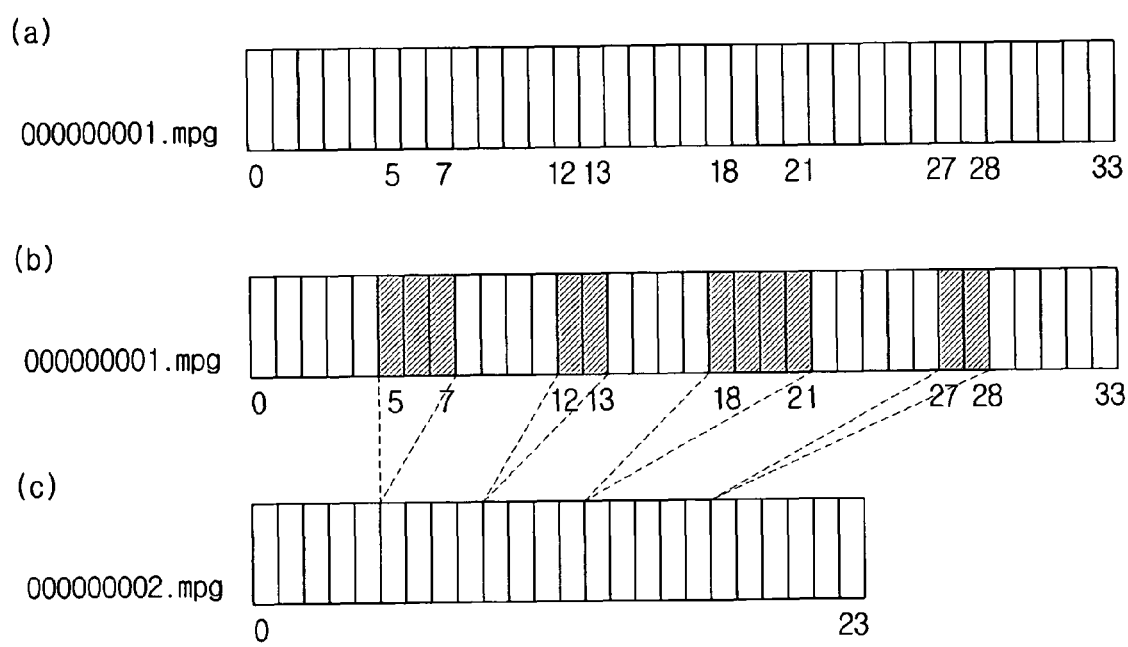
FIG. 30 is a view illustrating an example moving picture file being partially deleted according to an embodiment of the present invention.
Figure 31:
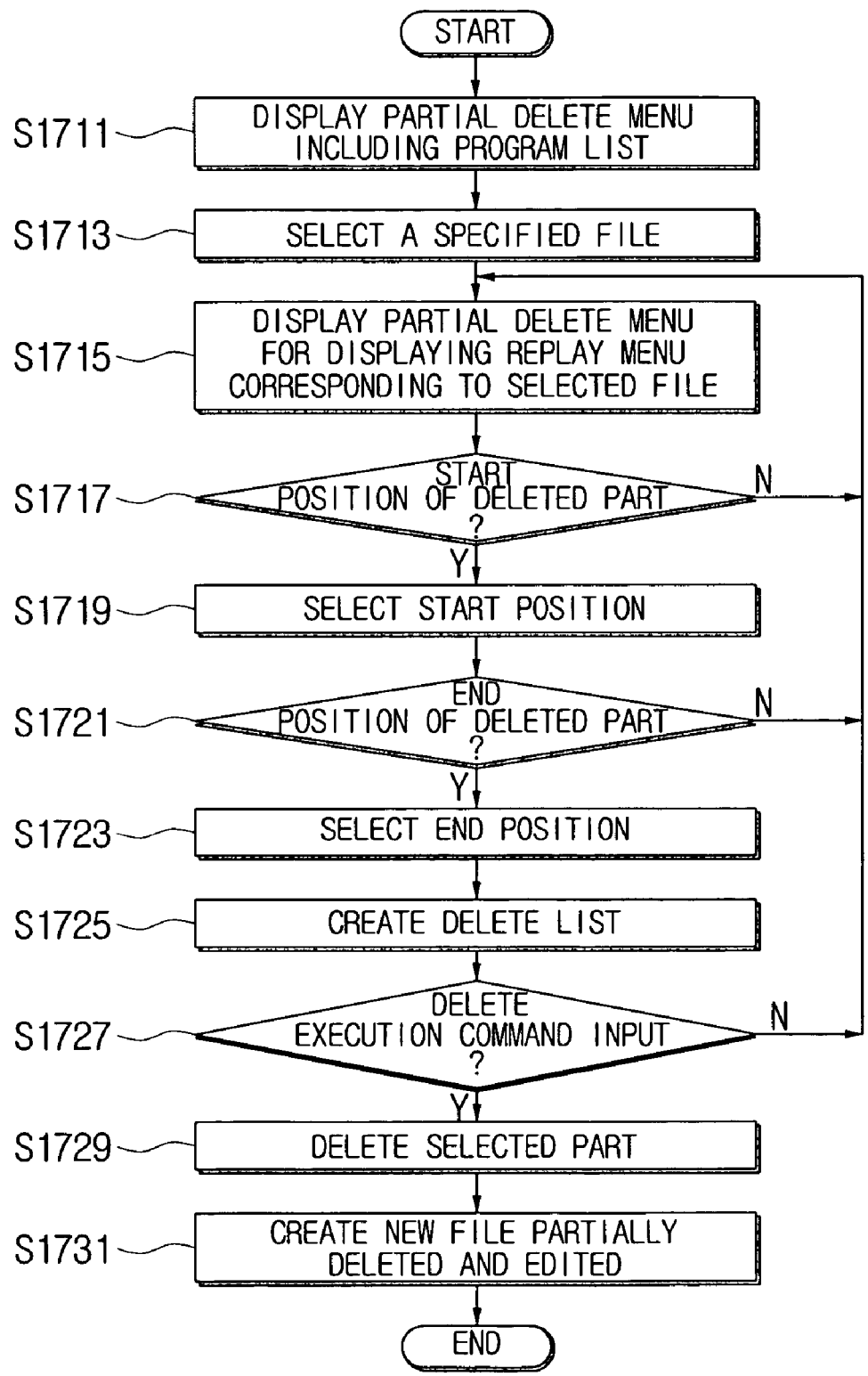
FIG. 31 is a flowchart provided for describing an example method of controlling an image recording/reproducing apparatus capable of partially deleting a moving picture file according to a seventh embodiment of the present invention.

In FIG. 30, (a) illustrates a moving picture file being presently reproduced in the display window 1610. The moving picture file is read out from the HDD 151 by the main control unit 160, and then recorded in the second SDRAM 167. The moving picture file has a file name of "000000001.mpg", and has a file structure composed of 0 to 33 GOP (one second=2GOP) data.

As shown as (b) in FIG. 30, a user may select partial deletion of the GOP numbers (5, 7), (12, 13), (18, 21) and (27, 28), with respect to the whole GOP data (i.e., 0 to 33 GOP data), of the moving picture file of "000000001.mpg". A deletion list generator (not illustrated) provided in the main control unit 160 generates a deletion list corresponding to the GOP number of the deleted parts by checking the GOP number of the selected deleted parts (step S1727). For example, the deletion list generator generates a list of the GOP numbers to be deleted (5, 6, 7, 12, 13, 18, 19, 20, 21, 27, 28).

Thereafter, if the menu 'Execute' 1630 is selected, the main control unit 160 deletes the GOP data corresponding to the deletion list by comparing the deletion list generated by the deletion list generator with the whole (i.e., 0 to 33) GOP numbers of the moving picture file "000000001.mpg" recorded in the second SDRAM 167 (step S1729).

Thus, a new moving picture file of "000000002.mpg" as shown as (c) in FIG. 30 is generated and stored in the second SDRAM 167 (step S1731). The main control unit 160 records the new file of "000000002.mpg" in the HDD 151.

As described above, since the parts subject to deletion can be selected with respect to the moving picture files recorded in the HDD 151, the editing function can be improved.

Hereinafter, with reference to FIGS. 32 to 36, a function of providing a display menu 'Play List' designed to enable a user to easily recognize the name of a folder in which an image file is recorded according to the eighth embodiment of the present invention will be described.

In order to systematically manage the image files being recorded in the HDD 151, the HDD has upper folders virtually divided and a plurality of lower folders depending on the upper folders. In this example, the respective files can be recorded in the HDD 151 so that they are located in the virtually divided upper folders or the lower folders of the HDD 151. Also, in the specified lower folders, not only a kind of file, for example, folders having the expander 'jpg', but also various kinds of files having the expander 'jpg' and/or 'mp3', can be recorded.

First, if the menu item 'HDD Play List' 531 is selected from among the menu items 531 to 534 as illustrated in FIG. 8, a list of the audio files among the files recorded in the HDD 151 is displayed on the TV 300 as shown in FIG. 32.

In the menu 'HDD Play List' of FIG. 32, 'Juke Box' is displayed on the first block of the upper area, and 'Root', which is the folder name of the uppermost folder of the HDD 151, is displayed in the second block. Also, the play list displayed in the intermediate area is composed of two lower folders of 'Classic' and 'Beatles', three mp3 files, and one wave file. That is, 125 audio files are recorded in the folder 'Root' of the HDD 151 in total, and in detail, two lower folders of 'Classic' and 'Beatles', three mp3 files, and one wave file are recorded in the folder 'Root'.

Here, if the lower folder named 'Beatles' is selected from among the play list as illustrated in FIG. 32, files (for example, 'I want to hold your hand', 'Hey Jude', 'Something', etc.) recorded in the lower folder 'Beatles' that is depending on the 'Root' folder as illustrated in FIG. 33 are listed. In addition, on the second block of the upper area of the play list menu, 'Beatles', the folder name of the selected lower folder, is displayed instead of 'Root', which is the folder name of the upper folder.

In the same manner, if the menu item 'HDD Play List' 541 is selected from among the menu items 541 to 544 as illustrated in FIG. 9, a list of the still picture files among the files recorded in the HDD 151 is displayed on the TV 300 as shown in FIG. 34.

In the menu 'HDD Play List' of FIG. 34, 'Photo Album' is displayed on the first block of the upper area, and 'Root', which is the folder name of the uppermost folder of the HDD 151 is displayed in the second block. Also, the play list displayed in the intermediate area is composed of two lower folders of 'Flower' and 'River', and three jpeg files.

Figure 35:
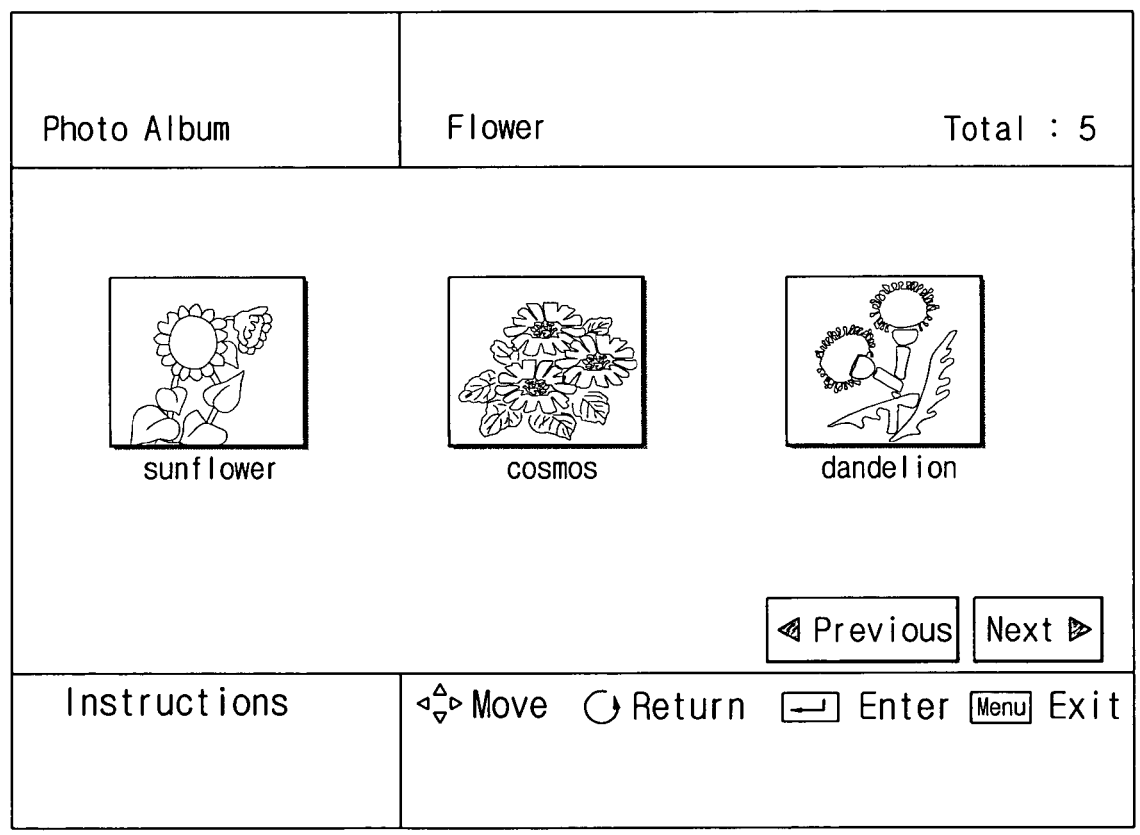
FIG. 35 is a view illustrating an example menu successively displayed on a TV screen when a folder 'Flower' of FIG. 34 is selected.

Here, if the lower folder named 'Flower' is selected from among the play list as illustrated in FIG. 34, the files (for example, 'sunflower', 'cosmos', and 'dandelion') recorded in the lower folder 'Flower' that is depending on the 'Root' folder as illustrated in FIG. 35 are listed. In addition, on the second block of the upper area, 'Flower', which is the folder name of the selected lower folder, is displayed instead of 'Root', which is the folder name of the upper folder.

Figure 36:
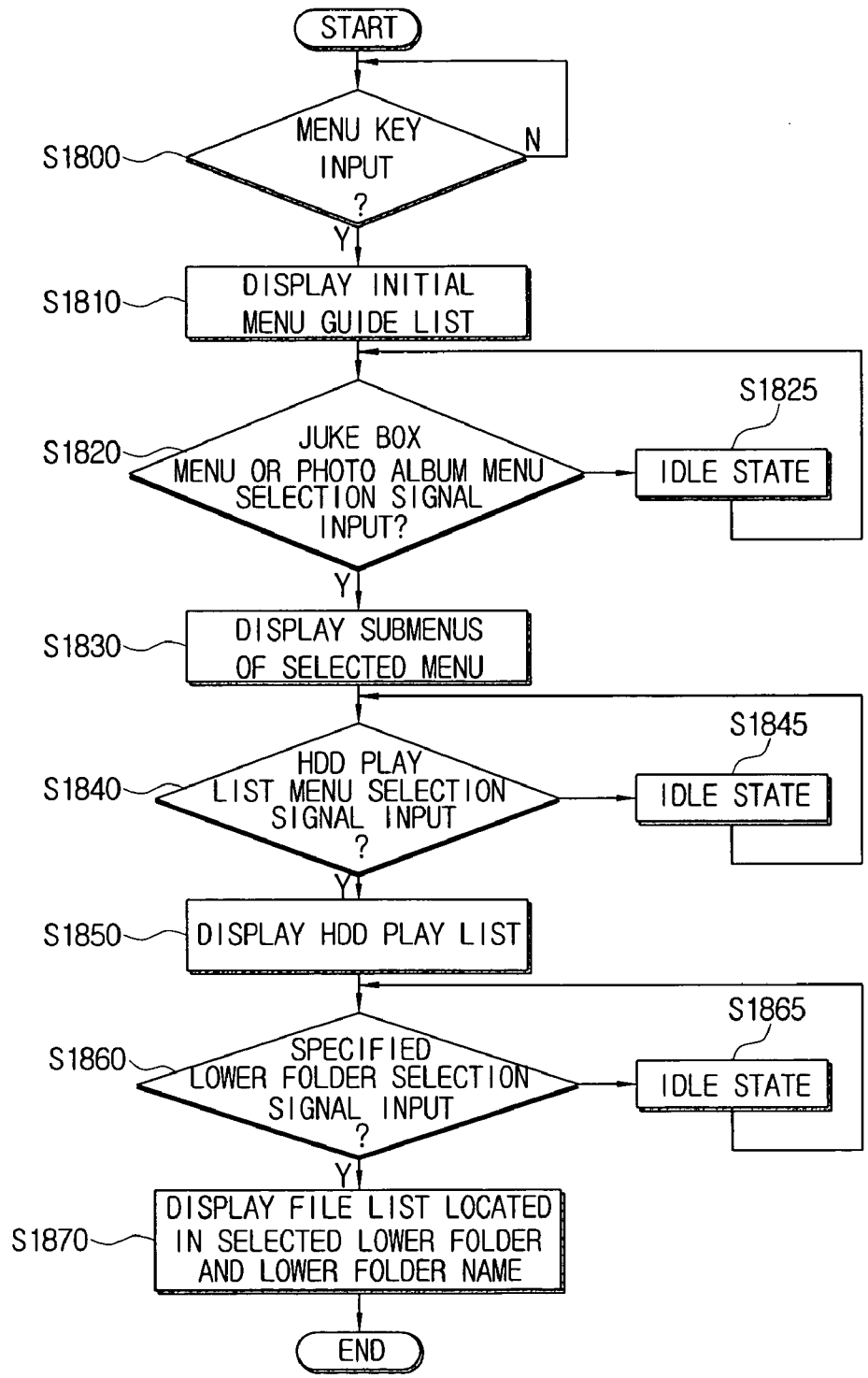
FIG. 36 is a flowchart provided for describing an example method of controlling an image recording/reproducing apparatus that provides a display menu 'Play List' designed to enable a user to easily recognize the name of a folder in which an image file is recorded according to an eighth embodiment of the present invention.

Now, with reference to FIG. 36, the method of controlling the image recording/reproducing apparatus that provides a display menu 'Play List' designed to enable a user to easily recognize the name of a folder in which an image file is recorded according to the eighth embodiment of the present invention will be described.

First, the initial menu as illustrated in FIG. 5 is displayed on the TV 300 by pressing the menu key 211 of the remote controller 200 (steps S1800 and S1810).

If the menu item 'Juke Box' 530 or the menu item 'Photo Album' 540 is selected from among the initial menu items 510 to 550 as illustrated in FIG. 5 (step S1820), the submenus of the selected menu item are displayed on the TV 300 (step S1830). For example, if the menu item 'Juke Box' 530 is selected at step S1820, the submenus of the menu item 'Juke Box' 530 are displayed on the TV 300 as shown in FIG. 8. Hereinafter, the case of selecting the menu item 'Juke Box' at step S1820 will be described as an example.

After performing step S1830, if the menu item 'HDD Play List' 531 is selected from among the menu items 531 to 534 as illustrated in FIG. 8, the HDD play list menu is executed (step S1840).

If the HDD play list is executed at step S1840, the main control unit 160 lists and displays the audio files recorded in the HDD 151 as illustrated in FIG. 32 in the intermediate area by changing the present menu (step S1850).

At step S1850, 'Juke Box' is displayed on the first block of the upper area of the HDD play list menu, and 'Root', which is the folder name of the uppermost folder of the HDD 151, is displayed in the second block. If a specified lower folder is selected in the state wherein lower folders of the folder 'Root' exist in the play list, the audio file list located in the selected lower folder and the folder name of the lower folder are displayed in the play list menu (step S1870).

For example, if the lower folder named 'Beatles' is selected from among the play list as illustrated in FIG. 32, the files recorded in the lower folder 'Beatles' that is depending on the 'Root' folder as illustrated in FIG. 33 are displayed. In addition, on the second block of the upper area of the play list menu, 'Beatles', which is the folder name of the selected lower folder, is displayed instead of 'Root', which is the folder name of the upper folder.

If the menu item 'Photo Album' is selected at step S1820, the menu as shown in FIG. 9 is displayed at step S1830. If the menu item 'HDD Play List' 541 is selected at step S1840, the play list menu as shown in FIG. 34 is displayed at step S1850. Then, if the lower folder named 'Flower' is selected from among the play list as illustrated in FIG. 34 at step S1860, the files recorded in the lower folder 'Flower' that is depending on the 'Root' folder as illustrated in FIG. 35 are listed. In addition, on the second block of the upper area of the play list menu, 'Flower', which is the folder name of the selected lower folder, is displayed instead of 'Root', which is the folder name of the upper folder.

Also, if respective input signals are not applied at steps S1820, S1840 and S1860, an idle state is maintained at steps S1825, S1845 and S1865.

At step S1870, the folder name of the selected lower folder can be displayed on the right side of the folder 'Root' under the control of the main control unit 160. It is also possible to display the folder name of the selected lower folder in other areas in addition to the second block of the upper area.

Hereinafter, with reference to FIGS. 37 to 42, a function of displaying a 'Play List' of an image file recorded in a recording medium on a screen, and easily and quickly selecting the file using the displayed 'Play List' according to the ninth embodiment of the present invention will be described.

First, if the menu item 'HDD Play List' 531 is selected from among the menu items 531 to 534 as illustrated in FIG. 8, a menu as shown in FIG. 32 is displayed on the TV 300 as shown in FIG. 32.

Then, if the lower folder named 'Beatles' is selected by moving the cursor, files (for example, 'I want to hold your hand', 'Hey Jude', 'Something', etc.) recorded in the lower folder 'Beatles' that is depending on the 'Root' folder as illustrated in FIG. 37 are listed. On the second block of the upper area of the play list menu, 'Beatles', which is the folder name of the lower folder selected instead of 'Root', which is the folder name of the upper folder, and the total number of files, for example, 'Total: 166', recorded in the lower folder 'Beatles' are displayed.

Then, the first page of the file list recorded in the folder is listed in the intermediate area of the play list menu. In one embodiment of the present invention, nine files at maximum can be listed for one play list menu. If the total number of files is set to 166, they are group numbered into 19 pages, each of which includes 9 files. In this case, the 19th page, (i.e., the last page), includes 4 files.

In FIG. 37, a page set as a default among the 19 grouped pages of the folder 'Beatles', which is typically the first page, is displayed. As illustrated, information on the 9 files included in the first page is listed. In the embodiment of the present invention, the file name, the kind of file and the file number are displayed. In the case of the moving picture files, the file information such the representative picture, recording date, recording length, etc., may be additionally displayed.

In the first menu, the cursor is located on the default position. The default position is normally the first file of the displayed list. In order to execute a desired file, the cursor should be moved to the file position. The up/down movement of the cursor is performed step by step according to the manipulation of the up/down direction keys 217 and 219 of the remote controller 200. That is, if the down direction key 219 of the remote controller 200 is pressed, the cursor moves one step downward as shown in FIG. 38.

However, in the case where many files are displayed in the menu, it may take a long time to move the cursor onto a desired file step by step. Therefore, in the embodiment of the present invention, the cursor can also be moved in the unit of a page using REW/FF keys 231 and 233 of the remote controller. That is, if the FF key 233 is pressed, the file list of the next page is displayed as illustrated in FIG. 39. Then, although the cursor is typically located in the default position, it is possible to move the cursor located in this position before the page movement. Also, if the REW key 231 is pressed in the state as illustrated in FIG. 39, the cursor is moved to the previous page as shown in FIG. 37. If the REW key 231 is pressed at the first page as shown in FIG. 37, the last page that includes four files is displayed on the screen as shown in FIG. 40.

That is, if the user presses the FF key 233 four times in order to select the 38th file among the 166 files, the fourth page is displayed. If the user presses the down direction key 219 twice at the fourth page, the cursor is located at the 38th file.

Also, if the right direction key 215 is pressed in the state wherein the cursor is located at a certain position as shown in FIGS. 37, 38 and 39, the cursor is moved to the last file of the last page. That is, the cursor is moved to and displayed on the 166th file that is the last file as shown in FIG. 40. Also, if the left direction 213 is input in the state wherein the cursor is located, the cursor is moved to and located at the first file of the first page. That is, the cursor is displayed on the first file as shown in FIG. 37.

Hereinafter, an example file list display method for an image recording/reproducing apparatus according to an embodiment of the present invention will be described.

Figure 41:
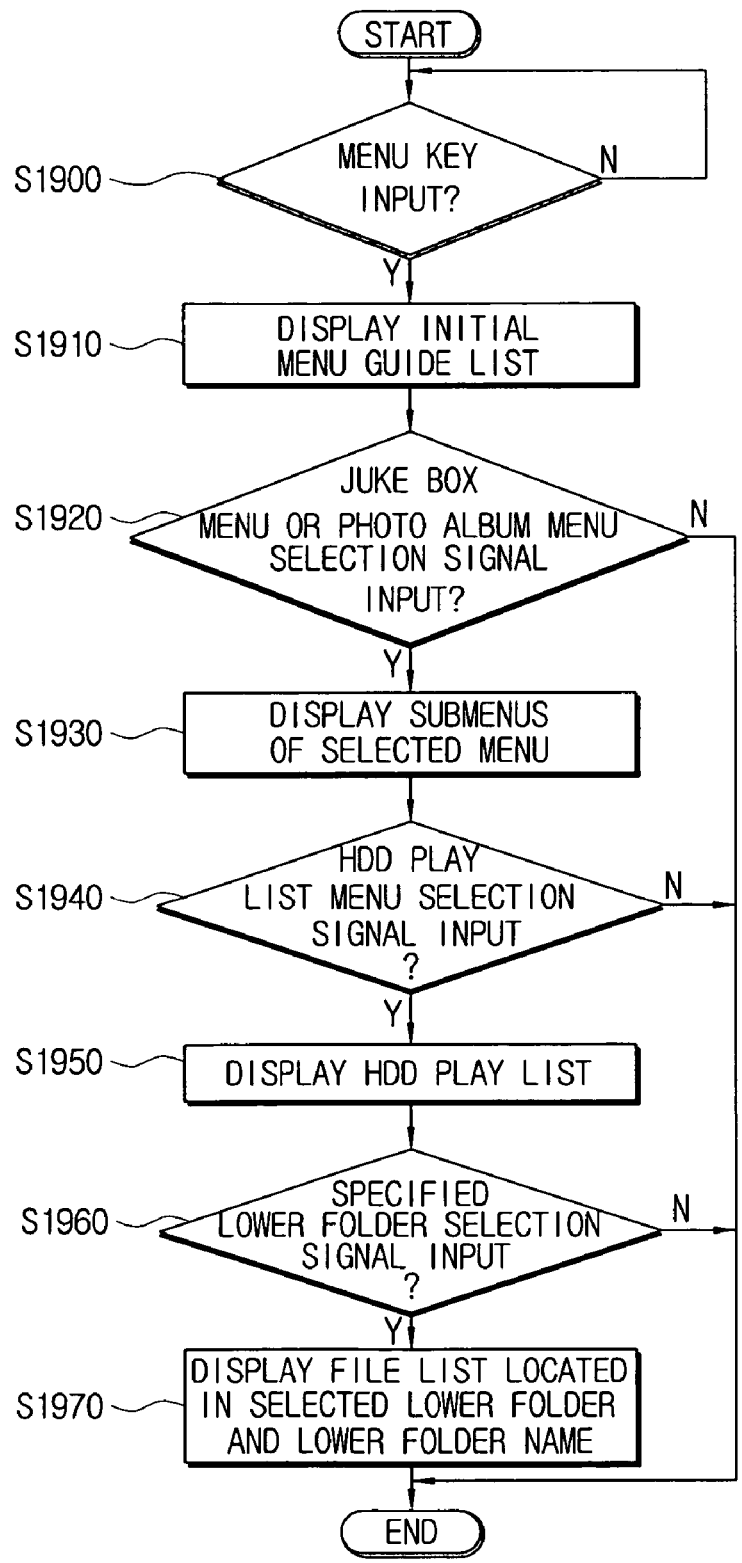
FIG. 41 is a flowchart provided for describing an example file list display method for an image recording/reproducing apparatus for indicating the file list of FIG. 37.

FIG. 41 is a flowchart provided for describing an example of the file list display method for the image recording/reproducing apparatus for indicating the file list of FIG. 37.

Referring to FIG. 41, in order to display the play list menu for the image file recorded in the HDD 151, the initial menu 400 as illustrated in FIG. 5 is displayed on the TV 300 by pressing the menu key 211 of the remote controller 200 (steps S1900 and S1910).

If the menu item 'Juke Box' 530 or the menu item 'Photo Album' 540 is selected from among the initial menu items 510 to 550 as illustrated in FIG. 5 (step S1920), the submenus of the selected menu item are displayed on the TV 300 (step S1930).

After performing step S1930, if the menu item 'HDD Play List' 531 is selected from among the menu items 531 to 534 as illustrated in FIG. 8, or if the menu item 'HDD Play List' 541 is selected from among the menu items 541 to 544 as illustrated in FIG. 9, the HDD play list menu is executed (step S1940).

If the HDD play list is executed at step S1940, the main control unit 160 lists and displays the audio files recorded in the HDD 151 as illustrated in FIG. 32 in the intermediate area by changing the present menu (step S1950).

If the lower folder of the folder 'Root' is selected from the play list (step S1960), the audio file list located in the selected lower folder and the folder name of the lower folder are displayed in the play list menu (step S1970).

Figure 42:
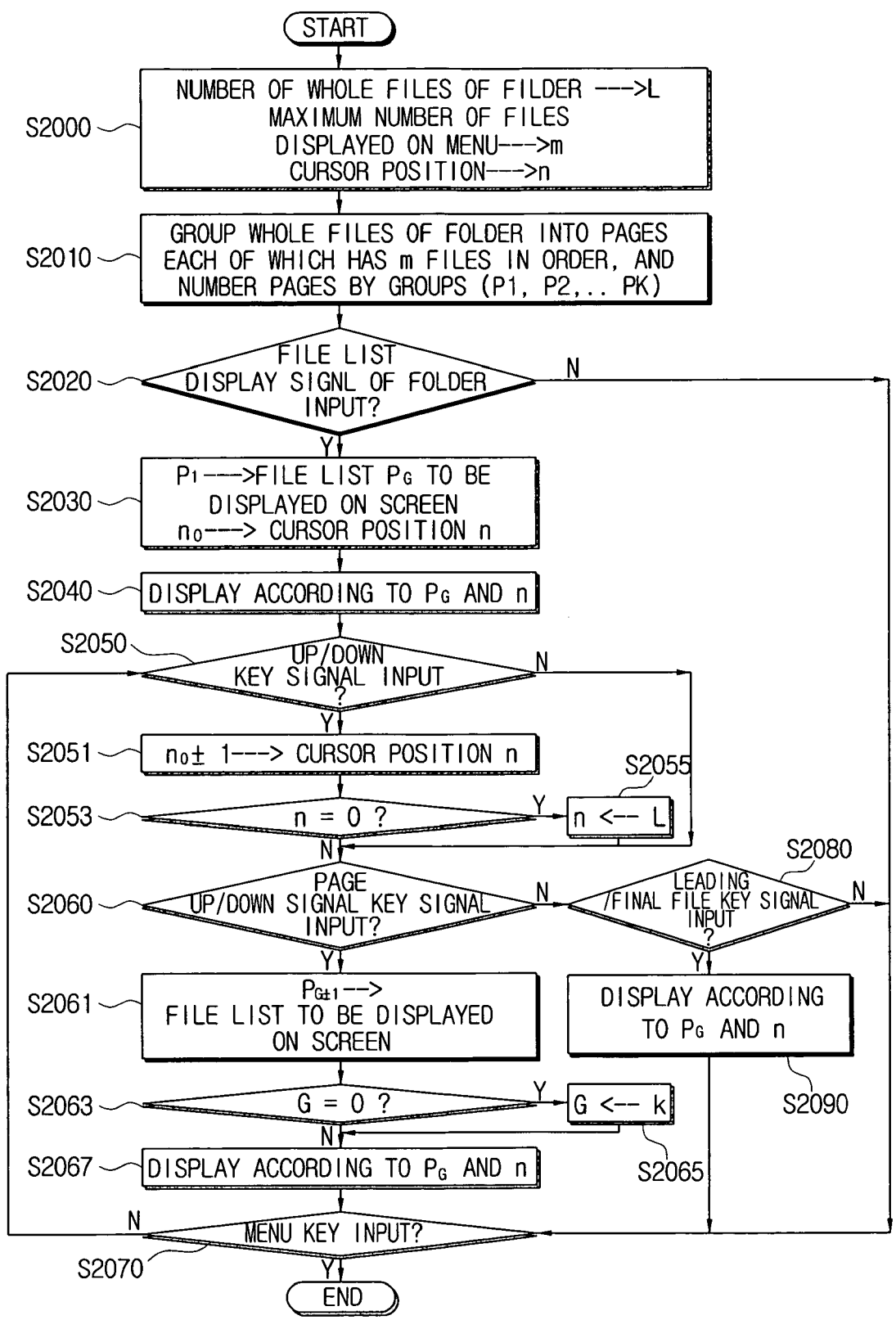
FIG. 42 is a flowchart provided for describing an example method of controlling an image recording/reproducing apparatus capable of displaying a 'Play List' of an image file recorded in a recording medium on a screen, and easily and quickly selecting the file using the displayed 'Play List' according to a ninth embodiment of the present invention.

Hereinafter, a method of controlling an image recording/reproducing apparatus capable of displaying the play list of an image file recorded in a recording medium on a screen, and easily and quickly selecting the file using the displayed play list according to the ninth embodiment of the present invention will be described with reference to FIG. 42.

First, the number (L) of files of the whole folder, the maximum number (m) of files displayed in the menu, and the position (n) of the cursor are respectively set (step S1900). Then, the whole files are grouped into a number (k) of pages, each of which has m files at maximum, and the grouped pages are numbered in order such as $P_1, P_2, \ldots, P_k$ (step S2010). For example, in the case of the folder 'Beatles' as illustrated in FIG. 37, the total number of files is set to 166, and the maximum number of files displayed in the menu is set to 9. Accordingly, the total number of pages is set to 19, and the last page includes four files. If the file list display signal of the folder is input after the files are grouped in the order of a page (step S2020), the file list of the first page $P_1$ is displayed. Accordingly, the play list includes the 9 files having the file numbers 1 to 9. The cursor is located on the default position $n_1$ (steps S2030 and S2040). In FIG. 37, the default position of the cursor is the position of the first file of the list.

If a signal of the up/down direction key 217 or 219 is input in the state wherein the file list is displayed (step S2050), the cursor moves from the default position to a position either one-step up or one-step down (step S2051). If a signal of the up direction key 217 is input in the state wherein n is 0, (i.e., in the state wherein the cursor is located in the position of the file number 1), the cursor is moved to the position of the last file $n_L$ (steps S2053 and S2055) as shown in FIG. 40.

If the signal of the page up/down key, which is indicated as the REW/FF key 231 or 233 of the remote controller 200, is input (step S2060), the pages to be displayed on the screen are moved page by page. In the embodiment of the present invention, the signal of the FF key 233 is used as the page down signal, and the signal of the REW key 231 is used as the page up signal. If the REW key 231 is input at the first page $P_1$, the page to be displayed becomes $P_0$, and $P_0$ is set as the last page $P_k$. Therefore, the last page $P_k$, which includes the file numbers 163, 164, 165 and 166, is set as the page $P_G$ to be displayed.

If the FF key 233 is input at the page $P_1$, the page to be displayed is set to $P_2$, and the file list menu that includes the file numbers 10 to 18 is displayed as illustrated in FIG. 39. At this time, the cursor is moved to the default position that is set to the position of the first file of the list as shown in FIG. 39. If the menu key signal is input in the state wherein the file list menu is displayed, the file list display mode is terminated.

Also, if a key signal of the front file or the final file, which is indicated by the left/right direction key 213 or 215 at step S2060, is input (step S2080), the cursor is moved to and located on the first file of the first page, or on the last file of the last page (step S2090). That is, if the left direction key 213 is input, the page or file on which the cursor is located is disregarded, and the cursor is moved to and located on the first file of the first page. Accordingly, irrespective of which page and which file the cursor is located on, the cursor is displayed on the first file as shown in FIG. 37. Also, if the right direction key 215 is input, the cursor is moved to and located on the last file of the last page.

Accordingly, by using the file list according to the embodiment of the present invention, a desired file to be selected from among the recorded files can be accessed more rapidly, and the file recorded in the folder can be easily recognized.

In the embodiment of the present invention, the menu item 'Juke Box' is taken as an example, but the menu item 'Digital Recorder' or 'Photo Album' can be applied in the same manner.

Hereinafter, with reference to FIGS. 43 to 47, a slide show function capable of providing information to the user more efficiently via the visual and auditory senses by displaying diverse still picture files while an audio file is reproduced according to a tenth embodiment of the present invention will be described.

The slide show is defined as an alternate display of diverse still pictures to match a specified interval while an audio file, such as music, is reproduced. Also, the still picture files and the audio files are recorded in an upper folder 'Root' or in lower folders of the upper folder. The audio files may be located in the same folder as the still picture files being displayed when the slide show is implemented, or may be applied to all the still picture files recorded in the recording medium.

First, if the menu item 'HDD Play List' 531 is selected from among the menu items 531 to 534 as illustrated in FIG. 8, a menu 'HDD Play List' as shown in FIG. 43 is displayed on the TV 300.

In the same manner, if the menu item 'CD Play List' 533 is selected from among the menu items 531 to 534 as illustrated in FIG. 8, a play list menu (not illustrated) for providing an audio file list recorded in the CD is displayed.

Referring to FIG. 43, the HDD play list is composed of lower folders 'Classic' and 'Beatles' of the folder 'Root' and a plurality of files 'mp3'. A desired audio file can be selected by manipulating the enter key 221 after moving the cursor to the audio file to be reproduced. The selected audio file can be recognized by the check mark (v) marked near the audio file name.

Figure 44:
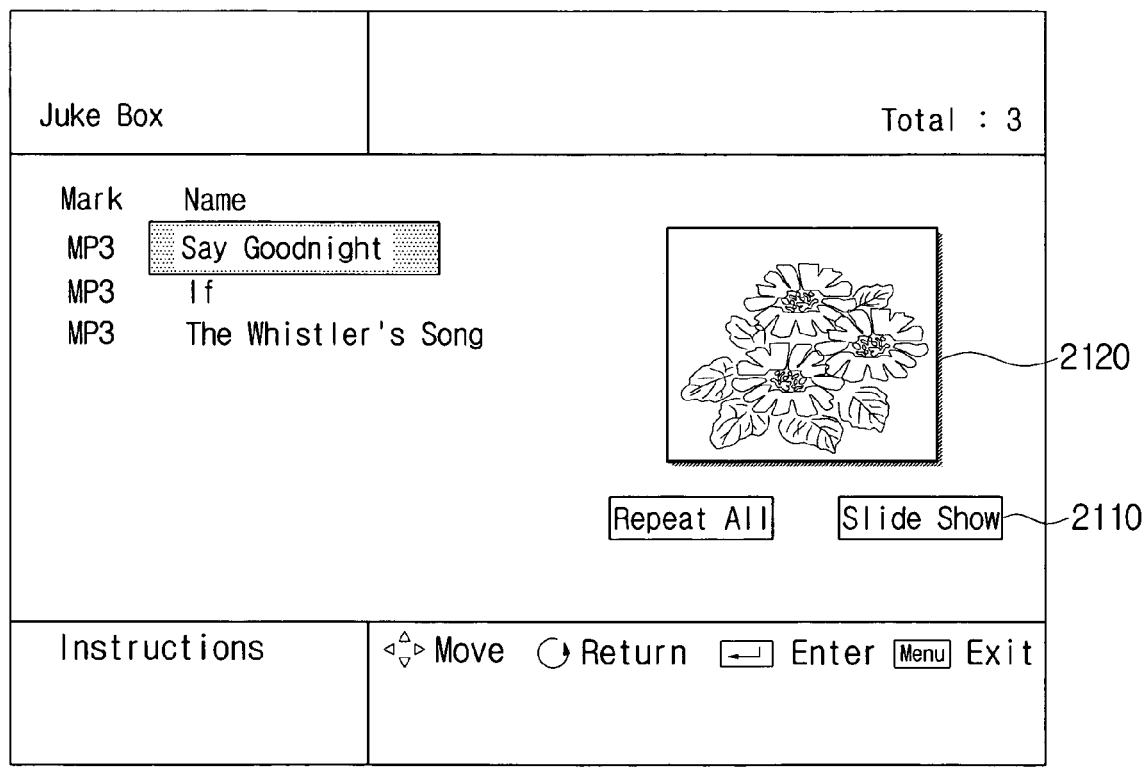
FIG. 44 is a view illustrating an example menu that indicates a sound file selected from a sound file list of FIG. 43.

If a replay command of the selected audio files is applied, the menu as shown in FIG. 44 is displayed on the TV 300, and the selected audio files are reproduced in a specified order. FIG. 44 is a view illustrating an example play list menu in which the list of the selected audio files is displayed.

Referring to FIG. 44, in the intermediate area of the play list menu, a menu is provided (not illustrated) including a list of the selected audio files, a menu 'Slide Show 2110 for implementing a slide show, and brief information (for example, singer, composer, words, announcement date, etc.) on the audio file being presently reproduced.

Figure 45:
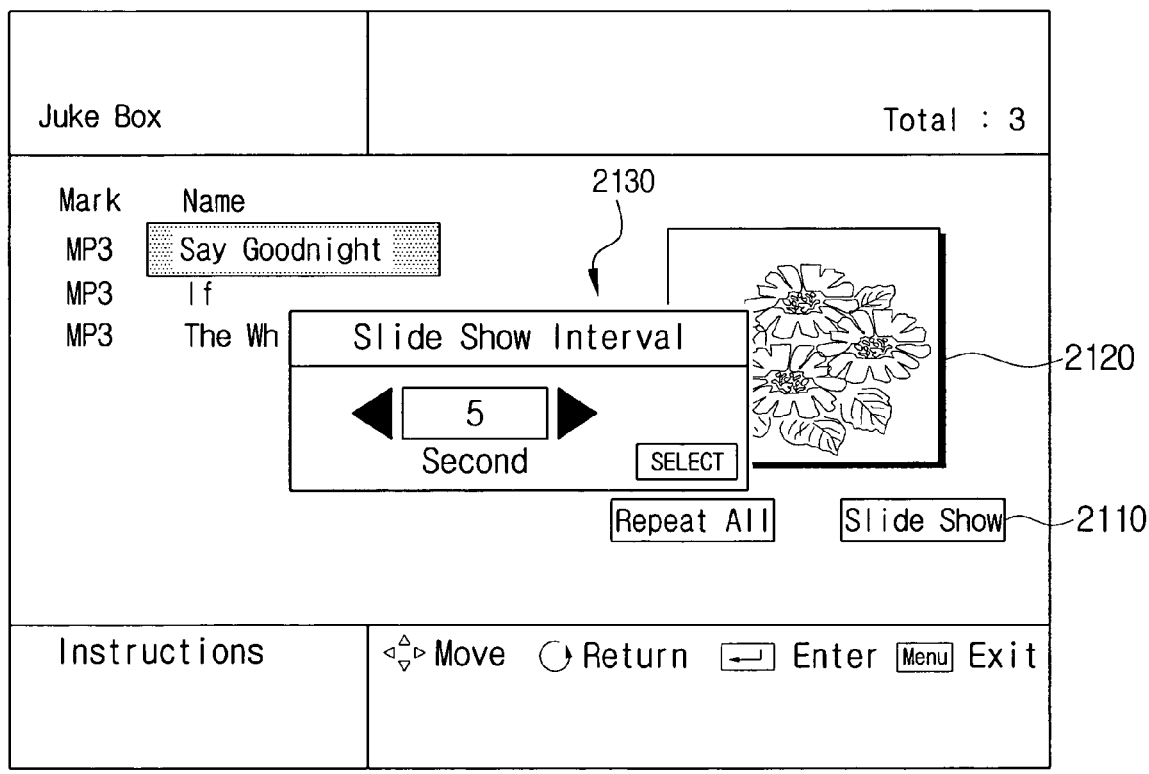
FIG. 45 is a view illustrating an example menu that indicates an interval setting menu successively displayed when a menu 'Slide Show' as illustrated in FIG. 44 is selected.

While the selected audio files are reproduced in the specified order, the play list menu as shown in FIG. 44 is displayed on the TV 300. At this time, if the user selects the menu 'Slide Show' 2110 by manipulating the remote controller 200 in order to implement the slide show, an interval setting menu 2130 as shown in FIG. 45 is displayed on the TV 300.

The interval setting menu 2130 is provided for setting a display interval of the still picture alternately displayed in the slide show window 2120. In the menu of FIG. 45, the display interval (in the unit of a second) can be set through manipulation of icons indicated as '<' and '>'. For example, if the icon indicated as '<' is selected, the display interval is shortened, while if the icon indicated as '>' is selected, the display interval is lengthened.

Also, if the enter key of the remote controller 200 is pressed, the display interval is finally set, and the slide show function is executed. That is, the slide show is executed in the slide show window 2120, and a plurality of still pictures are alternately displayed for the set display interval.

The files for a plurality of still pictures used for the slide show are recorded in the same folder as the audio files selected for replay or the audio files being presently reproduced. For example, if the number of still picture files recorded in the same folder as the files of the play list menu of FIG. 44 is set to 5 in total, the 5 still picture files are successively displayed for the set display interval as the slide show is performed.

Thus, the audio files displayed in the play list menu are reproduced in the specified order while the slide show of the still pictures is executed in the specified order.

The decoding of the still picture files for executing the slide show will be described in greater detail below with reference to FIG. 47.

Figure 46:
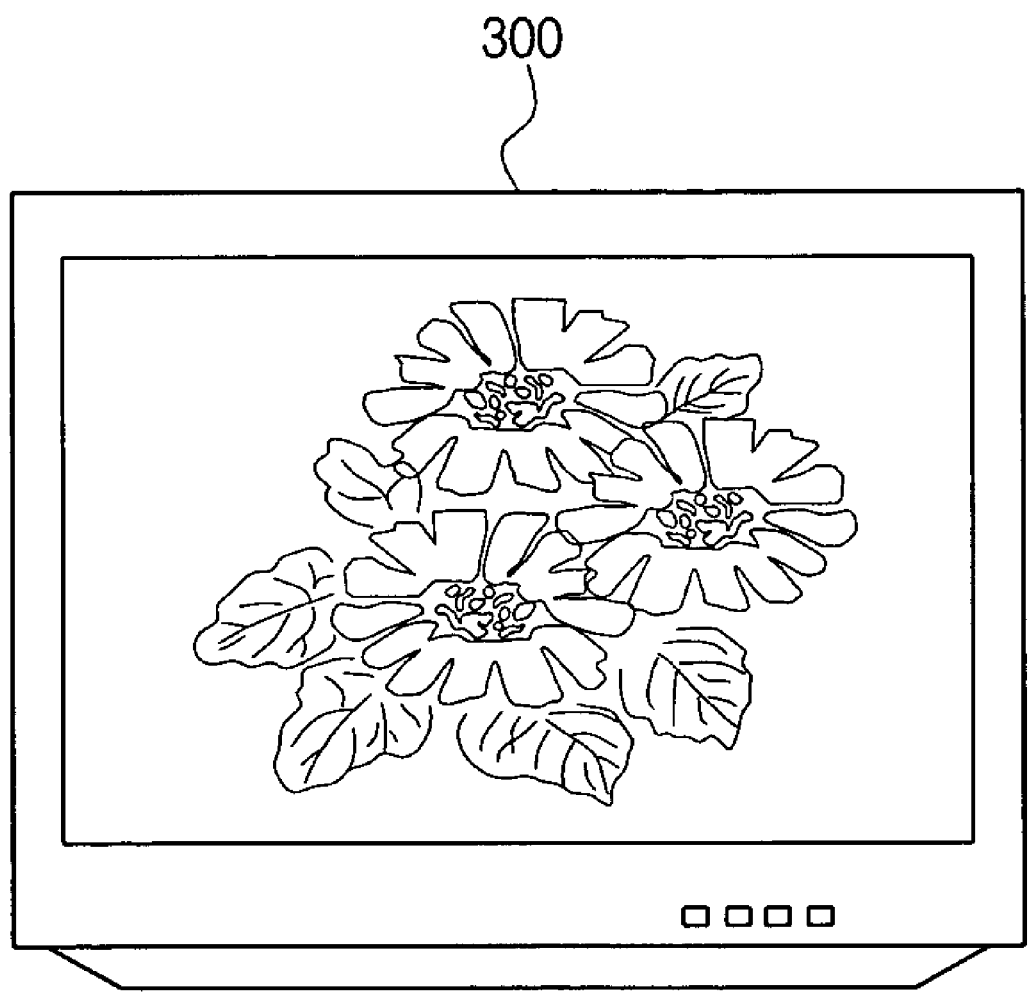
FIG. 46 is a view provided for illustrating an example slide show of a full screen according to an embodiment of the present invention.

If the slide show window 2120 is selected by manipulating the remote controller 200 while the slide show is executed, it is possible to display the still picture in full screen on the TV 300 as shown in FIG. 46. That is, the specified still picture is enlarged to match the whole size of the TV 300, and at this time it is displayed, being superimposed with the play list menu. It is preferable to proceed with the slide show after the full screen is executed. The full screen can be released by manipulating the remote controller 200.

Figure 47:
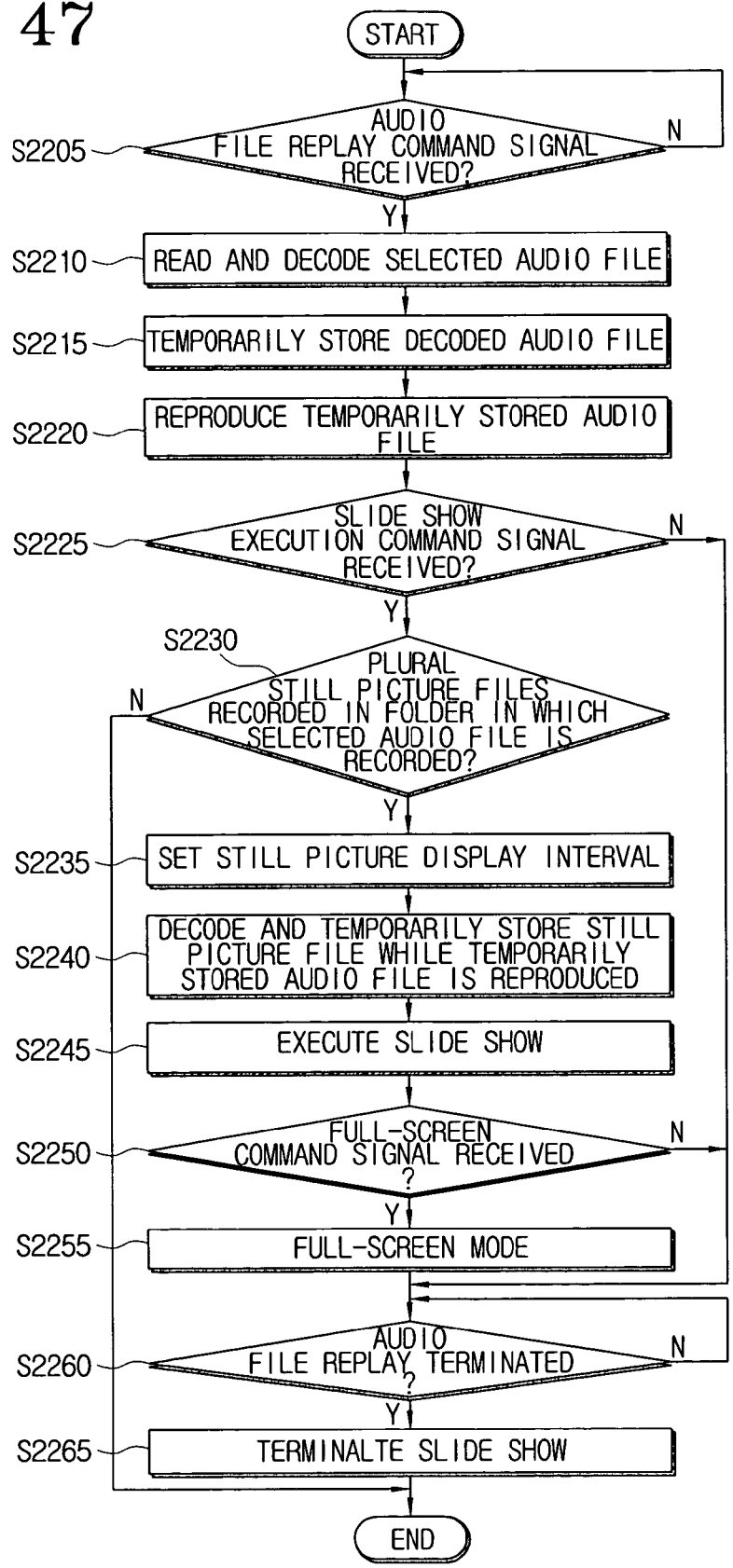
FIG. 47 is a flowchart provided for describing an example method of controlling an image recording/reproducing apparatus that has a slide show function for displaying diverse still picture files, while a music file is reproduced according to a tenth embodiment of the present invention.

FIG. 47 is a flowchart provided for describing an example method of controlling an image recording/reproducing apparatus that has a slide show function for displaying diverse still picture files while music files are reproduced according to the tenth embodiment of the present invention.

First, if the menu item 'HDD Play List' 531 is selected from among the menu items 531 to 534 as illustrated in FIG. 8, a HDD play list menu as shown in FIG. 43 is displayed on the TV 300.

If a replay command signal is input after the audio file to be reproduced is selected by the manipulation of the remote controller 200 in the play list menu as illustrated in FIG. 43 (step S2205), the main control unit 160 lists the play list menu of FIG. 44 on the TV 300.

Also, if step S2205 is performed, the main control unit 160 reads out the selected audio files, and successively decodes the selected audio files by controlling the MPEG decoder 163 (step S2210).

The main control unit 160 temporarily stores the decoded audio files in the second SDRAM 267. Generally, the 'mp3' audio file is decoded by a bit rate of 128 kbps, and then temporarily recorded.

The temporarily recorded audio file is converted into an analog signal by the audio D/A conversion unit 135, and then reproduced through a specified output terminal and speakers (not illustrated) (step S2220).

For example, if the replay command for three audio files is received as shown in FIG. 44, step S2210 successively decodes 'Say Goodnight', 'If', and 'The Whistler's Song', and temporarily records the respective audio files in the second SDRAM 167 in the order of decoding. Also, when 'If' is decoded, 'Say Goodnight' which was temporarily recorded is D/A-converted and reproduced.

If the menu 'Slide Show' 2110 as shown in FIG. 44 is selected through the remote controller 200 while the temporarily recorded audio file is reproduced at step S2220, the main control unit 160 confirms whether a plurality of still picture files are recorded in the folder in which the selected audio files 'Say Goodnight', 'If' and 'The Whistler's Song' are recorded (step S2230).

If it is confirmed that a plurality of still picture files are recorded in the folder in which the audio files are recorded at step S2230, the main control unit 260 displays the interval setting menu 2130 as illustrated in FIG. 45. Then, if the display interval of the still pictures is set through manipulation of the remote controller 200 (step S2235), the main control unit 160 controls the MPEG decoder 163 to successively decode a plurality of still picture files recorded in the same folder, and temporarily stores the decoded still picture files in the second SDRAM 167 (step S2240).

At step S2240, it is preferable that if the display interval is not set through the manipulation of the remote controller 200, the main control unit 160 performs a control operation to proceed with the slide show with the display interval preset to the default value.

At step S2240, if the audio files are not decoded and the MPEG decoder 163 is in an idle state, the main control unit 160 performs a control operation to decode the still picture files. That is, while the temporarily recorded audio file is reproduced, the main control unit 160 decodes and temporarily stores the still picture files.

At this time, if there is no recording space for temporarily recording the specified still picture files decoded at step S2240, the main control unit 160 temporarily records the decoded still picture files when the temporarily recorded audio file is reproduced and the recording space is recreated.

Also, the temporarily recorded still picture files are encoded by the video encoder 137, and then reproduced on the TV 300 (step S2245). That is, a plurality of still picture files recorded in the same folder as the audio files selected and reproduced, are successively decoded and temporarily recorded, and then alternately displayed on the screen for the display interval set at step S2235, so that the slide show is executed.

Also, in order to alternately display a plurality of still pictures for the set display interval, the main control unit 160 controls the MPEG decoder 163 to repeat the successive decoding of a plurality of still picture files.

If the slide show window 2120 is selected through manipulation of the remote controller 200 during the execution of the slide show at step S2245 (step S2250), the main control unit 160 enlarges the executed still picture in full screen (step S2255). That is, the still picture is enlarged to match the size of the TV 300 under the control of the main control unit 160, and is displayed and superimposed with the play list menu. It is preferable that the slide show is performed after the full-screen mode is executed. The full screen can be released through manipulation of the remote controller 200.

If the replay of the selected audio filed is terminated during the execution of step S2230 or S2255 (step S2260), the main control unit 160 also terminates the slide show (step S2265). Also, if the replay of the selected audio files is terminated during the execution of step S2230 or S2255 (step S2260), the main control unit 160 continues the slide.

A plurality of still pictures for implementing the slide show may be recorded in the same folder as the audio files presently selected, and the slide show may be implemented by selecting a plurality of still picture files among the still picture files recorded in the recording medium.

As described above, if the slide show function is selected while the audio file is reproduced, a plurality of still picture files are successively and repeatedly decoded and output when the MPEG decoder 163 is in an idle state, such that the information can be transferred to the user more efficiently via the visual and auditory senses without adding a separate appliance.

Hereinafter, with reference to FIGS. 48 to 51, a function of automatically reproducing files that can be automatically reproduced, such as a DVD or CD inserted in the disc player 155, according to an eleventh embodiment of the present invention will be described.

Figure 48:
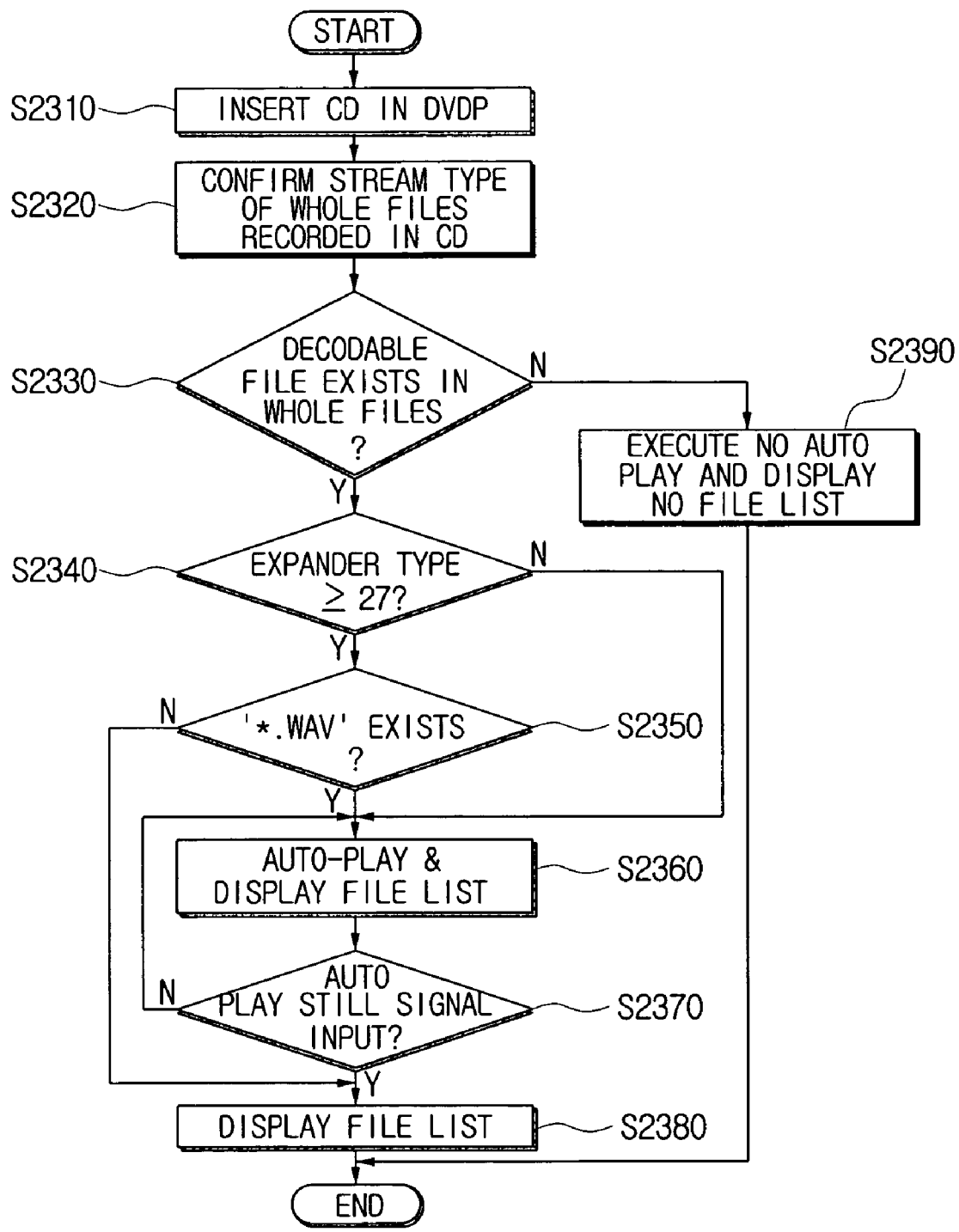
FIG. 48 is a flowchart provided for describing an example method of controlling an image recording/reproducing apparatus capable of automatically reproducing files, irrespective of the kinds of the files, when a recording medium containing the files that can be automatically reproduced is inserted into the apparatus according to an eleventh embodiment of the present invention.

FIG. 48 is a flowchart provided for describing a method of controlling an image recording/reproducing apparatus capable of automatically reproducing files, irrespective of the kinds of the files, when a recording medium containing the files which can be automatically reproduced is inserted into the apparatus according to the embodiment of the present invention. FIGS. 49 to 51 are views illustrating menus 'File List' and 'Auto Play List' displayed on the TV 300 when a disc is inserted into the disc player 155.

First, a plurality of files having diverse expanders can be recorded in the disc such as a DVD or CD. For example, a plurality of files having different expanders such as 'mp3', 'wma', 'wav', etc, can be recorded in one disc even though they are the same audio files. Also, files having different properties such as moving picture files or still picture files, text files, etc., as well as audio files, may be recorded in one disc.

If a disc such as a CD is inserted into the disc player 155, the main control unit 160 confirms the stream types of the whole files recorded in the disc when the disc player 155 is loaded (steps S2310 and S2320). This is possible because it can be judged, according to the stream types, whether the whole files recorded in the disc can be decoded.

If it is judged that the decodable files among the plurality of files recorded in the disc exist according to the stream type confirmed at step S2320 (step S2330), the main control unit 160 confirms whether the decodable files have at least two expander types (step S2340).

If it is confirmed that the decodable files have at least two expander types at step S2340, the main control unit judges whether any files that can be automatically reproduced exist among the decodable files (step S2350). A representative file that can be automatically reproduced may be an audio file recorded by an expander 'wav'.

That is, if a file '*.wav' exists among the decodable files at step S2350, the main control unit 160 performs a control operation to automatically reproduce the file '*.wav', and provides a list of the decodable files as shown in FIG. 49 (step S2360).

The decodable files displayed in the intermediate area of the file list menu, as illustrated in FIG. 49, have diverse expanders (for example, at least two among 'wav', 'mp3', 'jpg' and 'mpg'), and if any file having the 'wav' expander which can be automatically reproduced exists among the decodable files, the main control unit 160 controls the digital audio signal output terminal 117 to automatically reproduce the file having the 'wav' expander.

Then, if an automatic replay stopping signal is received through the manipulation of the remote controller 200 during the execution of step S2360, the main control unit 160 stops the replay of the '*.wav' music file, and displays only the file list menu as shown in FIG. 49 on the TV 300.

If it is confirmed that the decodable files have only one expander type at step S2340, the main control unit 160 performs a control operation to automatically reproduce the files recorded in the disc, and as shown in FIG. 50, provides the list of automatically reproduced files (step S2360).

In FIG. 50, if the expander of the files recorded in the disc, which can be decoded and automatically reproduced, is only of one type (for example, one among 'wav', 'mp3', 'jpg' and 'mpg'), the file name is displayed in the intermediate area of the automatic replay list menu.

The automatic replay list menu of FIG. 50 corresponds to the case where the files having only the 'wav' expander, which can be automatically reproduced, are recorded in the disc inserted in the disc player 155. That is, at step S2340, the main control unit 160 can perform a control operation to automatically reproduce the files having one expander type such as 'wav', 'jpg', etc.

Also, if it is judged that no decodable file exists in the files recorded in the disc at step S2330, the main control unit 160 does not execute the automatic replay, and provides a menu as shown in FIG. 51 (step S2390).

In FIG. 51, as no decodable file is recorded in the disc, no file list is displayed in the intermediate area of the file list menu.

According to the automatic reproducing method of the image recording/reproducing apparatus 100, if it is confirmed that there are files having other expanders in addition to the 'wav' expander at step S2350, the main control unit 160 can give priorities to the different expander types, and automatically reproduce the files according to the priorities. For example, in the case where diverse files having the 'wav' and 'mp3' expanders are recorded in the disc, the main control unit 160 automatically reproduces the files having the 'wav' expander first, and then the files having the 'mp3' expander.

Hereinafter, with reference to FIG. 52, a function of displaying additional information on a music CD on a screen when the music CD is reproduced according to a twelfth embodiment of the present invention will be described.

Figure 52:
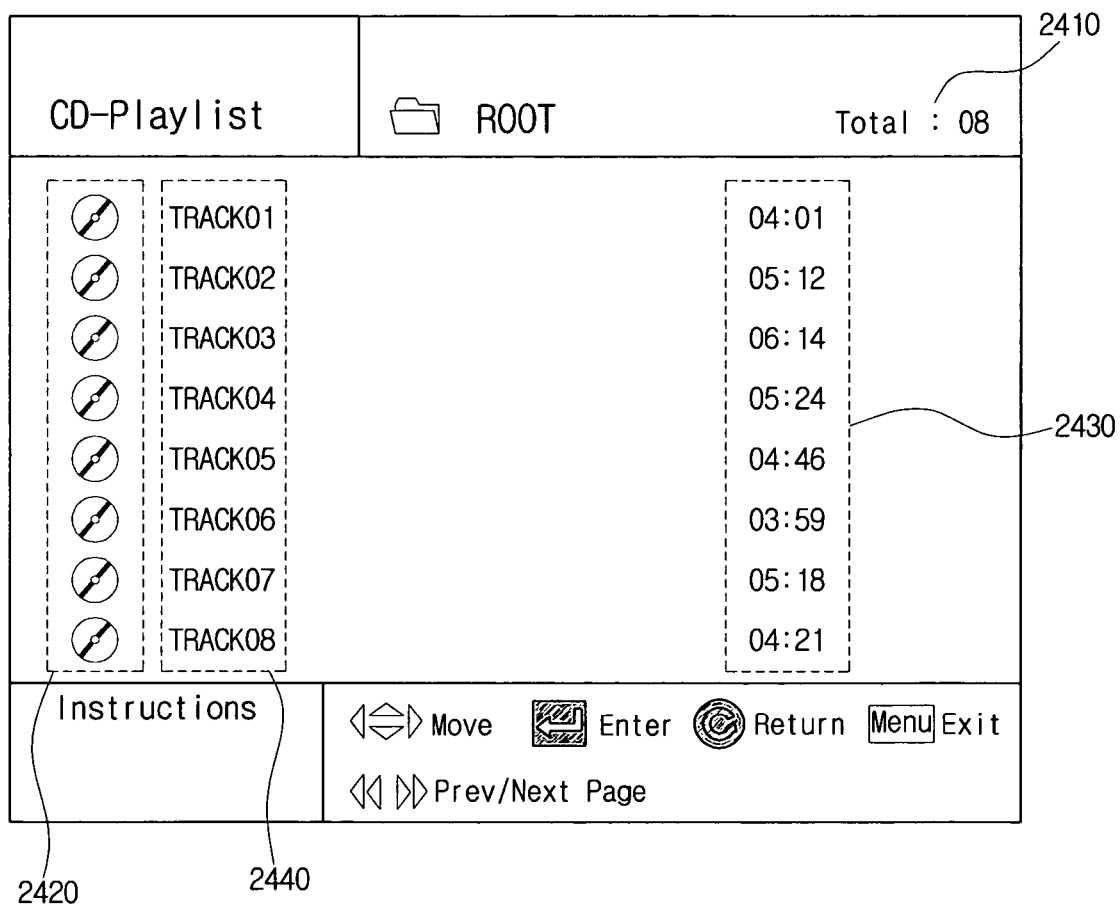
FIG. 52 is a view illustrating an example menu displayed on a TV screen when a menu item 'CD Play List' as illustrated in FIG. 8 is selected.

First, if the user inserts the music CD into the disc player 155 and selects the menu item 'CD Play List' 533 among the menu items as illustrated in FIG. 8, a CD play list menu as shown in FIG. 52 is displayed on the TV 300.

In the CD play list menu, the number of audio files which can be reproduced according to the information recorded in a Table Of Content (TOC) area of the CD is displayed. The reference numeral 2420 denotes an icon corresponding to the kind of audio file. The reference numeral 2430 denotes a replay time of the respective audio file. The reference numeral 2440 is a name given to the respective audio file, and its reference value is indicated as 'TRACK'. The cursor is located on the first audio file 'TRACK01' even without the manipulation of the remote controller 200. At this time, if the user locates the cursor on any one of the audio files TRACK01 to TRACK 08 by pressing the up/down direction keys 217 and 219, and presses the enter key 221, the audio file on which the cursor is located is selected and reproduced. That is, when the music CD is reproduced through the disc player 155, the viewer can recognize the additional information on the music CD displayed on the TV as he/she listens to the audio signal output through the speaker. This allows the user to select and listen to a desired music file.

Hereinafter, with reference to FIGS. 53 to 60, a function of skipping and copying files having the same file name when the files recorded in an optical recording medium are copied into a mass-storage magnetic recording medium according to a thirteenth embodiment of the present invention will be described.

Figure 53:
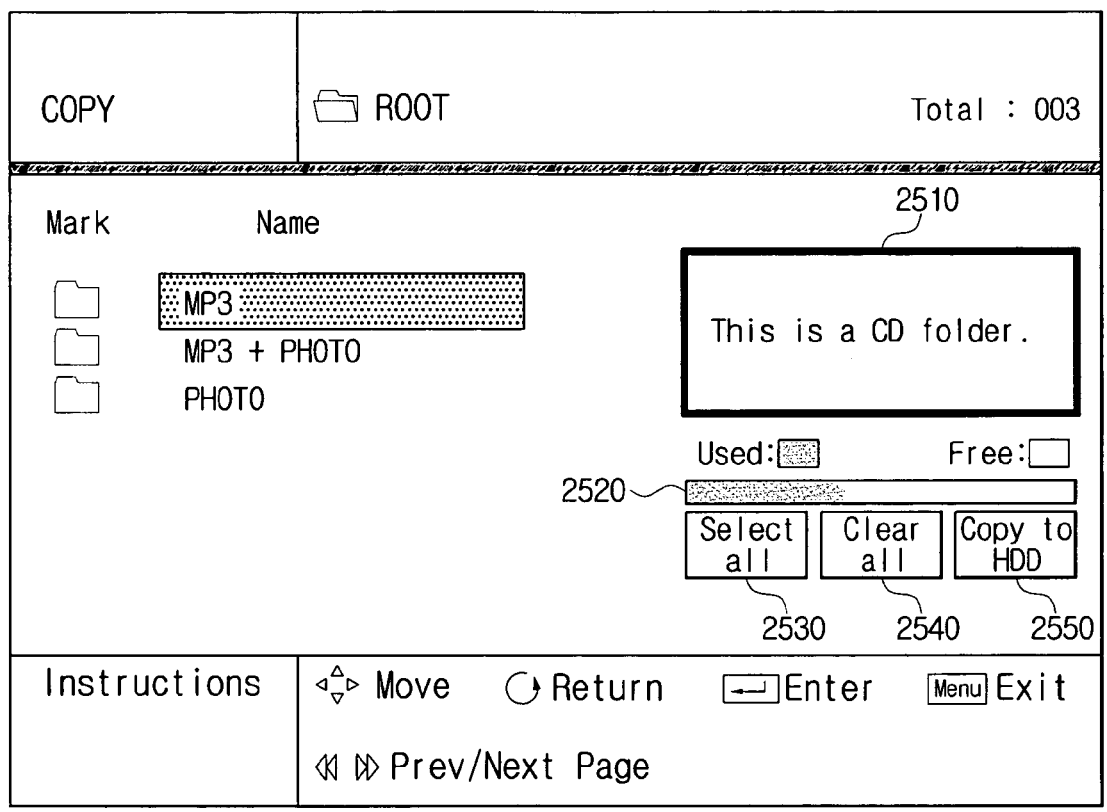
FIG. 53 is a view illustrating an example menu displayed on a TV screen when a menu item 'CD Copy to HDD' as illustrated in FIG. 8 is selected.

First, if the menu item 'CD Copy to HDD' 534 is selected from among the menu items 531 to 534 as illustrated in FIG. 8, a copy menu as shown in FIG. 53 is displayed on the TV 300.

Referring to FIG. 53, on the first block of the upper area of the copy menu, 'COPY' corresponding to the menu item 'CD Copy to HDD' is displayed, and in the second block, 'ROOT', which is the name of the uppermost folder of the CD is displayed.

Also, in the intermediate area of the copy menu, lower folders recorded in the uppermost folder of the CD are displayed. As shown in FIG. 53, the lower folders of the folder 'ROOT' are a folder 'MP3' in which audio files are recorded as '*.mp3' files, a folder 'MP3+PHOTO' in which audio files and picture files are combined, and a folder 'PHOTO' in which only picture files are recorded.

Also, on the right side of the intermediate area, information display window 2510 is provided for displaying the selected folder and information (for example, title of music, singer and replay time) on the file. Also, on the right side of the intermediate area, a memory capacity display bar 2520 for indicating a used capacity and a free capacity among the memory capacity of the HDD 151, a selection key 2530, a clear key 2540 and a copy-to-HDD key 2550 for deciding whether to select all or clear all of the folders and files listed in the intermediate area are provided.

Figure 54:
FIG. 54 is a view illustrating an example menu displayed on a TV screen when a folder 'MP3' as illustrated in FIG. 53 is selected.

First, the user selects the folder in which, files subject to copy to the HDD 151, are recorded from the folder list as illustrated in FIG. 53. If the folder 'MP3' is selected from the folder list as illustrated in FIG. 53 through the user's key manipulation, the files recorded in the folder 'MP3' are listed as shown in FIG. 54.

In the DVD or CD inserted into the disc player 155, various kinds of files including moving picture files, still picture files and audio files can be recorded. For example, audio files having expanders '*.mp3' and '*.wav', moving picture files having an expander '*.mpg', and still picture files having an expander '*.jpg', may be recorded in the DVD or CD.

However, 'Juke Box' according to the embodiment of the present invention shown, is implemented so as to list only the list of disc audio files. For example, if the expander of the files that can be reproduced is set to 'mp3' in the juke box, only the list of '*.mp3' files that can be automatically reproduced is displayed, even if a recording medium in which a plurality of files having different expanders are inserted. Accordingly, in FIG. 54, only the files recorded as '*.mp3' are listed among the music files recorded in the folder 'MP3'. The display of the file list is not limited to that as described above, but the list of all files recorded in the CD or DVD may be displayed according to the user's selection.

The music files subject to copy is selected from among the music files listed in the intermediate area by moving the cursor thereto. The selected music files are indicated by a check mark (v). In the case of selecting all the music files listed, the key 'Select all' 2530 is pressed, while in the case of copying the selected music files, the key 'Copy to HDD' 2550 is pressed.

Figure 55:
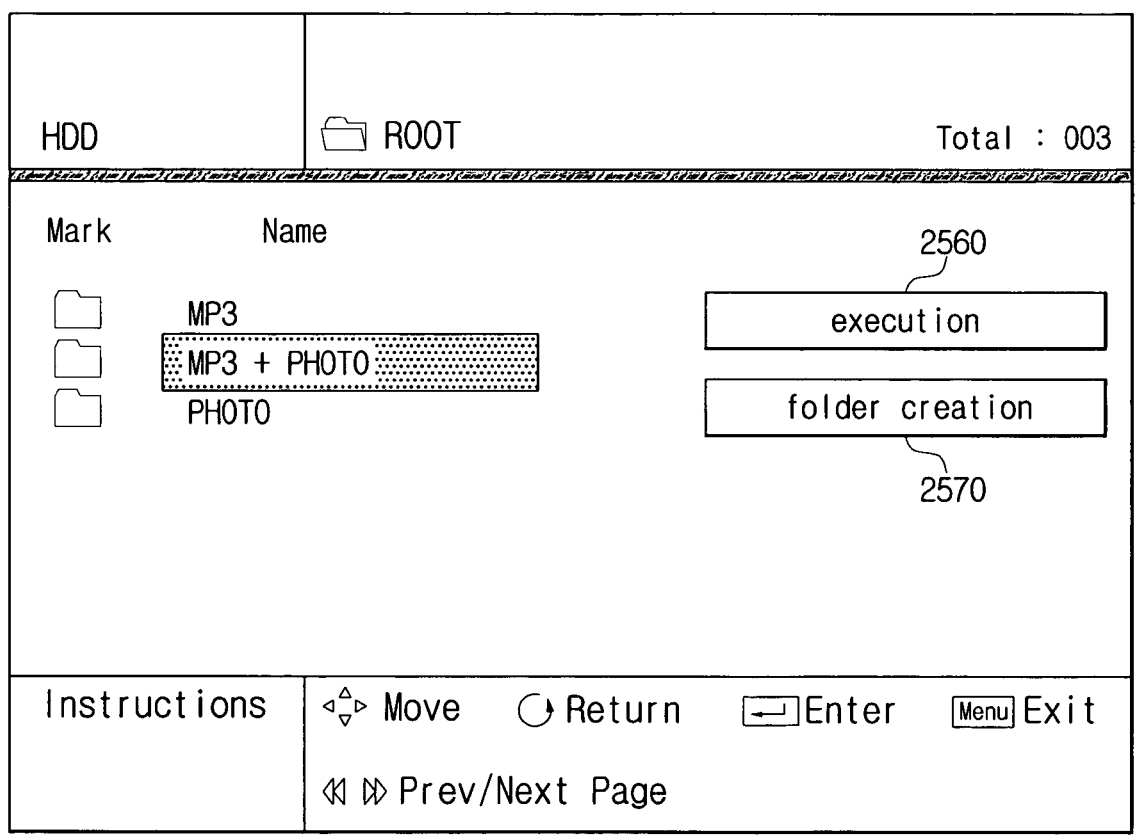
FIG. 55 is a view illustrating an example menu displayed on a TV screen when a file subject to copy and a copy menu in FIG. 54 are selected.
Figure 56:
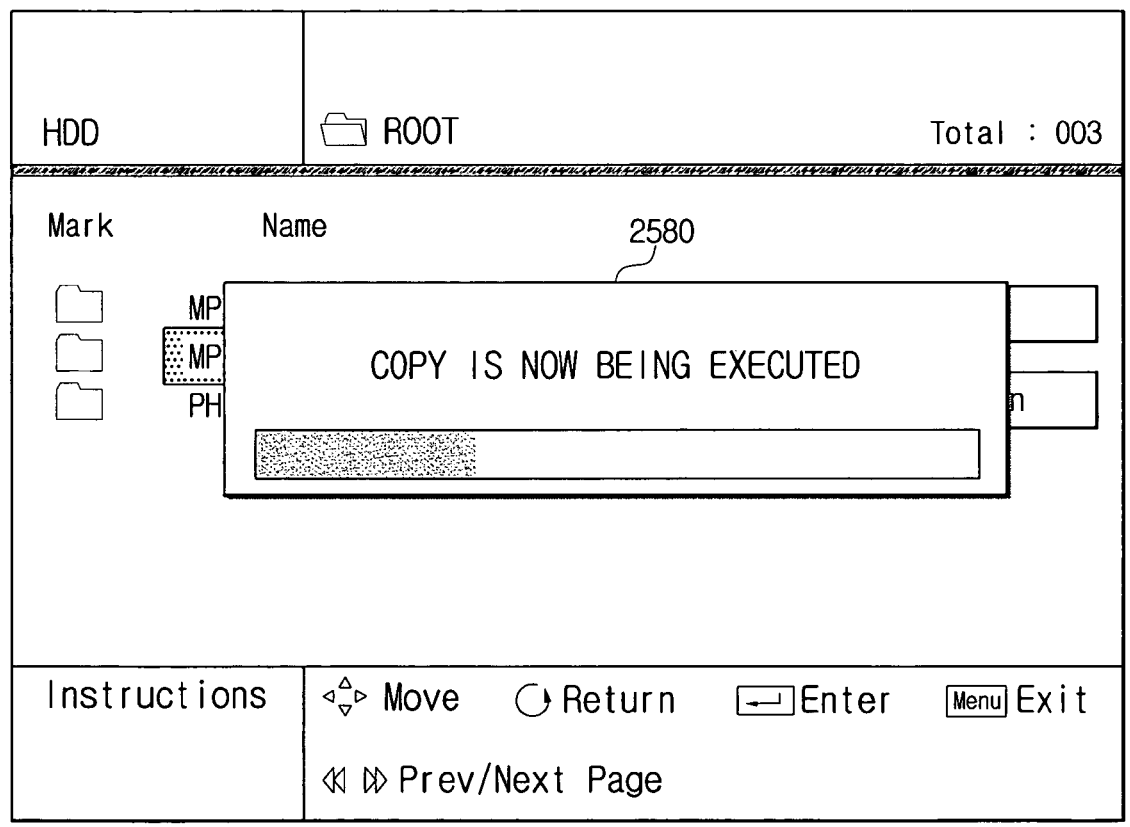
FIG. 56 is a view illustrating an example display menu that indicates a copy execution state when a menu 'execution' of FIG. 55 is selected and a copy is performed.

After selecting the copy key 2550, the user should select the recording position for copying the selected files. Accordingly, if the user selects the copy key 2550, the HDD play list menu as shown in FIG. 55 is displayed. On the first block of the upper area of the HDD play list menu, 'HDD' for informing that the folders being presently displayed are folders of the HDD 151 is displayed, and in the second block, 'ROOT', which is the uppermost folder name of the HDD 151 is displayed.

Also, in the intermediate area, the lower folders recorded in the uppermost folder of the HDD 151 are displayed. In the drawing, the recorded lower folders of the folder 'ROOT' include folder 'MP3', folder 'MP3+PHOTO' and folder 'PHOTO'. Also, on the right side of the intermediate area, an execution key 2560 is provided for executing a copy function and a folder creation key 2570 is provided for preparing new folders.

The user selects the folders corresponding to the position where the files subject to copy are recorded. If the user selects the execution key 2560 after selecting the folder 'MP3+PHOTO' from the list of the folders of the HDD 151 as the files subject to copy, the copy is performed. If the signal of the execution key 2560 is received, the main control unit 160 copies the selected files subject to copy to the folder of the HDD 151. At this time, a copy, proceeding state display menu 2580 provided for informing the proceeding of the copy, is displayed under the control of the main control unit 160 and is superimposed with a specified part of the HDD play list menu.

Also, if it is judged that files identical to the files subject to copy exist in the HDD 151, the main control unit 160 skips the corresponding files. That is, if there are files having the same file names as the files subject to copy in the HDD 151, the main control unit 160 does not copy the corresponding files.

Figure 57:
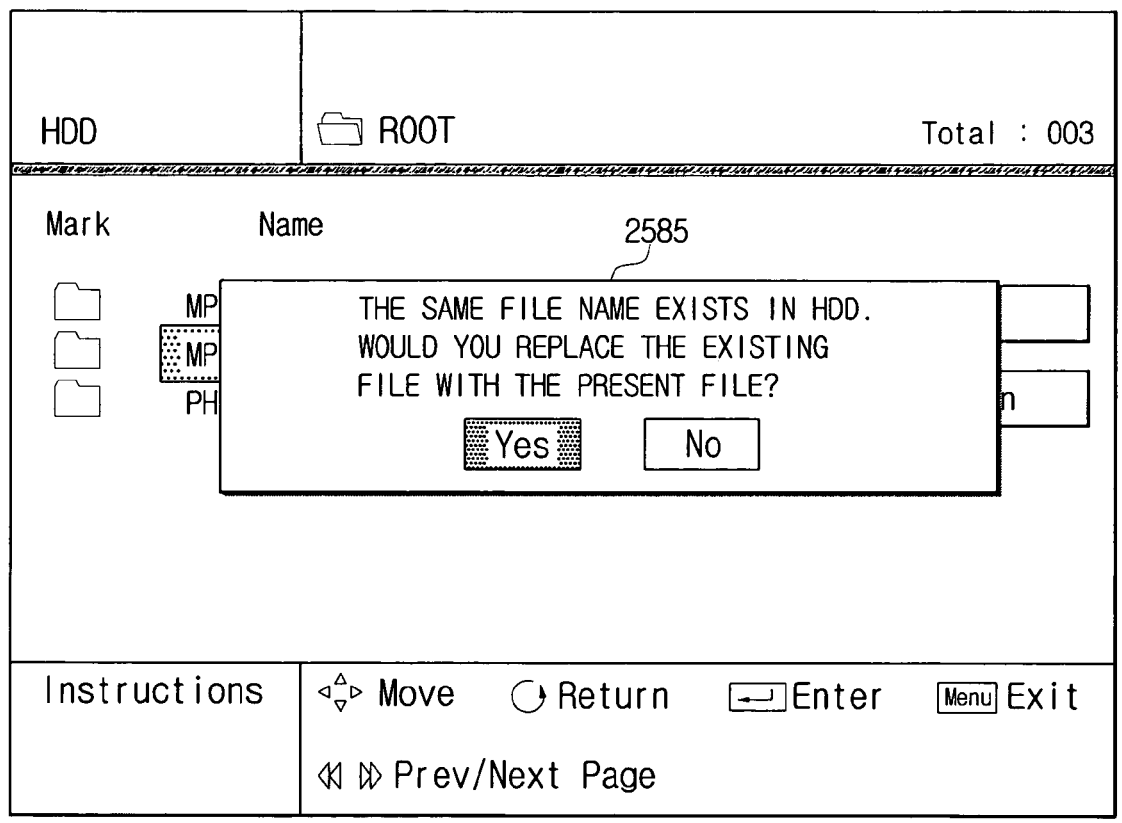
FIG. 57 is a view illustrating an example menu that indicates a message for enabling a user to select a file copy if a file identical to the file subject to copy exists in HDD according to an embodiment of the present invention.

Preferably, if there are files identical to the files subject to copy in the HDD 151, the main control unit 160 performs a process operation such that a file copy selecting menu for selecting whether to copy the corresponding file through the remote controller 200 is displayed, being superimposed with a specified part of the HDD play list menu as shown in FIG. 57. If a 'Yes' selection signal is received through the light-receiving unit 171 as a command for copying the corresponding file, the main control unit 160 replaces the files recorded in the HDD 151 with the present files. If a 'No' selection signal is received, the copy of the corresponding file is not performed.

In the case where the menu item 'CD Copy to HDD' 54 is selected from among the menu items 541 to 544 as illustrated in FIG. 9, the still picture files recorded in the CD or DVD inserted into the disc player 155 can be recorded in the HDD 151 using the same method as described above. In the case of the still picture file, only its file type is different from that of the music file, and its copying method is the same as that of the music file as described above, therefore a detailed description thereof will be omitted.

As described above, in the case of copying the files recorded in the CD or DVD into the HDD 151, the list of folders/files recorded in the CD or DVD and the list of folders/files recorded in the HDD 151 are displayed in the different menus, respectively. However, it is also possible to display both the list of folders/files recorded in the CD or DVD and the list of folders/files recorded in the HDD 151 in the same menu as illustrated in FIG. 58.

Figure 58:
FIG. 58 is a view illustrating another example of a menu displayed on a TV screen when a menu item 'CD Copy to HDD' as illustrated in FIG. 8 is selected.

As illustrated in FIG. 58, if the folders recorded in the HDD 151 and the folders recorded in the CD are displayed, a record folder for copying the folders and the files recorded in the folders is selected. If the folder 'MP3' recorded in the CD is selected, and the folder 'MP3' recorded in the HDD 151 is selected, the list of the music files recorded in the folder 'MP3' of the CD, and the list of the music files recorded in the folder 'MP3' of the HDD 151, are listed in the play list menu as shown in FIG. 59.

If a selection signal for selecting the files subject to copy to the folder 'MP3' of the HDD 151 among the music files listed in the left side of the intermediate area of the HDD/CD play list menu and a signal of a copy key 2590 are received, the main control unit 160 successively copies the selected files subject to copy into the HDD 151. At this time, the main control unit 160 skips the same files existing in the HDD 151. The following process is the same as described above, therefore a detailed description thereof will be omitted.

Hereinafter, with reference to FIG. 60, a method of controlling an image recording/reproducing apparatus capable of skipping and copying the files having the same file name when the files recorded in an optical recording medium are copied into a mass-storage magnetic recording medium according to the thirteenth embodiment of the present invention will be described.

Figure 60:
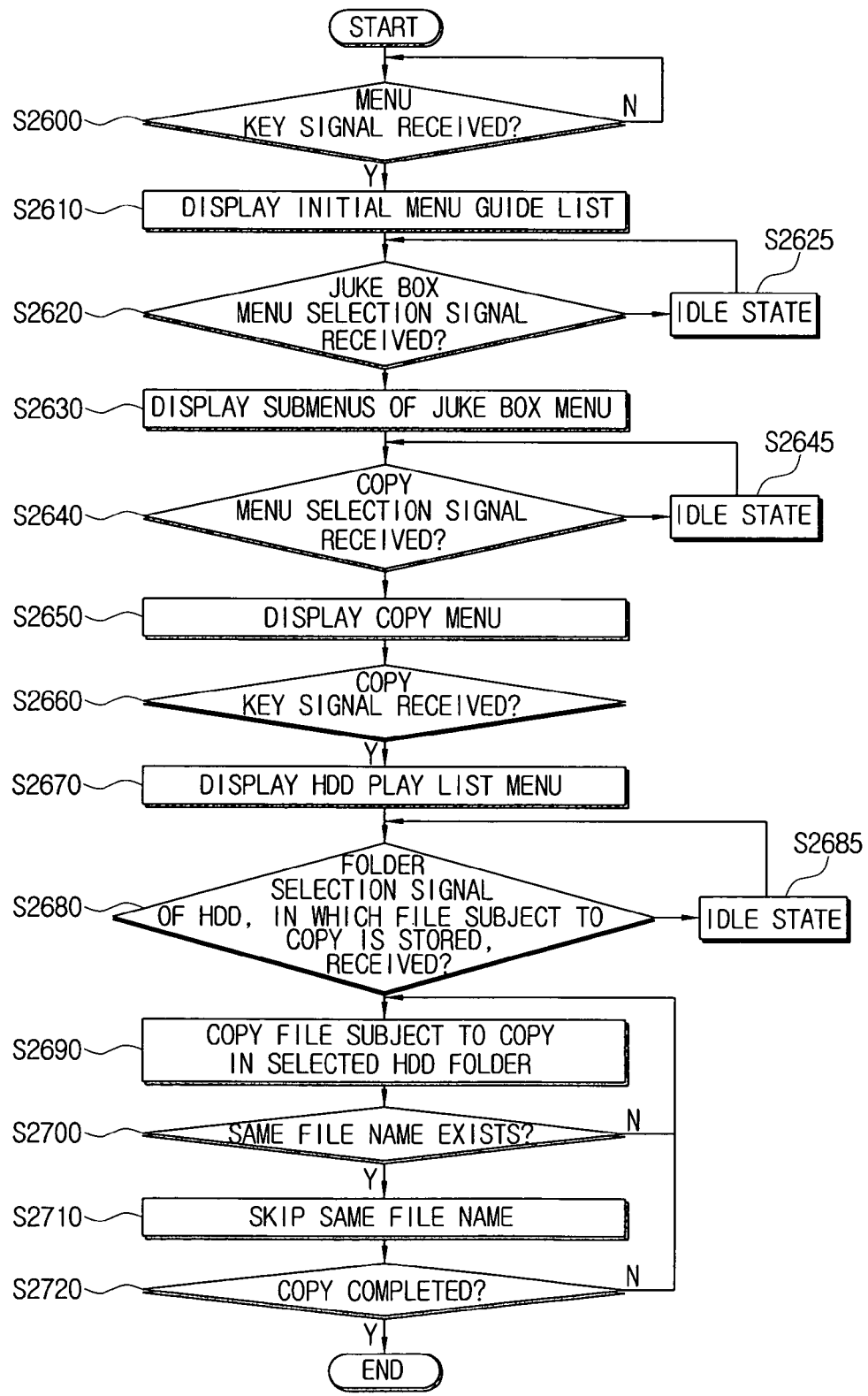
FIG. 60 is a flowchart provided for describing an example method of controlling an image recording/reproducing apparatus capable of skipping and copying files having the same file name when the files recorded in an optical recording medium are copied into a mass storage magnetic recording medium according to a thirteenth embodiment of the present invention.

Referring to FIG. 60, in order to copy the files recorded in the optical recording medium such as a CD or DVD inserted into the disc player 155, the menu item 'Juke Box' 530 or the menu item 'Photo Album' 540 should be first selected in the initial menu 400 of FIG. 5.

In the following description, an example is shown wherein the menu item 'Juke Box' 530 is selected from among the menu items 'Juke Box' 530 and 'Photo Album' 540.

First, if the menu key 211 of the remote controller 200 is pressed (step S2600), the initial menu as illustrated in FIG. 5 is displayed on the TV 300 (step S2610).

If the menu item 'Juke Box' 530 is selected from among the initial menu items 510 to 550 as illustrated in FIG. 5 (step S2620), the submenus of the menu item 'Juke Box' 530 are displayed on the TV 300 as shown in FIG. 8 (step S2630).

If the menu item 'CD Copy to HDD' 534 is selected from among the initial menu items 531 to 534 as illustrated in FIG. 8 (step S2640), a copy menu is displayed on the TV 300 as illustrated in FIG. 53 (step S2650).

In the copy menu, the folders recorded in the CD placed in the disc player 155 and/or file lists are displayed. The user selects the music files subject to copy from the folder/file list, and then selects the copy key 2550. If the signal of the copy key 2550 is received through the light-receiving unit 171 (step S2660), the HDD play list menu, as illustrated in FIG. 55, is displayed on the TV 300 (step S2670).

Also, if the folder selection signal for recording the files subject to copy among the lower folders recorded in the folder 'ROOT' of the HDD 151 listed in the HDD play list menu of FIG. 55 is received (step S2680), the main control unit 160 copies the files subject to copy into the selected folder (step S2690). At this time, the copy proceeding state display menu 2580, provided for indicating the copy proceeding state, is displayed under the control of the main control unit 160 and is superimposed with a specified part of the HDD play list menu as shown FIG. 56.

If the main control unit 160 judges that the same files as the files subject to copy exist in the selected folder of the HDD 151 (step S270) during the copying operation, the main control unit skips the files having the same file name, and then continues the copying operation (step S2710). If the same files as the files subject to copy exist in the selected folder of the HDD 151, the main control unit 160 performs a control operation such that the file copy selection menu 2585 is displayed on the TV 300, being superimposed with a specified part of the HDD play list menu as shown FIG. 57 so that the user can select the file copy before the skipping. Then, the main control unit 160 determines the file copy according to the user's file copy selection signal.

Then, if the file copy is completed (step S2720), the main control unit 160 terminates the file copy, and if not completed, it continues the file copy by returning to step S2690.

If the selection signal is not received at steps S2620, S2640 and S2680, the idle state is maintained at steps S2625, S2645 and S2685.

Hereinafter, with reference to FIGS. 61 and 62, a function of compressing and storing audio data having a CD-DA (Compact Disk-Digital Audio) standard according to the fourteenth embodiment of the present invention will be described.

Figure 61:
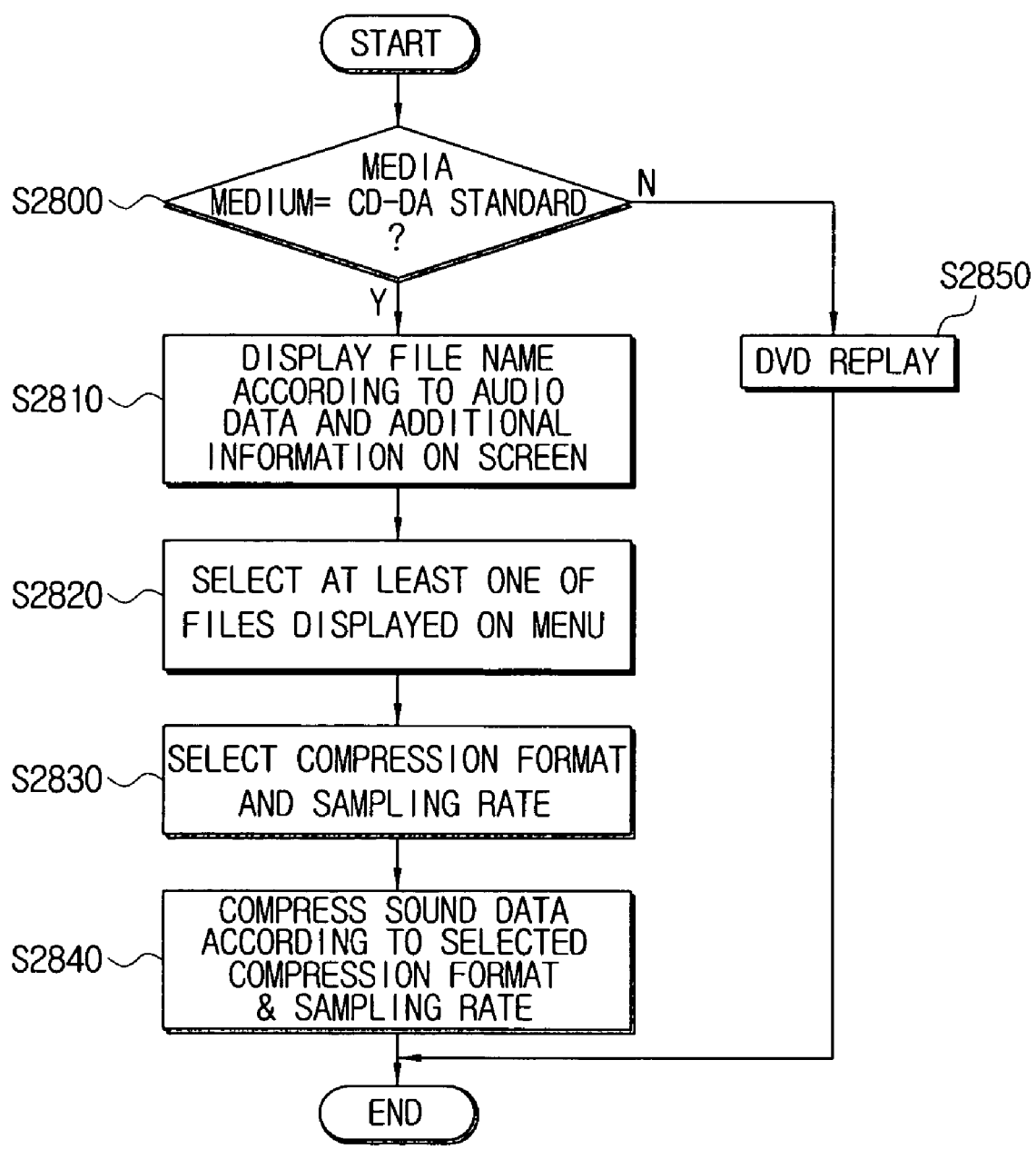
FIG. 61 is a flowchart provided for describing an example method of controlling an image recording/reproducing apparatus capable of compressing and storing audio data having a CD-DA standard according to a fourteenth embodiment of the present invention.

FIG. 61 is a flowchart provided for describing an example method of controlling an image recording/reproducing apparatus capable of compressing and storing audio data having a CD-DA standard according to the fourteenth embodiment of the present invention. FIG. 62 is a view illustrating another example of a menu displayed on a TV screen when a menu item 'CD Copy to HDD' as illustrated in FIG. 8 is selected.

If a user selects the menu item 'CD Copy to HDD' 534 from among the menu items 531 to 534 as illustrated in FIG. 8, the disc player 155 determines whether the inserted medium is an audio CD of the CD-DA standard (step S2800). If the inserted medium is an audio CD of the CD-DA standard, a file name of the audio data recorded in the form of a file according to the CD-DA standard and additional information thereof (e.g., file size, replay time, etc.) are displayed on the menu (step S2810). When the DVD is inserted into the disc player 155, the video data recorded in the DVD is reproduced and displayed on the screen (step S2850).

The file name of the audio data is selected from among the displayed menu (step S2820). One or more file names can be selected on the menu.

Then, the compression format and sampling rate of the audio data corresponding to the file name selected on the menu are set (step S2830). Proposed formats for compressing the audio data according to the MPEG format, an MP3 which is most widely used at present, include Windows Media Audio codec (WMA) supported by a media player program available from Microsoft Corp., Advanced Audio Coding (AAC) available from Dolby Laboratories Inc. which supports MPEG-2 and MPEG-4, MP3pro which can vary the sampling rate of MP3, and Advanced Streaming Format (ASF) suitable for streaming audio and video under network environments, and the like. These compression formats compress the audio data based on MPEG-2 or MPEG-4 to reduce the audio data by $1/10$ relative to the CD-DA standard. After any one of the above-described formats is selected from the displayed menu, the sampling rate of the selected audio data is selected. The sampling rate of the audio data is usually selected within the range of 32 Kbps to 192 Kbps.

Finally, the audio data is compressed according to the selected compression format and the sampling rate, and then the compressed audio data is recorded in the HDD 151. Accordingly, the amount of audio data of the CD-DA standard recorded in the HDD 151 can be greatly increased in comparison to the recording of the audio data as it is in the HDD 151.

Figure 62:
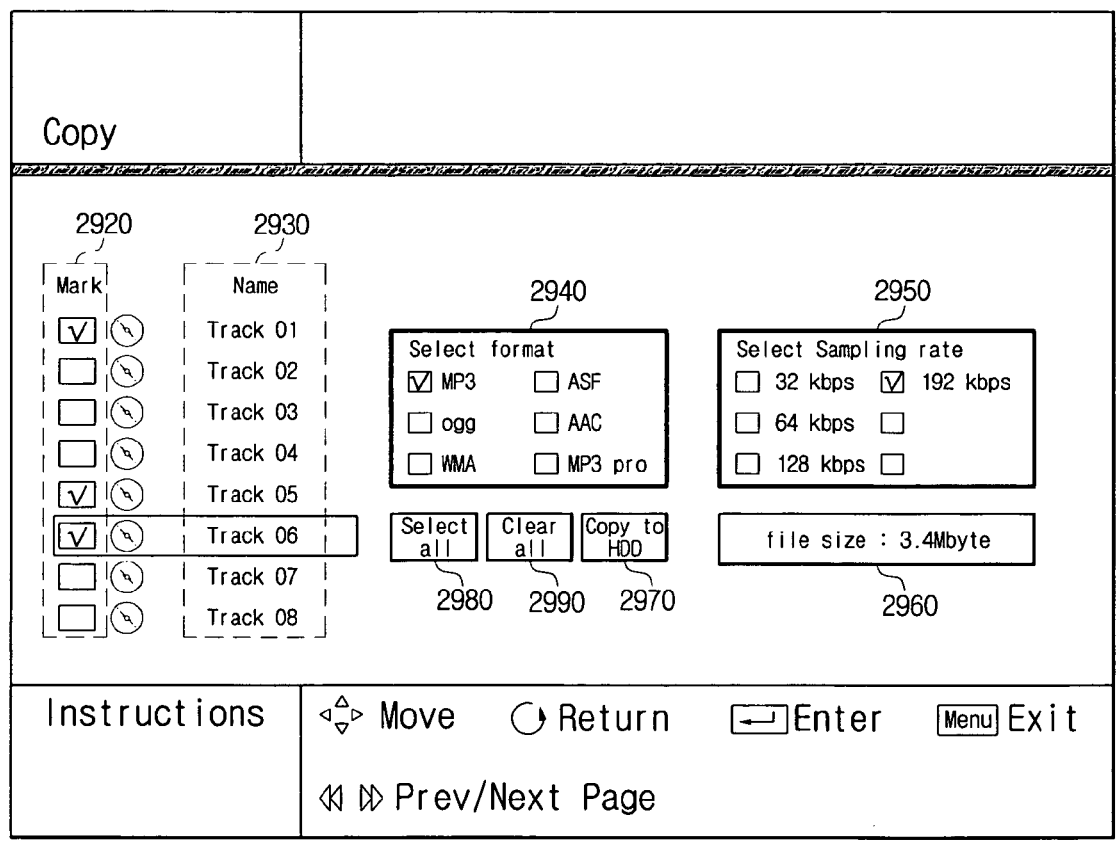
FIG. 62 is a view illustrating another example of a menu displayed on a TV screen when a menu item 'CD Copy to HDD' as illustrated in FIG. 8 is selected.

If the menu item 'CD Copy to HDD' 534 of the menu items 531 to 534 as illustrated in FIG. 8 is selected, a copy menu is displayed on the TV 300 as illustrated in FIG. 62.

The file selected by the user is displayed in a check box menu 2920 as illustrated in FIG. 62, and a file name recorded in the audio CD is displayed on a file name display region 2930 according to the CD-DA standard. In general, the file names recorded in the CD-DA standard are displayed as TRACK 01 to TRACK 08.

A format setting menu 2940 is a menu provided for selecting any one of formats, which can be converted by a conversion program recorded in the flash memory 165. The format setting menu includes a check box on the left side of the respective format names (e.g., MP3, ogg, ACC, WMA, ASF and MP3pro). If the compression format is selected from the format setting menu 2940, a sampling rate setting menu 2950 is popped-up on the screen. Specifically, if a desired format is selected from the format setting menu 2940, the sampling rate setting menu 2950 is displayed on the screen, without separately calling a submenu for setting the sampling rate.

The sampling rate setting menu 2950 sets the sampling rate to be applied to the format selected from the format setting menu 2940. If the sampling rate is low, the compressing rate is increased with a deteriorated tone quality. If the sampling rate is high, the compressing rate is decreased with a heightened tone quality.

In the file size display region 2960, the final result of compression (i.e., the capacity of compressed audio data) of the audio data of the CD-DA standard read-out from the disc player 155 is displayed according to the format and the sampling rate selected from the format setting menu 2940 and the sampling rate setting menu 2950, respectively.

A file record menu 2970 displays a menu provided for recording the audio data, which is compressed according to the sampling rate applied to the selected format, in the HDD 151.

A selection release menu 2990 is a menu provided for selectively releasing the file selected by the check box menu 2920. The select-all menu 2980 is a menu provided for selecting all the audio data. As described above, if the audio data of the CD-DA standard is applied to the disc player 151, the audio data is compressed by a specified format and a sampling rate, and then is recorded in the HDD 151 so that a larger amount of audio data according to the CD-DA standard can be recorded. In addition, if the file format is set on the menu, the menu 2950 provided for setting the sampling rate is popped-up on the screen, such that it is not necessary for the user to select the respective submenus using the remote controller 200. Specifically, if the desired format is selected from the format setting menu 2940, the sampling rate setting menu 2950 is automatically popped-up on the screen. Therefore, the user does not need to manipulate the keys provided in the remote controller 200 in order to display the sampling rate setting menu on the screen.

Hereinafter, with reference to FIGS. 63 to 65, a process of displaying still picture files in a specified display area with the size of the still picture adaptively adjusted based on the size of the specified display area according to the fifteenth embodiment of the present invention will be described.

If the user selects the menu item 'HDD Play List' 541 from among the menu items 541 to 544 as illustrated in FIG. 9, a list of the still picture files recorded in the HDD 151 is displayed on the TV 300. If the user selects the menu item 'CD Play List' 543, a list of the still picture files recorded in the CD inserted into the disc player 155 is also displayed on the TV 300 as shown in FIG. 63.

In the embodiment shown, the menu item 'HDD Play List' 541 is taken as an example. Specifically, it is assumed that the play list menu as illustrated in FIG. 63 is a list of a plurality of still picture files recorded in the HDD 151.

The play list as illustrated in FIG. 63 includes two lower folders (i.e., 'Flower' and 'River') of the folder 'Root' of the HDD 251, and a plurality of still picture files. The still picture files subject to replay are selected by manipulating the remote controller 200, and the selected still picture files can be recognized by a check mark (v) marked near the still picture file names.

Figure 64:
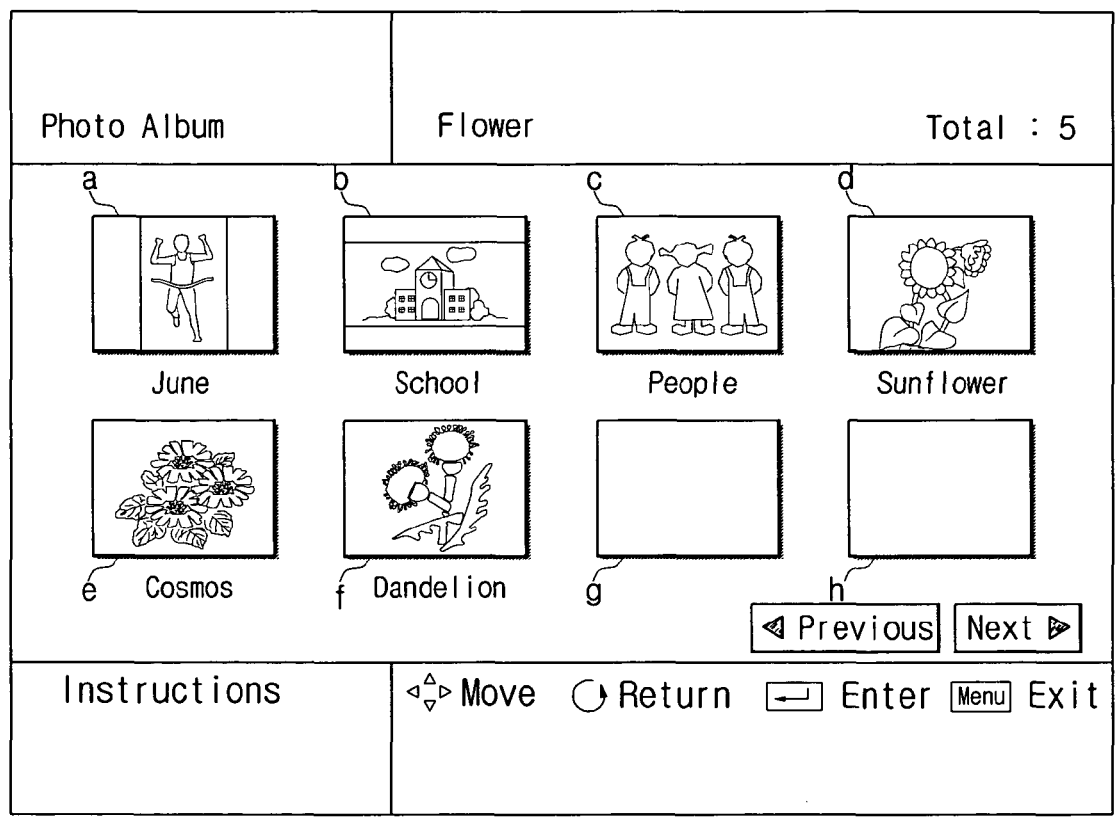
FIG. 64 is a view illustrating an example menu that indicates a still picture of a still picture file selected from a still picture file list as illustrated in FIG. 63.
Figure 65:
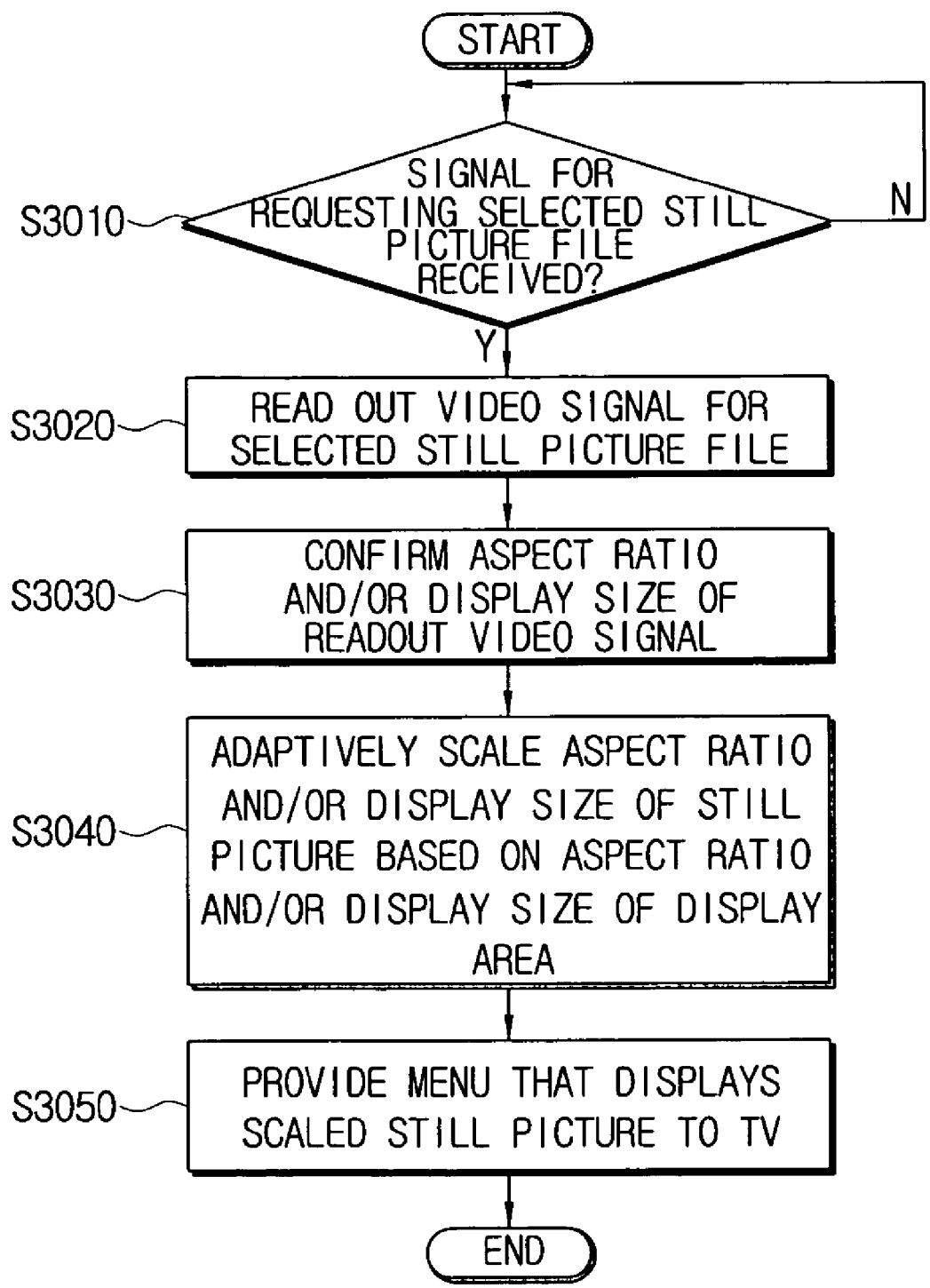
FIG. 65 is a flowchart provided for describing an example method of controlling an image recording/reproducing apparatus capable of adaptively adjusting a size of a still picture based on a size of a predetermined display area, and display the still picture in the predetermined display area according to a fifteenth embodiment of the present invention.

If a display request signal for the selected still picture files (i.e., a replay command), is applied, the menu as shown in FIG. 64 is displayed on the TV 300. FIG. 64 is a view illustrating a play list menu that indicates the still picture of the selected still picture file.

Referring to FIG. 64, the play list menu includes eight display areas 'a' to 'h' in which, the still pictures are displayed, and the still picture selected from the menu of FIG. 63 is displayed on the screen of FIG. 63. Specifically, if a replay command is applied to the selected still picture file, the play list menu in which thumbnails are implemented is listed. At this time, a size of the still picture displayed in the display areas 'a' to 'h' is consistent or inconsistent with the size of the display areas 'a' to 'h'.

As illustrated in the display areas 'c' to 'f', the case where the picture sizes are consistent with each other means that the aspect ratio of the still picture recorded in the HDD 151 is consistent with a predetermined aspect ratio of the display areas 'c' to 'f'. Specifically, it is the case where the video signal of the still picture file is scaled to be identical to the size of the display areas 'c' to 'f'.

As illustrated in the display areas 'a' and 'b', the case where sizes are inconsistent with each other means that the aspect ratio of the still picture recorded in the HDD 251 is not consistent with a predetermined aspect ratio of the display areas 'a' and 'b'. In this case, the video signal of the still picture file is adaptively scaled, being based on the aspect ratio or the size of the display areas 'a' and 'b'.

The display areas 'g' and 'h' illustrate the case where the still picture is not displayed.

Also, it is preferable that the number of the display areas 'a' to 'h' that are displayed on the play list menu is not limited to eight. The aspect ratio and/or the size of the display area may be predetermined by manipulation of the remote controller 200, or may be set as initial values during the production process. In the embodiment, the case where the aspect ratio of 4:3 is applied to the respective eight display areas, and each area has a proper size corresponding to the aspect ratio of 4:3, is taken as an example.

The scaling of the still picture for implementing the thumbnails will now be described in detail with reference to FIG. 65. FIG. 65 is a flowchart provided for describing a method of controlling an image recording/reproducing apparatus capable of adaptively adjusting the size of a still picture based on the size of a predetermined display area, and displaying the still picture in the predetermined display area according to the fifteenth embodiment of the present invention.

First, if the menu item 'HDD Play List' 541 of the menu items 541 to 544 as illustrated in FIG. 9 is selected, the list of the still picture files recorded in the HDD 151 is displayed on the TV 300 as shown in FIG. 63.

If a signal for requesting the still picture display is received after the still picture file is selected in order to implement the thumbnails in the play list menu of FIG. 63 (step S3010), the main control unit 160 reads the video signal of the selected still picture file from the HDD 151 (step S3020).

If the step S3020 is performed, the main control unit 160 confirms the number of pixels of the read-out video signal (i.e., the aspect ratio and/or the display size) (step S3030). If the aspect ratio and/or the display size of the read-out video signal is confirmed, the main control unit 160 decodes the read-out video signal in a manner that it performs a control operation for the MPEC decoder 163 to adaptively scale the aspect ratio and/or the display size of the read-out video signal based on the aspect ratio of the display area (step S3040).

Specifically, the main control unit 160 controls the MPEC decoder 163 to scale the video signal in a given ratio so that any one of horizontal and vertical lengths of the still picture (for example, vertical length of the still picture) is identical to any one of horizontal and vertical lengths of the display area (for example, vertical length of the display area) according to the size (i.e., the number of pixels) of the video signal. At this time, the main control unit 160 controls the MPEC decoder 163 to scale the other horizontal and vertical lengths of the still picture (i.e., horizontal length of the still picture) in a given ratio.

If the aspect ratio of the TV 300 or the display areas 'a' to 'h' are selected as 4:3 by manipulation of the remote controller 200, the scaling of the MPEG decoder 163 will be performed as follows. In the case where the video signal, having its vertical length longer than its horizontal length over a given ratio, is recorded in the HDD 151, the video signal is scaled so that the vertical length of the video signal is identical to the vertical length of the display area 'a' corresponding to the vertical length of the video signal. In this case, the horizontal length of the video signal is also scaled at the same ratio. Therefore, the still picture is displayed in the display area 'a' of FIG. 64. In the case where the vertical and horizontal lengths of the video signal recorded in the HDD 151 are identical to each other, the video signal is properly scaled so that the vertical length of the video signal is identical to the vertical length of the display area.

In the same manner, if the video signal, having its horizontal length longer than its vertical length over a given ratio, is recorded into the HDD 151, the video signal is scaled so that the horizontal length of the video signal to be displayed is identical to the horizontal length of the display area 'b' corresponding to the horizontal length of the video signal. In this case, the vertical length of the video signal is scaled at the same ratio. Hence, the still picture is displayed in the display area 'b' of FIG. 64.

In addition, in the case where the video signal having the aspect ratio that is identical to that of the display area and the display size that is not identical to that of the display area is recorded into the HDD 151, the video signal is scaled to have the same display size as that of the display area. Hence, the still picture is reduced and displayed in the display area 'c' of FIG. 64.

If the step S3040 is performed, the main control unit 160 controls the play list menu, in which the still picture scaled as in FIG. 64 is displayed, to be listed on the TV 300 (step S3050).

In the image recording/reproducing apparatus 100 according to the present invention, the still picture recorded in a recording medium such as a CD loaded by the disc loading unit 155, as well as the still picture recorded in the HDD 151, can be reproduced.

In addition, it is preferable that the aspect ratio and/or the size of the still picture reproduced when the thumbnails are implemented are adaptively scaled according to the aspect ratio and/or the display size of the TV 300.

Hereinafter, with reference to FIGS. 66 to 69, a function of providing a menu for enabling a user to easily select and manipulate functions supported by an image recording/reproducing apparatus according to a sixteenth embodiment of the present invention will be described.

Function selection of the image recording/reproducing apparatus 100 is performed through the display of the menu on a display device such as the TV 300 and pressing the input keys of the remote controller 200.

Hereinafter, explanation will be made with respect to a menu coupled to the TV 300 through an output terminal (e.g., the line video/audio output terminal 116) which is connected to the TV 300, provided by the menu display program stored in the GUI storage unit 165a, and performed by the main control unit 160 when the menu key 211 of the remote controller 200 is selected.

Figure 66:
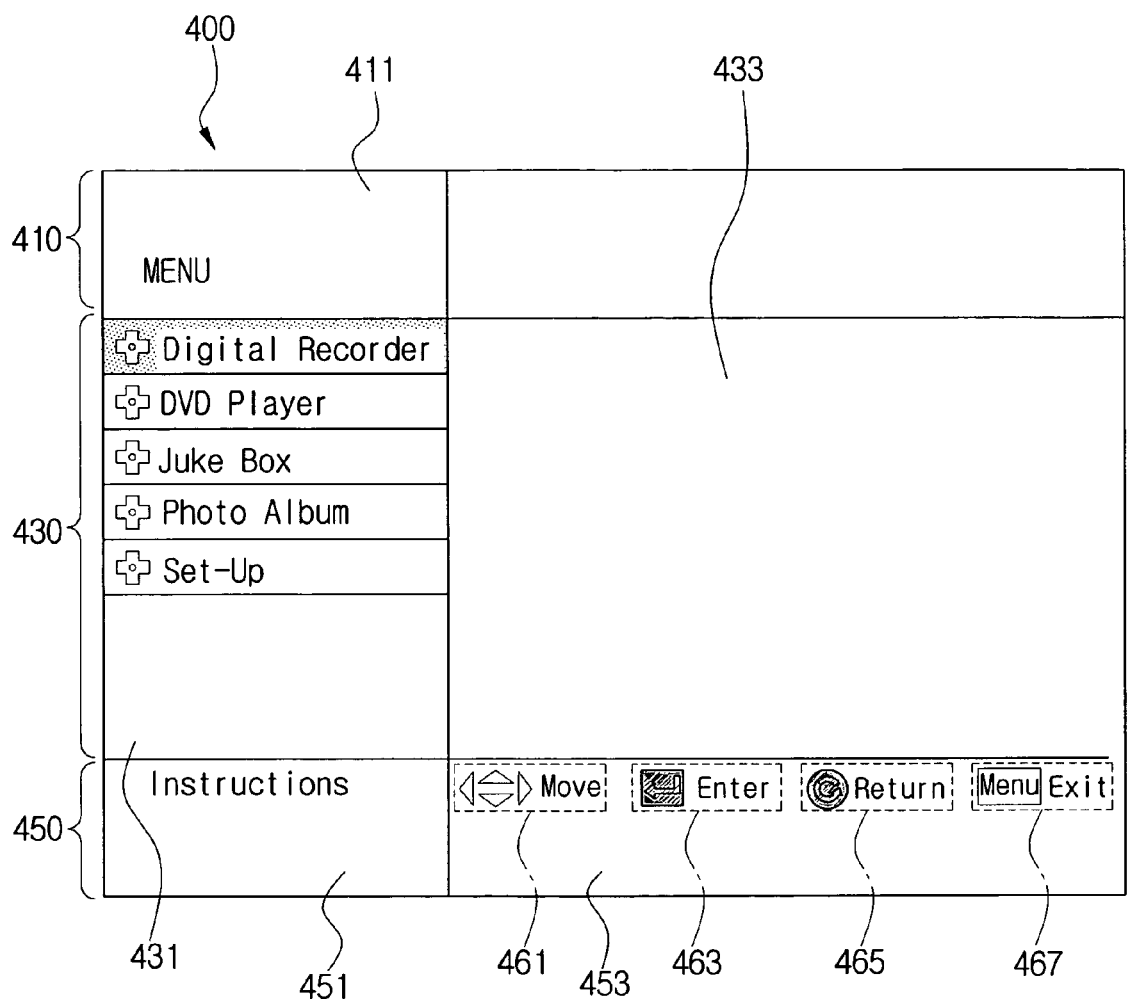
FIG. 66 is a view illustrating another example of an initial menu displayed on a TV screen when a menu key of FIG. 4 is selected.

As shown in FIG. 66, the initial menu 400 is divided into three areas (i.e., an upper area 410, an intermediate area 420 and a lower area 450), in a vertical direction.

The main control unit 160 displays an image, provided for indicating additional explanations related to the menu and key manipulation, and use information in the upper and lower areas 410 and 450, respectively. Preferably, the upper area 410 is divided into two blocks in a horizontal direction. In a first area, a 'MENU' item is provided to communicate information corresponding to the present menu and is displayed on the left block 411.

The intermediate area 430 displays the menu selected by the user using an On Screen Display (OSD) function, and on the first block 431 located on the left side, the main menus are displayed. Preferably, when any one of the main menus is selected, the submenus depending on the selected main menu are displayed in the area corresponding to the second block 433 located on the right side of the first block 431. The main control unit 160 displays the dependent menus corresponding to the presently selected menu through the OSD according to the dependent relationship of the menu, along with menus that belong to an upper group of the selected menu, so that the user's menu selection path can be easily recognized to provide convenience in menu selection.

The key manipulation and use information of the remote controller 200 corresponding to the use of the menu 400 is displayed as an image on the lower area 450. As shown in the drawing, on the lower area 450, a text 'Instructions' for informing purposes is displayed on the first block 451 of a guide related to the key manipulation and use. On the second block 453 that is on the right side of the first block 451, a usable key corresponding to the user of the displayed initial menu 400 among the keys provided in the remote controller 200, and guide information corresponding the function of the key are displayed.

The marks displayed on the lower area 450 and its guide information are hereinafter collectively referred to as marks. A cursor movement guide mark 461, a selection guide mark 463, a return guide mark 465, and an exit guide mark 467 are displayed on the lower area 450. A key supported by the remote controller 200 is added to or deleted from the marks displayed on the lower area 450.

The cursor movement guide mark 461 is used to move the cursor to items selectively arranged in the intermediate area 430, and is composed of a direction key mark corresponding to the direction keys 213, 215, 217 and 219 provided in the remote controller 200, and key manipulation and use information 'Move'. The cursor is generally designed to enable the user to recognize the case where the cursor is located on a position corresponding to a moving direction of the direction keys 213, 215, 217 and 219, and then the cursor is moved to a next item when the direction keys 213, 215, 217 and 219 of the remote controller 200 are manipulated. The cursor may be implemented by various methods, such as a highlight display process, shade display process, color conversion process, etc.

The selection guide mark 463 is used when the item on which the cursor is located is selected, and is composed of a mark and key manipulation and use information 'Enter' corresponding to the enter key 221 provided in the remote controller 200.

The return guide mark 465 is used when the present display is returned to the previous display, and is composed of a mark and key manipulation and use information 'Return' corresponding to the return key 223 provided in the remote controller 200.

The exit guide mark 467 is used when a display mode of the menu 400 is converted into another mode, that is, when the menu is closed, and is composed of a mark and key manipulation and use information 'Exit' corresponding to the menu key 211 provided in the remote controller 200.

The user can use the up, down, left and right direction keys 213, 215, 217 and 219 provided in the remote controller 200 when moving the cursor with respect to the items displayed in the intermediate area 430.

If the user intends to select the menu on which the cursor is located and manipulates the enter key provided in the remote controller 200, the main control unit 160 displays a following menu corresponding to the selection of the menu on the display device. Specifically, in the case where submenus exist depending on the menu on which the cursor is located, the submenus are displayed through the menu display method as described above. If no submenu exists, the execution of the selected menu is displayed in the intermediate area 430.

Preferably, when the right direction key 215 is selected from among the direction keys 213, 215, 217 and 219 provided in the remote controller 200 with respect to the menu on which the cursor is located, the main control unit 160 processes the selected key and displays the corresponding execution menu in the intermediate area 430 if no submenu depending on the menu exists.

Also, the main control unit 160 unloads the menu so that the main menu is not displayed on the display device if the signal for selecting the menu key 211 is input while in the state wherein the initial menu 400 is loaded onto the TV 300.

The information regarding the usable key corresponding to the menu is recorded in the flash memory 165. If the menu is changed in every mode, the information of the usable key is also changed. The main control unit 160 calls the information regarding the usable key recorded in the flash memory 165 in order to display the key manipulation and use information, and interrupts an output signal of any other key except for the usable key.

Figure 67:
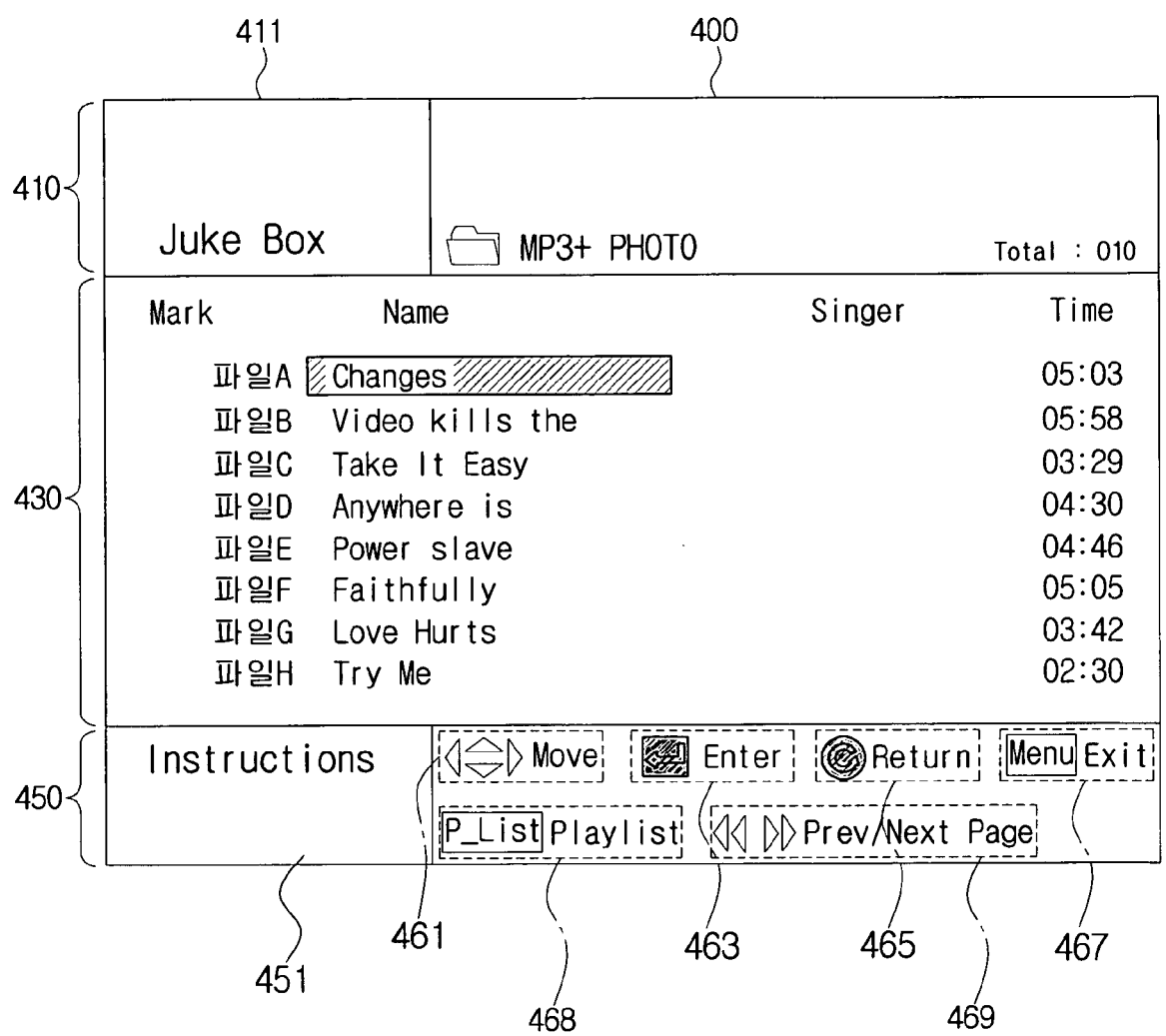
FIG. 67 is a view illustrating still another example of a menu displayed on a TV screen when a menu item 'HDD Play List' as illustrated in FIG. 8 is selected.

FIG. 67 is a view illustrating a menu displayed on a TV screen when the user selects a folder 'MP3+PHOTO' of the play lists displayed by selecting the menu item 'HDD Play List' 531 from among the submenu items of the menu item 'Juke Box' as illustrated in FIG. 8. The selected menu 'Juke Box' is displayed on the left block 411 of the upper area 410, and the selected folder 'MP3+PHOTO', which is a lower folder selected in the folder of the HDD 151, is displayed on the right block. The file recorded in the folder 'MP3+PHOTO' is displayed in the intermediate area 430.

The key manipulation and use information of the remote controller 200 used in the menu 'Juke Box' is displayed in the lower area 450, which is dissimilar to the menu of FIG. 66. Specifically, the key manipulation and use information of FIG. 66 is added to information on a key 'Play List' 468 which operates on the menu only and information on a page movement key 'Pre/Next Page' 469. The key 'Play List' 468 is provided to display the list to be selected and reproduced by the user. The page movement key 'Pre/Next Page' 469 is provided to move to the previous or next page from the presently displayed page. The key manipulation and use information is displayed through the video whenever the screen is changed.

Figure 68:
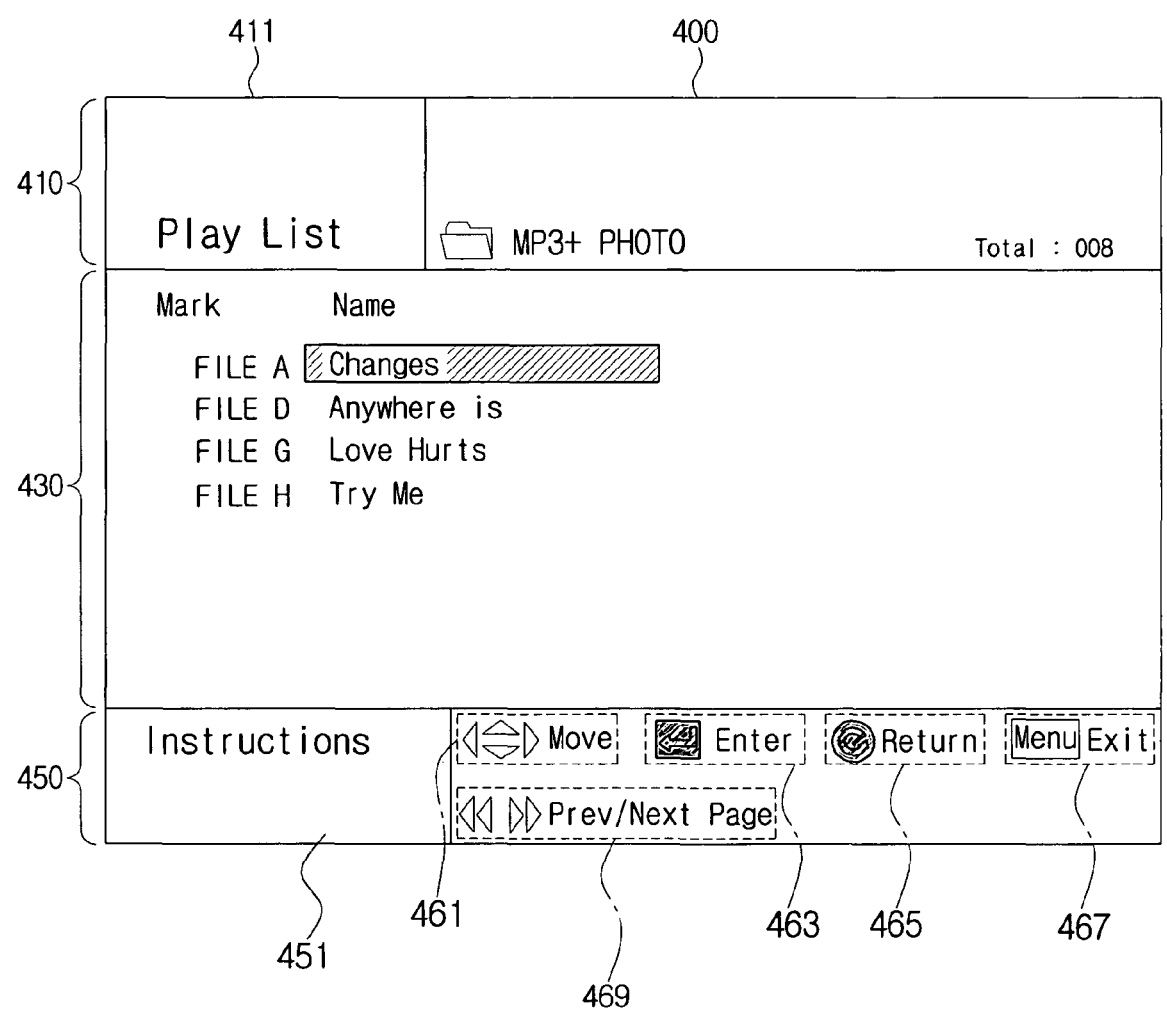
FIG. 68 is a view illustrating an example menu that indicates a list of files selected from a file list as illustrated in FIG. 67.

FIG. 68 is a view illustrating a menu changed in the case where the key 'Play List' 468 is used after the user selects the given number of files to be reproduced in the file list menu of FIG. 67. The selected menu 'Play List' is displayed on the left block 411 of the upper area 410, and the selected folder 'MP3+PHOTO' is displayed on the right block. The selected replay list to be reproduced among the files recorded in the folder 'MP3+PHOTO' is displayed in the intermediate area 430.

The key manipulation and use information of the remote controller 200 used in the menu 'Play List' is displayed in the lower area 450, which is dissimilar to the menu of FIGS. 66 and 67. Specifically, the information on the key 'Play List' 468 which is unusable in the menu, is deleted from the key manipulation and use information of FIG. 68.

The user is provided displays on the OSD in the selectable display area (i.e., the intermediate area of the present invention) by manipulating the keys whenever the screen is changed. The information on the keys used is displayed on upper and lower parts of a space on the screen on which the OSD is not displayed. Since the screen selectable by the user has serious content fluctuations displayed by the key manipulation, it requires a mass storage memory to display images, thereby increasing the cost. Therefore, the parts which include contents that are frequently changed is displayed through the OSD in the intermediate area 430 of the screen, while in the upper and lower areas 410 and 450, an image having a small capacity is displayed.

Figure 69:
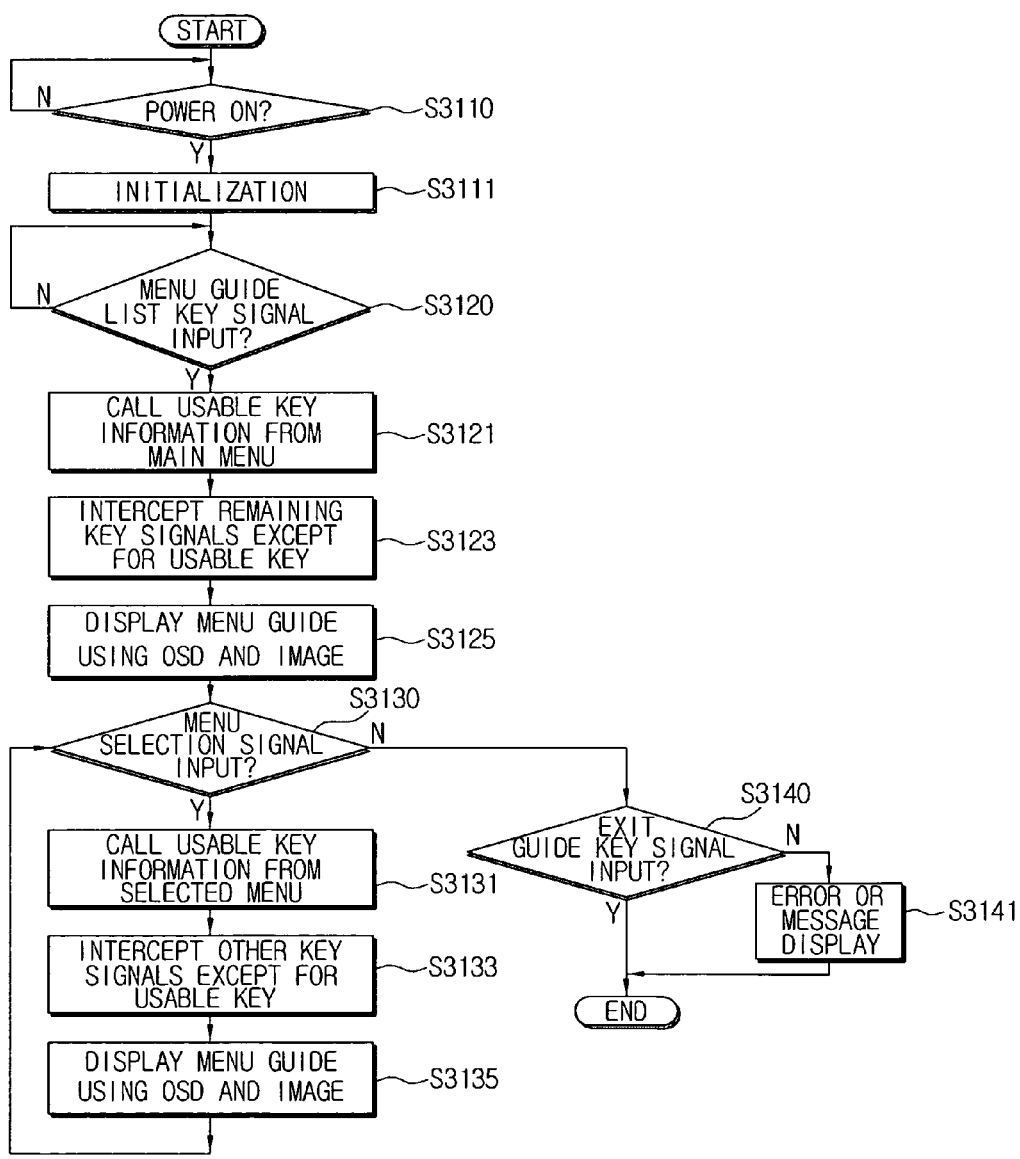
FIG. 69 is flowchart provided for describing an example method of controlling an image recording/reproducing apparatus that provides a menu for enabling a user to easily select and manipulate functions supported by the image recording/reproducing apparatus according to a sixteenth embodiment of the present invention.

A method of controlling an image recording/reproducing apparatus that provides a menu for enabling a user to easily select and manipulate functions supported by the image recording/reproducing apparatus according to one embodiment of the present invention will now be described with reference to FIG. 69.

First, if the power is applied (step S3110), the image recording/reproducing apparatus is initialized (step S3111). If the user manipulates the menu key 211 of the remote controller 200 to select the function of the initialized system, the signal of displaying the menu is input to the light-receiving unit 171. If the signal for displaying the menu is received (step S3120), the main control unit 160 calls the information on the usable key corresponding to the initial menu from the flash memory 165 (step S3121). If another key signal is input other than the usable key, the main control unit 160 performs a control operation to interrupt another key signal (step S3123). The main control unit 160 displays on the TV 300 in such a way that the main menu is displayed in the intermediate area 430 of the screen through the OSD, and the video information containing the usable key information called from the flash memory 165 is displayed in the upper area 410 and the lower area 450 (step S3125).

The user selects a specific menu by manipulating the enter key 221 and the direction keys 213, 215, 217 and 219 of the remote controller 200, while in the state of displaying the menu on which the initial menu is arranged. If the signal of selecting the menu is input to the main control unit 160 through the light-receiving unit 171 (step S3130), the main control unit 160 calls the usable key information corresponding to the selected menu from the flash memory 165 (step S3131). Any other key signal is interrupted, except the usable key using the called usable key information, and the video information containing the usable key information is called from the flash memory 165. In addition, by using the built-in OSD, the main menu is displayed in the intermediate area 430 of the screen (step S3133), while the menu from which the video information is synthesized is displayed in the upper and lower areas 410 and 450 on the TV 300 (step S3135).

If the user inputs the signal for selecting the menu displayed through the OSD using the remote controller 200, the steps S3131, S3133 and S3135 are repeated. The main control unit 160 displays the menu by use of the video information containing the usable key information corresponding to the selected menu and the signal of selecting the menu displayed through the OSD, and interrupts any other key signals except the usable key.

If the menu key 211, of which the key manipulation using information is indicated by 'Exit' is input (step S3140), the main control unit 160 unloads the menu to close the menu so that the menu is not displayed on the display device.

In an effort to accomplish especially the seventeenth aspect of the present invention, an image recording/reproducing apparatus and a control method thereof according to the seventeenth preferred embodiment enables continuous recording of received programs, while also enabling the reproducing of the recorded programs from the first part as need arises. The seventeenth embodiment of the present invention will be described below in greater detail, with reference to the accompanying FIGS. 70 to 72.

Figure 70:
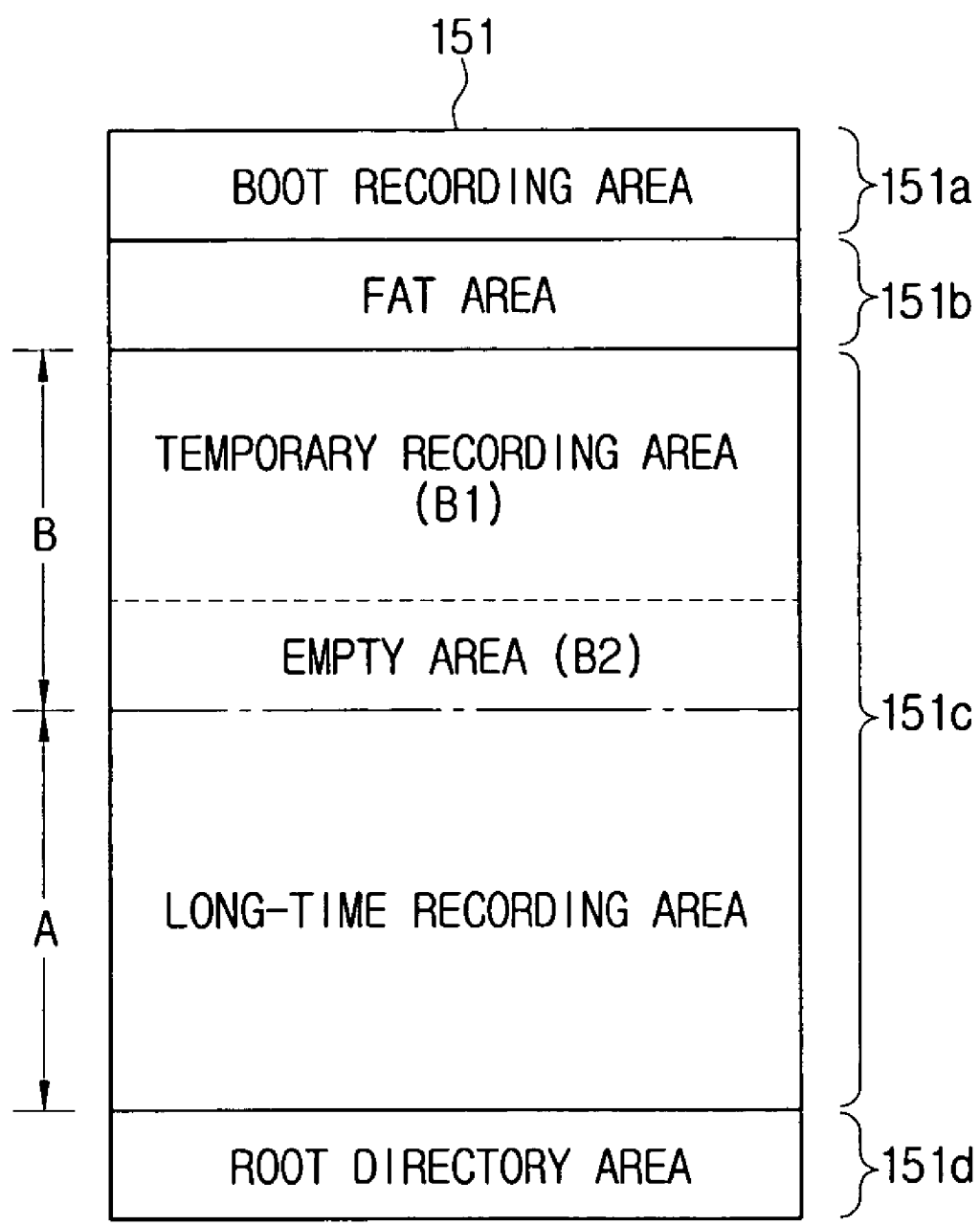
FIG. 70 is a schematic view illustrating an example logic structure of the hard disk drive (HDD) of FIG. 2.

FIG. 70 is a view schematically showing the logic structure of the HDD of FIG. 2. Referring to FIG. 70, the HDD 151 includes a boot recording area 151a, a File Allocation Table (FAT) area 151b, a data recording area 151c and a root directory area 151d.

The boot recording area 151a is where the information about physical structure of the HDD 151, such as the information about drive partition, is recorded.

The FAT area 151b records the status information which indicates in which cluster of the data recording area 151c the data to be recorded is located. If a large file is to be recorded in the HDD 151, the file is divided into a plurality of clusters and recorded. In dividing the single file into a plurality of clusters, the clusters are not necessarily positioned in a consecutive manner. That is, it is possible that the divided file is distributed in the HDD 151 in a nonconsecutive manner. In this case, the location information about the plurality of clusters regarding the file is managed by the file allocation table (FAT) of the HDD 151. That is, the FAT area 151b records the location information regarding at least one cluster of the file of the data recording area 151c, which will be described in greater detail below, where the file is recorded. When the file is divided and recorded into a plurality of clusters, addresses of the clusters are recorded in the FAT area 151b accordingly, and every time that certain data is recorded or deleted with respect to the respective clusters, the information of the FAT area 151b is updated.

The data recording area 151c is where the data to be recorded is practically recorded. The data recording area 151c is divided into a long-period recording area A and a non-recording area B.

The long-period recording area A is a non-volatile recording area where the data to be recorded, such as image/sound signals, is formatted into a file and recorded for a long time period according to the recording command from the user. The file which is recorded for a long time period can be edited in accordance with preferences of the user.

The non-recording area B refers to a area where no data is recorded. The temporary recording area B1 of the non-recording area B is allocated adaptively for the time delay viewing function, and the rest of the non-recording area B is maintained as an empty recording area B2.

To describe the above in greater detail, the temporary recording area B1 is a volatile recording area to temporarily record the currently-viewing programs, for the time delay viewing function. That is, the temporary recording area B1 can be used for temporarily recording the externally-received programs by the first-in first-out (FIFO) basis.

If a long-time recording command is applied with respect to the program which is temporarily recorded in the temporary recording area B1, the requested program is recorded for a long-time basis in the area of the long-time recording area A which holds no data.

The root directory area 151d records therein attribute information and location information of the recording data recorded in the data recording area 151c in long-time and temporary basis. The root directory area 151d can be divided into a plurality of recording clusters where the attribute information and location information of the data to be recorded is recorded, and a plurality of non-recording clusters which hold no attribute information and location information. The attribute information of the file generated by the main control unit 160 includes information of the data to be recorded, such as a file name, a file size, recording date/time, image quality information and sound quality information, and the location information includes recording-start address and recording-finish address of the data to be recorded. Also, with the edition of the file such as recording and deletion, the status information of the FAT area 151b, and the attribute information and location information of the root direction area 151d are updated accordingly.

The root directory recording area 151d has a time map (TMAP) structure by the '*.map' file which is generated by the main control unit 160 during the generation of a predetermined recording data. The data to be recorded is then connected with the location information in the FAT area 151b and the attribute information in the attribute information area by the TMAP.

Figure 72:
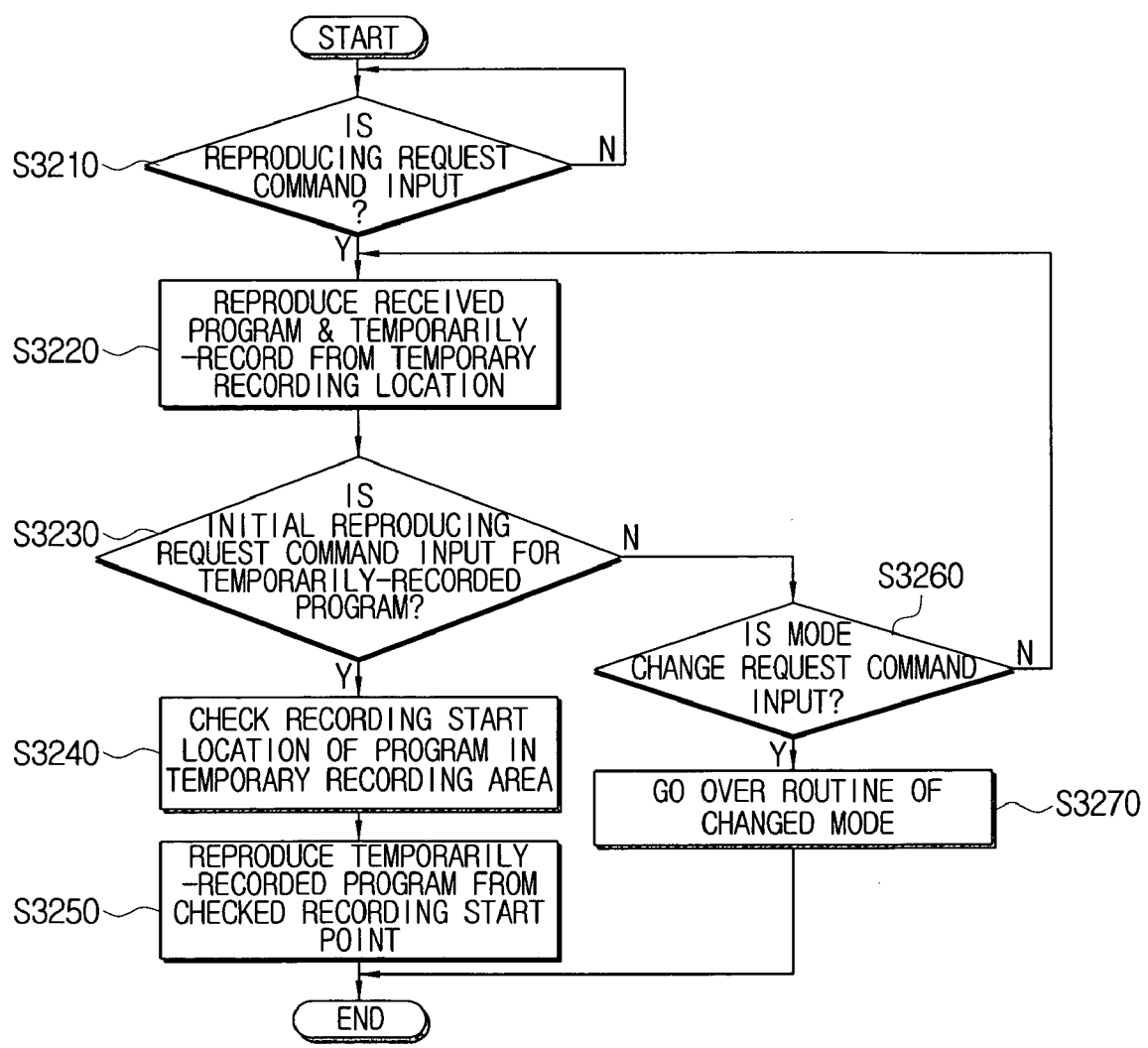
FIG. 72 is a flowchart illustrating an example of the process of reproducing the image/sound signals which are temporarily recorded in the HDD of FIG. 2.

Referring to FIGS. 71 and 72, menu screen processing for the setting of temporary-recording area B1 will be described in greater detail below.

FIG. 71 shows the "Language", "Channel", "Clock setting", "Buffer time", "Audio option", "Display option", and "TV Type" menus as the sub-menus (i.e., first sub-menus) of the "Set-up" menu 550, which are displayed in accordance with the selection of the "Set-up" menu 550 among the initial menus 510 through 550 shown in FIG. 5. FIG. 71 shows the sub-menus (i.e., second sub-menus) of the "Buffer time" menu, which are displayed in accordance with the selection of the "Buffer time" menu among the first sub-menus.

Referring to FIG. 71, the "Buffer time" menu of the first sub-menus is the time delay function, which is used to make a setting, such that the program received from a selected image signal generating source is temporarily recorded in the temporary recording area B1 by the FIFO basis and by a predetermined amount which is supported by the second sub-menus. The time delay function is especially useful when a certain broadcasting program is temporarily recorded in the temporary recording area B1, while being reproduced through the television 300 at the same time.

That is, with the selection of a certain buffer time through the remote controller 200 in the screen as shown in FIG. 71, the buffer area is allocated to the non-recording area B in the amount corresponding to the selected buffer time. For example, if the buffer time of '1 Hr' is selected through the remote controller 200 among the second sub-menus, the temporary recording area B1 is allocated to a portion of the non-recording area B in the amount that can allow temporary-recording for one hour. If "auto" buffer time is selected, the temporary recording area B1 is allocated to the entire area of the non-recording area B so that the received program can be temporarily recorded as much as the entire size of the non-recording area B. If "off" buffer time is selected, there is no allocation of temporary recording area B1, and therefore, the received program is not temporarily recorded.

If the currently-reproducing program is also temporarily recorded in the allocated temporary recording area B1, the location information about the initial cluster where the reproducing program is temporarily recorded (i.e., the information about the recording start location of the temporary recording area B1), is recorded in the root directory area 151d.

Here, the image/sound signals of the program being received from the image signal generating source in the form of viewable signals, are supported by at least one of the satellite broadcasting, the optical recording medium and the disk player 155, which loads recorded signals from the terrestrial wave broadcasting.

FIG. 72 is a flowchart illustrating a method for reproducing image/sound signals which are temporarily recorded in the HDD 151 of FIG. 2.

Referring to FIG. 72, after power up or Start, a reproducing request command is input from the remote controller 200 with respect to a program from a certain image signal generating source (step S3210), and the main control unit 160 processes the received program such that it is reproduced and temporarily recorded in the temporary recording area B1 (step S3220).

To describe S3220 in greater detail, the main control unit 160 controls the MPEG decoder 163, the sound D/A converter 135 and the image encoder 137 to process the received program into viewable signals, and at the same time, controls the HDD 151 to temporarily record the received program in the pre-allocated area of recording, temporary recording area B1, from the start location.

In S3220, the location of the portion of the cluster where the received program is first recorded (i.e., the location of the recording start location of the cluster), is recorded in the root directory area 151d, and accordingly, the status information of the FAT area 151b is also updated. Further, in S3220, the received program is temporarily recorded for a period equal to the buffer time selected through the menu screen as shown in FIG. 71, and temporarily recorded by the FIFO basis.

In S3220, if the time delay reproducing key (not shown) of the remote controller 200 is selected and therefore an initial reproducing request command is input (step S3230), the main control unit 160 controls the HDD 151 to check the recording start location of the temporarily-recorded program from the status information which is recorded in the FAT area 151b (step S3240).

If the recording start location of the temporarily-recorded program is checked, the main control unit 160 controls the HDD 151 to provide the temporarily-recorded image/sound signals to the MPEG decoder 163 from the checked recording start location, and with the provision of the image/sound signals of the program, to process the provided signals into reproducible signals and provide the processed signals to the television 300 (step S3250).

If a mode shift request command is input after S3230 in the current reproducing mode (step S3260), the main control unit 160 processes the routines with respect to the shifted mode (step S3270).

In S3220, the recording start location of the temporarily-recorded program may be the initial recording location of the temporary recording area B1, for example, a location which is perceived as address No. '0'. If the currently-reproduced program is shifted by the user, the new program is temporarily recorded in the temporary recording area B1 from the initial recording location. However, it can be set such that the new program is temporarily recorded right after the location where the previous program has been temporarily recorded. This setting can be made by the user through manipulation on the corresponding keys.

While the temporarily-recorded program is reproduced from the beginning in S3250, the program, which is externally-received in real-time basis, is also temporarily recorded in the temporary recording area B1 continuously. As a result, the user can view the externally-received program at a delayed time (i.e., at a predetermined time gap) which corresponds to a predetermined time temporarily recorded in S3220.

For example, if the buffer time has been preset to '1 hour' in the menu screen as shown in FIG. 71, with the selection on the time delay reproducing key at a time gap of 30 minutes from the temporary recording of a certain program in S3220, the main control unit 160 reproduces the temporarily-recorded program within a 30 minute period to the television 300. Accordingly, the user may view the externally-received program a maximum of 30 minutes later, or view the currently-received program in real-time basis through the manipulation on the remote controller 300.

As a result, the user viewing the programs through the image recording/reproducing apparatus 10 as described above can enjoy the time delay viewing function without having to perform a separate manipulation by setting the currently-viewing program to be temporarily recorded in a predetermined temporary recording area B1 automatically.

Also, in using the image recording/reproducing apparatus 10 as described above, the buffer time of the temporary recording area B1 can be variably set by using the menu screen of FIG. 71 and the remote controller 200.

The eighteenth preferred embodiment is especially directed to achieve the eighteenth aspect of the present invention, according to which, an image recording/reproducing apparatus is capable of automatically detecting the title name of the DVD program and recording the title name in a user area of the HDD when the DVD program is copied onto the HDD. The image recording/reproducing apparatus and the control method thereof according to the eighteenth preferred embodiment of the present invention will be described below with reference to FIGS. 73 to 75.

Figure 73:
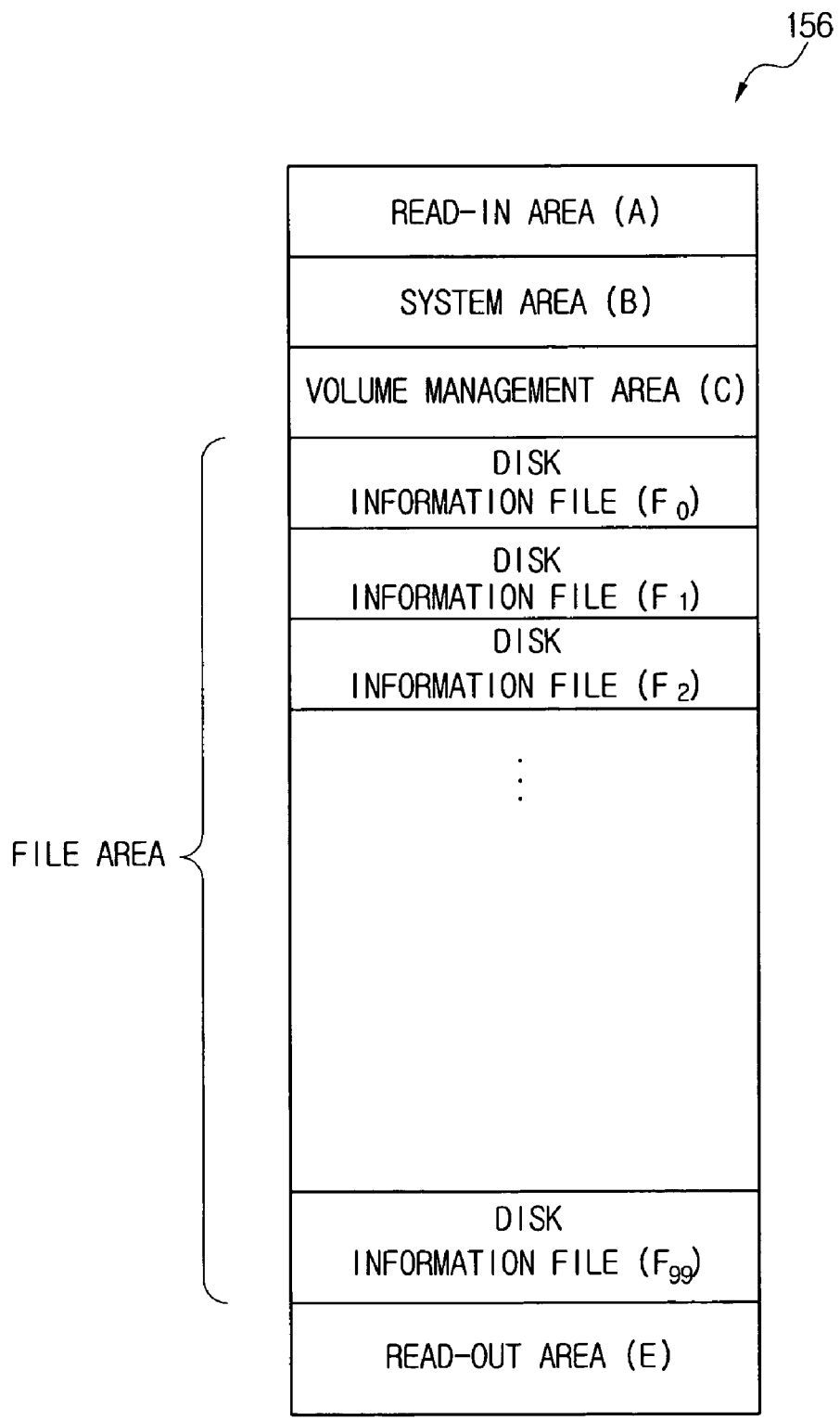
FIG. 73 is a view illustrating an example general data structure of a DVD disk according to an embodiment of the present invention.
Figure 74:
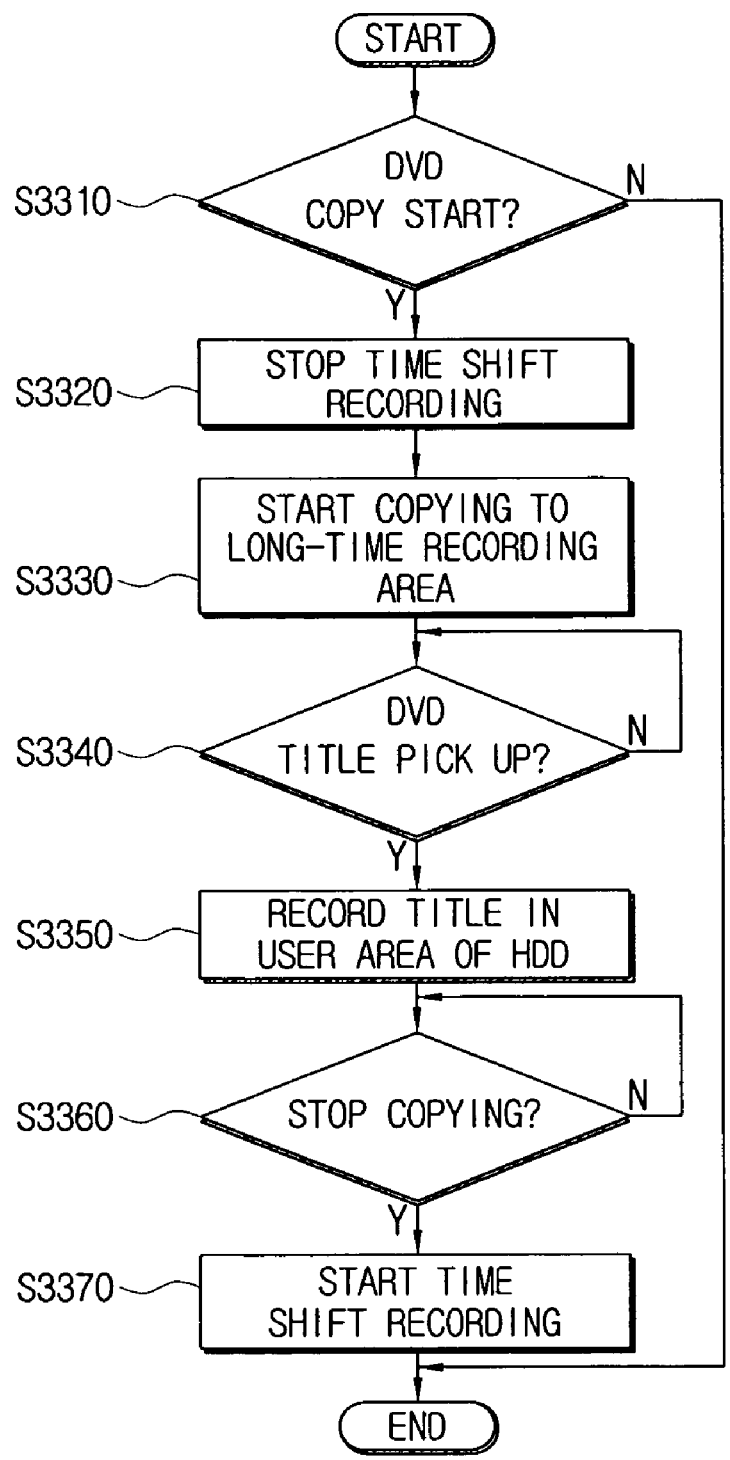
FIG. 74 is a flowchart illustrating an example of an automatic title setting method according to an embodiment of the present invention.

FIG. 73 is a view illustrating a general data structure of the DVD disk 156, in which the DVD disk 156 includes a read-in area A, a system area B, a volume management area C, a file area D consisting of a plurality of files F0 to F99, and a read-out area E. Movies and music images are practically written in the files F1 to F99 of the file area D. The file No. F0 of the DVD disk is often called a disk information file, and contains various types of reference information about the data written in file Nos. F1 to F99 of the DVD disk. Particularly, among the image data of the files Nos. F1 to F99, the location information about the image data corresponding to I-frame, and the information about the DVD title, are stored in the disk information file F0. Accordingly, a disk scan is performed using the location information of the image data corresponding to the I-frame of the disk information file F0.

When the optical pickup (not shown) of the DVD reads the Table of Contents (TOC) of the DVD disk and the information about the disk information file F0, and transmits the read information to the MPEG decoder 163, the main control unit 160 receives the decoded information about the disk information file F0 area and stores the received information in an internal memory (not shown). As described above, the disk information file F0 contains the information about the DVD title.

Hereinbelow, an automatic title setting method according to the preferred embodiment of the present invention will be described. First, as the DVD disk 156 is mounted in the disk player 155, the optical pickup (not shown) of the disk player 155 reads the TOC (Table of Contents) of the disk and the information about the disk information file F0 area, and provides the main control unit with the read information. The MPEG decoder 163 decodes the information about the disk information file F0 area, and the main control unit 160 stores the decoded information in the internal memory (not shown). As described above, the information about the disk information file F0 area contains the information about DVD title.

The disk player 155 performs a regular reproducing operation with respect to the disk. According to the regular reproducing operation of the disk player 155, image/sound signals of the files F1 to F99 of the disk 156 are sequentially read and provided to the main control unit 160, and the main control unit 160 encodes the read image/sound signals and outputs the same to the switching unit 123.

The main control unit 160 controls the switching unit 123 such that the input signals can be recorded in the temporary recording area B1 for the time shift function of the HDD 151, while simultaneously being output to the outside.

During the regular reproducing operation of the disk player 155, if a key signal corresponding to the DVD copy is provided from the remote controller 200 to the main control unit 160 (step S3310), the main control unit 160 stops the time shift function (step S3320), and starts storing the signals in the long-time recording area A of the HDD 151 (step S3330). As the recording continues, the main control unit 160 determines whether the information about the DVD title of the signals being currently reproduced from the disk information file F0 of the DVD is picked up or not (step S3340), and if so, records the DVD title in the user data area, and records the user data in the root directory area 151d of the HDD 151 (step S3350). If the information is determined as not being picked up, the above process repeats until the information is picked up.

The copying continues after S3350, and if a key signal indicating a request to stop the copying is input (step S3360), the main control unit 160 stops the recording operation on the long-time recording area A of the HDD 151, and resumes recording on the temporary recording area B1 for the time shift function.

The process in which the user displays the recorded title on the screen will be briefly described below with reference to FIG. 75.

Figure 75:
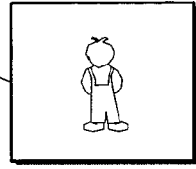
FIG. 75 is a view illustrating an example of the menu displayed on the screen in response to the selection of the program list as shown in FIG. 6.
Figure 75:
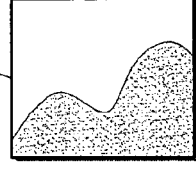
Figure 75:
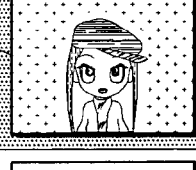
Figure 75:
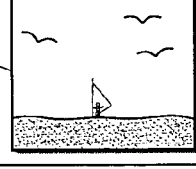

FIG. 75 is a view illustrating a menu screen which is displayed on the television screen in response to the selecting of program list 511 as shown in FIG. 6.

The program list menu includes an icon menu 421-1 which corresponds to the programs stored in the HDD 151, a title indicating unit 421-6 which shows the title of the program corresponding to the respective icons 421-2 to 421-5, a date indicating unit 421-7 which shows the date when the programs are stored in the HDD 151, and a time length indicating unit 421-8 which shows the time length of the respective programs. The respective icons 421-2 to 421-5 represent the first frame of the MPEG image data (i.e., represent the I frames), and have the information about the start address of the programs stored in the HDD 151. The title indicating unit 421-6 is indicated as the main control unit 160 and reads the titles from the root directory area 250d of the HDD 151 in accordance with the user selection on the program list.

The nineteenth preferred embodiment is especially directed to achieve the nineteenth aspect of the present invention, according to which an image recording/reproducing apparatus is capable of storing the received image/sound signals in the divided memory areas of the HDD, and displaying the size of the stored image/sound signals and also the size of the rest memory area. Hereinbelow, the image recording/reproducing apparatus and control method thereof according to the nineteenth preferred embodiment will be described in detail with reference to FIGS. 76 to 79.

Figure 76:
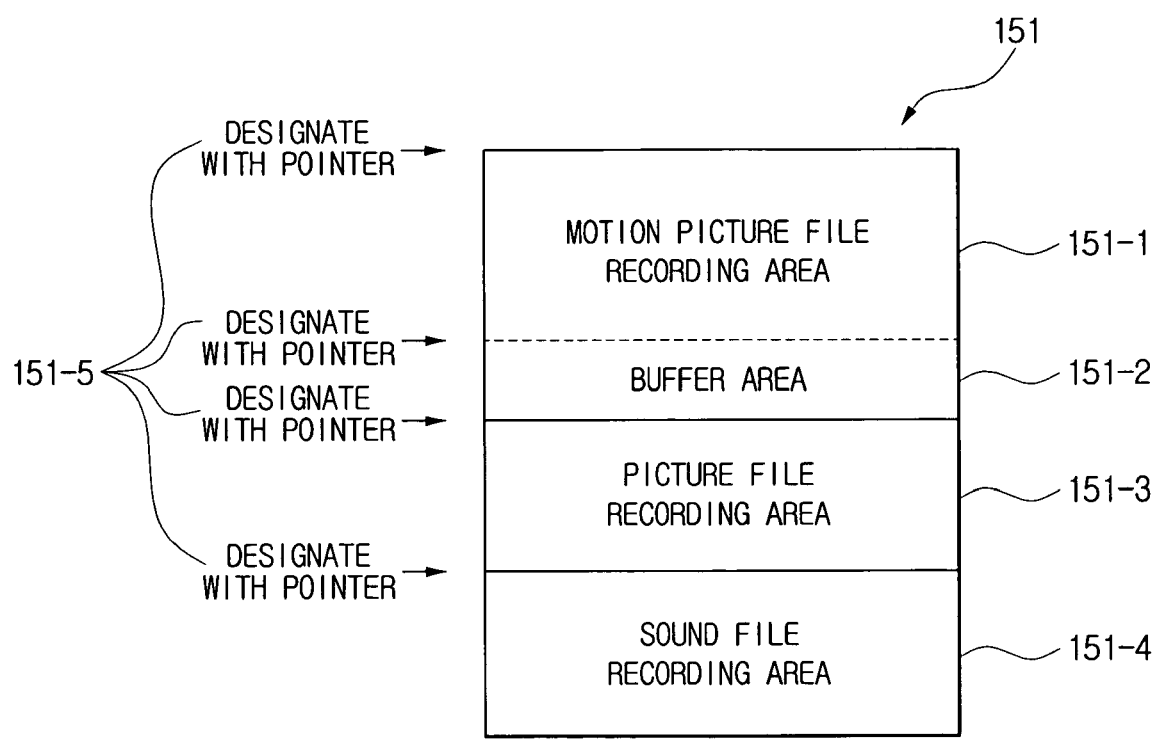
FIG. 76 is a view illustrating an example of the HDD which is designated by the pointers and divided according to an embodiment of the present invention.

FIG. 76 shows the HDD 151 which is divided according to the present invention. The HDD 151 is depicted as being divided into a motion picture file memory area 151-1, a picture file memory area 151-3 and a sound file memory area 151-4. If a file with different attributes is added, the HDD 151 can be divided even more. Further, the motion picture file memory area 151-1 may contain a buffer area 151-2 therein. The motion picture file memory area 151-1, the picture file memory area 151-3, the sound file memory area 151-4 and the buffer area 151-2 are designated by the pointers 151-5 and divided.

The motion picture file memory area 151-1 is a division inside the HDD 151, which stores the motion picture files in accordance with a motion picture file storage command. The picture file memory area 151-3 is a division inside the HDD 151, which stores the picture file in accordance with a picture file storage command. The sound file memory area 151-4 is a division inside the HDD 151, which stores the sound files in accordance with a sound file storage command.

Figure 77A:
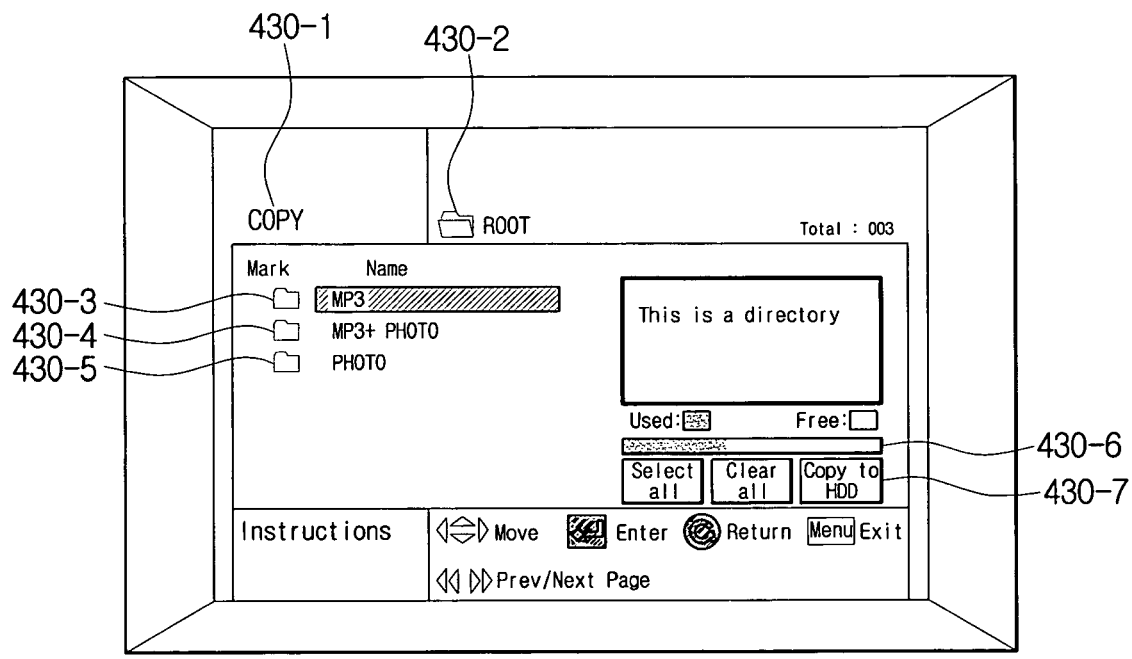
FIG. 77A is a view illustrating an example of the size of the picture and sound files and remaining capacity of divided memory area being displayed according to an embodiment of the present invention.

FIG. 77A shows a copy mode screen in which the size of the stored picture and sound files and remaining memory of the memory area are displayed. With the input of a storage command such as a copy command 430-1, the picture and sound files are stored in the allocated memory area. Afterward, as the operation mode returns to the storage mode, the used memory for the files being stored and the free memory remaining in the memory area are calculated and displayed, respectively. As shown in FIG. 77A, the display can be made in the form of a bar graph 430-6.

For example, if the MP3 file 430-3 of FIG. 77A is selected wherein the attribute of the MP3 file 430-3 is a sound file, with respect to the entire memory area allocated for the sound file, the size of the stored file and the remaining memory of the memory area are separately displayed. If the PHOTO file 430-5 is selected wherein the attribute is a picture file, with respect to the entire memory area allocated for the picture files, the size of the stored picture files and the remaining memory of the memory area are separately displayed.

If the MP3+PHOTO file 430-4 of FIG. 77A is selected wherein the MP3+PHOTO file 430-4 has the attribute of a combined sound file and picture file, with respect to the entire memory areas for the sound and picture files, the size of the stored files and the remaining memory of the memory area are displayed.

Figure 77B:
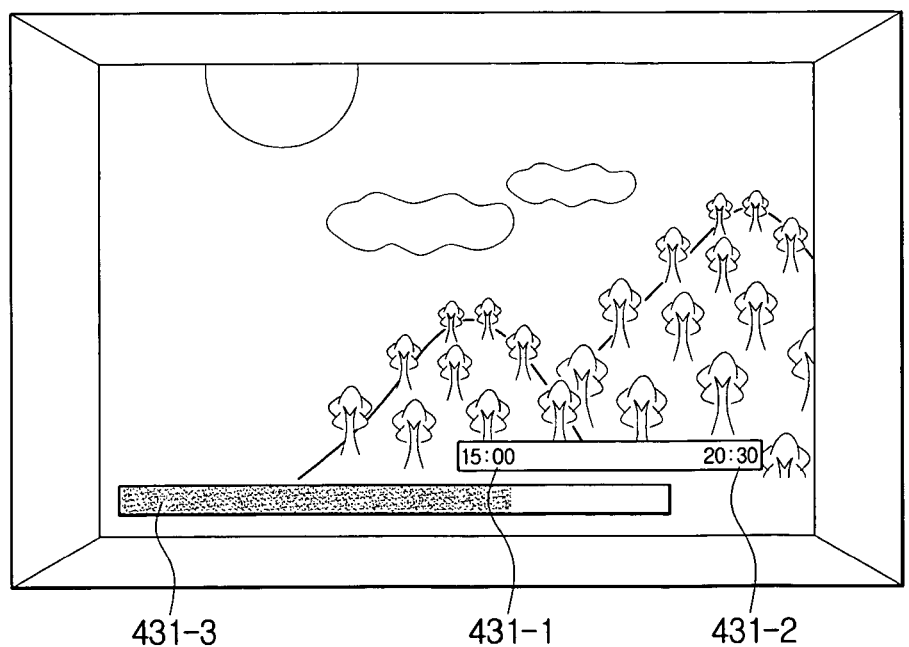
FIG. 77B is a view illustrating an example of the size of the motion picture file and remaining capacity of divided memory area according to an embodiment of the present invention.

FIG. 77B shows the display screen in which the size of the stored motion picture file and the remaining memory of the memory area are displayed. When the motion picture file storing command is input, the motion picture file is stored in the motion picture file storage area. Then when the display command is input and, taking the memory area allocated for the motion picture files as an entire area (FIG. 77B), the size of the stored motion picture file and the remaining memory of the memory area are calculated in the time unit or data size unit, and accordingly displayed in the graph pattern 431-3. Referring to FIG. 77B, the bar 431-2 representing the entire memory allocated for the motion picture files is 20 hours and 30 minutes in length, and the bar 431-1 representing the size of the stored motion picture file is 15 hours in length.

Figure 78:
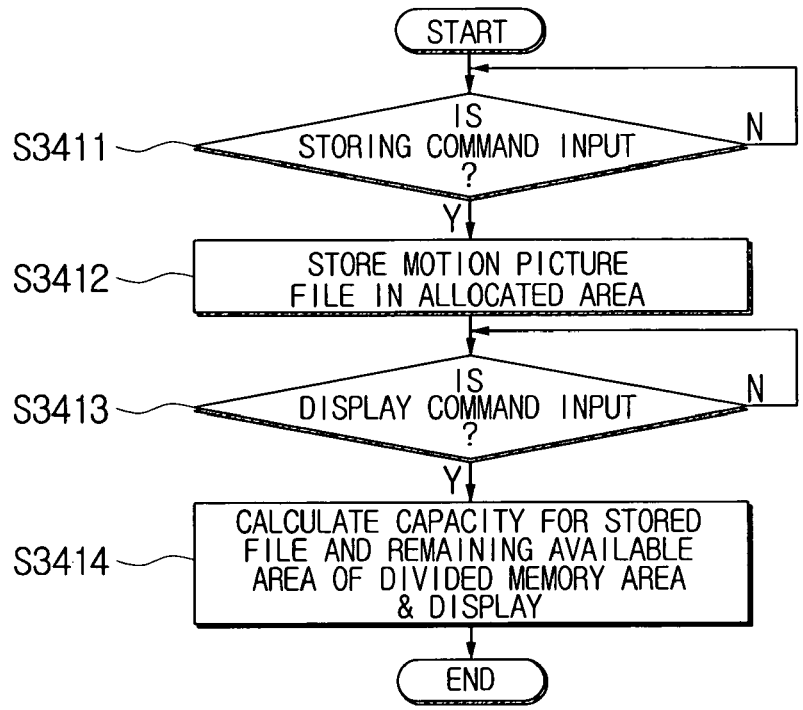
FIG. 78 is a flowchart illustrating an example of the process of displaying the size of the stored motion picture and remaining capacity of divided memory area according to an embodiment of the present invention.

FIG. 78 is a flowchart illustrating the process in which the motion picture file is stored in the HDD 151, and the size of the stored file and the remaining memory of the allocated memory area are displayed. First, as a storage command such as REC is externally input to the image recording/reproducing apparatus (step S3411), the motion picture file is stored in the corresponding motion picture file storage area of the HDD 151 which is designated by a pointer for motion picture storage (step S3412). Then when the display command is input (step S3413), the size of the stored motion picture data and the remaining memory of the allocated memory area are calculated in the time unit or the data size unit, and accordingly displayed (step S3414).

Figure 79:
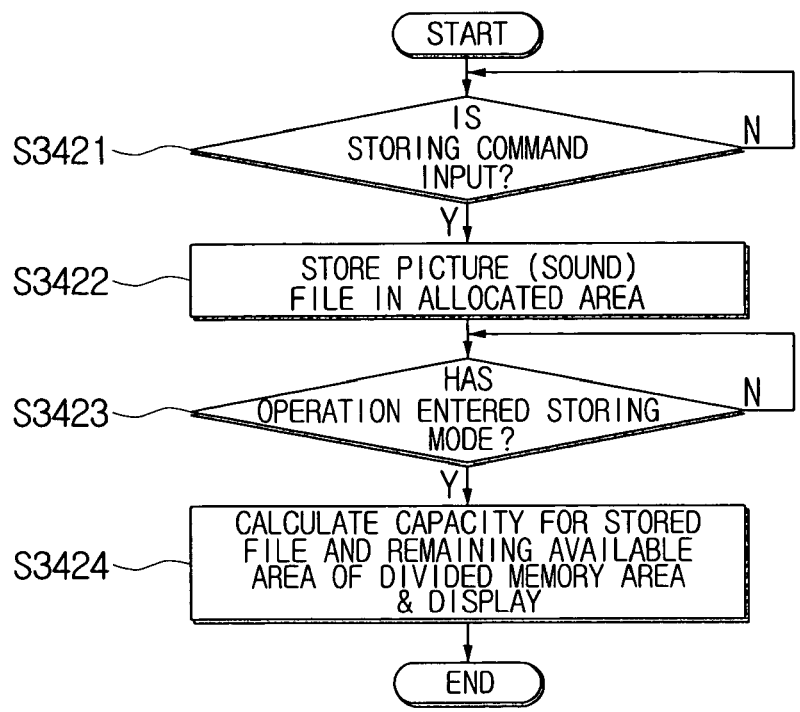
FIG. 79 is a flowchart illustrating an example of the process of displaying the size of the stored picture and sound files and remaining capacity of divided memory area according to an embodiment of the present invention.

FIG. 79 is a flowchart illustrating the process in which the picture and sound files are stored in the HDD 151 and the size of the stored files and the remaining memory of the allocated memory area are displayed. First, when a storage command such as a copy command is externally input to the image recording/reproducing apparatus 100 (step S3421), the picture and sound files are stored in the picture and sound file storage area of the HDD 151, which is allocated with the pointer for recording (step S3422). Next, when the operation mode enters a copy mode (step S3423), the size of the stored picture, sound files and the remaining memory of the allocated memory area in the time unit or the data size unit are calculated and accordingly displayed (step S3424).

The picture file and the sound file may be stored and displayed separately, or stored and displayed in unison. For example, if the file has the very mixed picture and sound therein, the picture and sound files may be stored and displayed together.

The present embodiment as described above with reference to FIGS. 78 and 79 may also be applied in the same pattern, or in a slightly varied pattern, to the process which stores files other than motion picture files, picture files and sound files in the HDD 151, and displays the size of the files and remaining memory of the allocated memory area.

The twentieth preferred embodiment is especially directed to achieve the twentieth aspect of the present invention, according to which an image recording/reproducing apparatus is capable of producing animation effects by using the still icons stored in the memory. In the following description, the image recording/reproducing apparatus and control method thereof according to the twentieth preferred embodiment of the present invention will be described with reference to FIGS. 80 and 81.

According to the twentieth preferred embodiment of the present invention, the HDD 151 stores image/sound signals, and also the image data about the icons. The main control unit 160 stores or reads the image data of the icons with respect to the HDD 151. Further, the main control unit 160 performs a control operation such that the icon data stored in the HDD 151 can be read and displayed through the television 300 in accordance with the input through the remote controller 200. To this end, the remote controller 200 is provided with a plurality of keys, such as the keys for operating the system, the keys for storing and selecting the icons and the keys for performing 'moving icon' function.

In the following description, the 'moving icon' keys having the 'moving icon' selecting key (not shown) and 'time setting' key (not shown), will be described as one example.

Addresses are stored in the flash memory 165 corresponding to the respective icons stored in the HDD 151. Additionally, linked list information such as addresses of HDD 151 can be stored, and time interval or number of icons related with the animation function are also stored.

Figure 80:
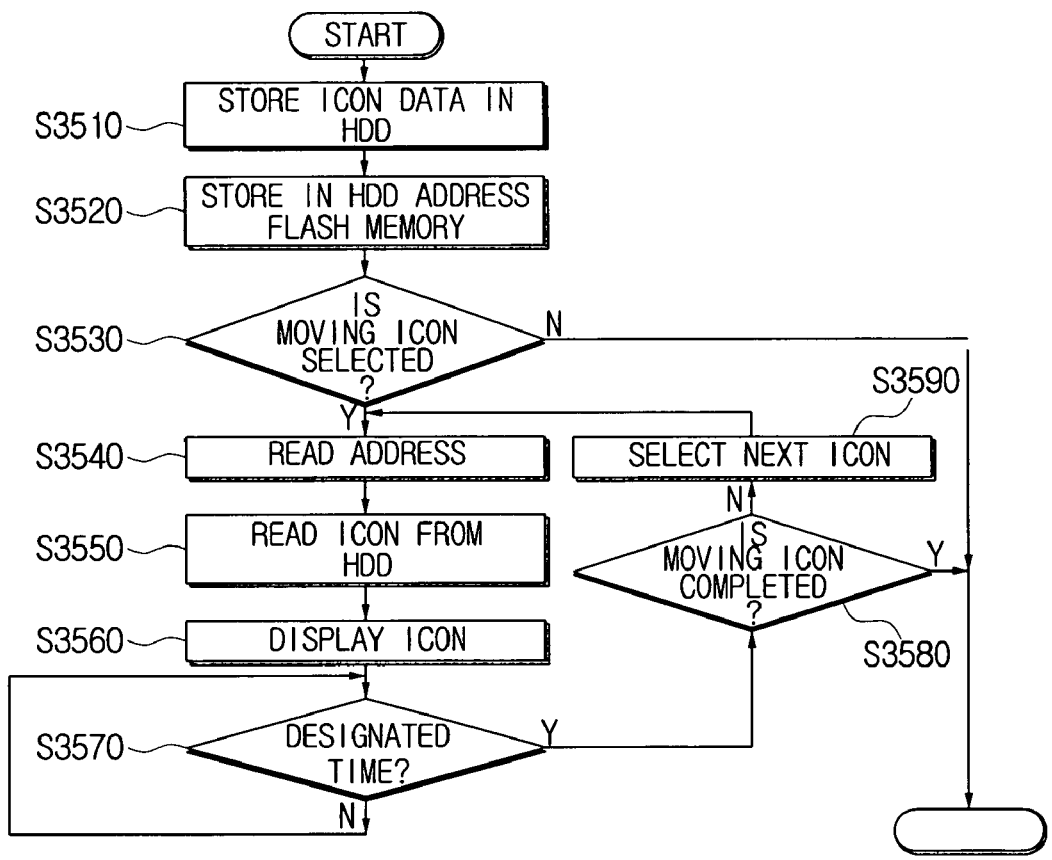
FIG. 80 is a flowchart illustrating an example method for displaying moving icon according to an embodiment of the present invention.

FIG. 80 is a flowchart illustrating the method for displaying moving icons according to the present invention.

As the user selects the 'moving icon' function using the remote controller 200, the main control unit 160 stores the data of the selected icon in the HDD 151 or the CD (not shown) through the data management unit 157 (step S3510). Further, the main control unit 160 stores in the flash memory 165 the linked list information such as the address of the HDD 151 where the icon is stored in S1910 (step S3520). Time interval or number of icons related with the animation function are stored at this time. As the image files, which require large capacity, are separately stored from the addresses, memory management becomes efficient.

In the above-described S3510 and S3520, the user selects and stores the icon in the HDD 151 in order to select the 'moving icon' function by way of example. However, this should not be considered as limiting. For example, the 'moving icon' can be pre-stored in the HDD 151, and the selecting process can be omitted. More preferably, the main control unit 160 may display all the icons stored in the HDD 151 through the GUI storage unit 165a of the flash memory 165 in accordance with the input of 'moving icon' setting keys so as to allow the user to select icons for the 'moving icon' function with convenience.

If the icon for the 'moving icon' function is selected and stored in the memory, the main control unit 160 determines whether the user inputs the 'moving icon' key or not (step S3530). If the user selects the 'moving icon' in S1930, the main control unit 160 reads the HDD address, which is the linked list information related with the 'moving icon' stored in the flash memory 165, (step S3540), reads the first icon stored in the HDD 151 (step S3550), and controls the input/output control unit 125 to display through a predetermined position of the television 300 (step S3560).

The main control unit 160 compares the display time of the first icon with the animation time of the first icon stored in the flash memory 165 (step S3570). If it is determined that the display time of the first icon exceeds the animation time in S3570, it is determined whether the 'moving icon' end key is input or not (step S3580). Preferably, the user can select display time of the GUI storage unit 165a of the flash memory 165 by the main control unit 160 when the user selects the 'moving icon' select key in S3570. As the user can select the display time according to the type of the icon selected, the user can conveniently make various types of animation. If there is no input of the 'moving icon' end key within a predetermined time in S3580, the main control unit 160 selects a second icon which is stored in the flash memory 165 (step S3590).

Figure 81:
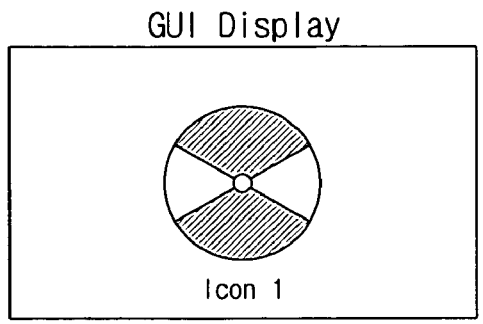
FIG. 81 is a view illustrating an example of the user interface to describe the process of performing moving icon display according to an embodiment of the present invention.
Figure 81:
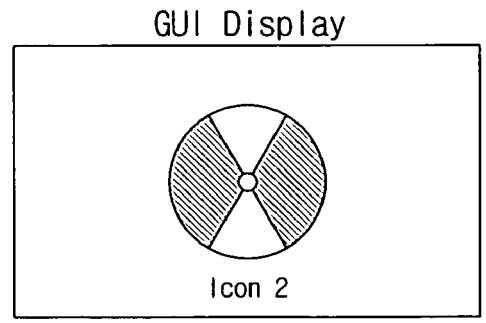

If the second icon is selected in S3590, the main control unit 160 repeats S3540 to S3580. By displaying the second icon in the same position as the first icon, animation effects can be obtained with convenience and less number of icons. That is, by repeating the process of displaying the first icon as shown in FIG. 81 and then spreading the second icon over the first icon in seconds, animation effect can be obtained with the still icons. It is also preferred that the type and the number of animated icons are selected so that animation effects continue with different icons in predetermined time intervals. When the 'moving icon' end key is input in S3580, the main control unit 160 ends the 'moving icon' function according to the present invention.

The twenty-first preferred embodiment is especially directed to achieve the twenty-first aspect of the present invention, according to which an image recording/reproducing apparatus is constructed to select a first file, store in the memory and display on a screen for the execution, and subsequently to select a second file, and store in the memory and display on a screen for the execution. Hereinbelow, the image recording/reproducing apparatus and control method thereof according to the twenty-first embodiment will be described with reference to FIGS. 82A to 84.

Figure 82A:
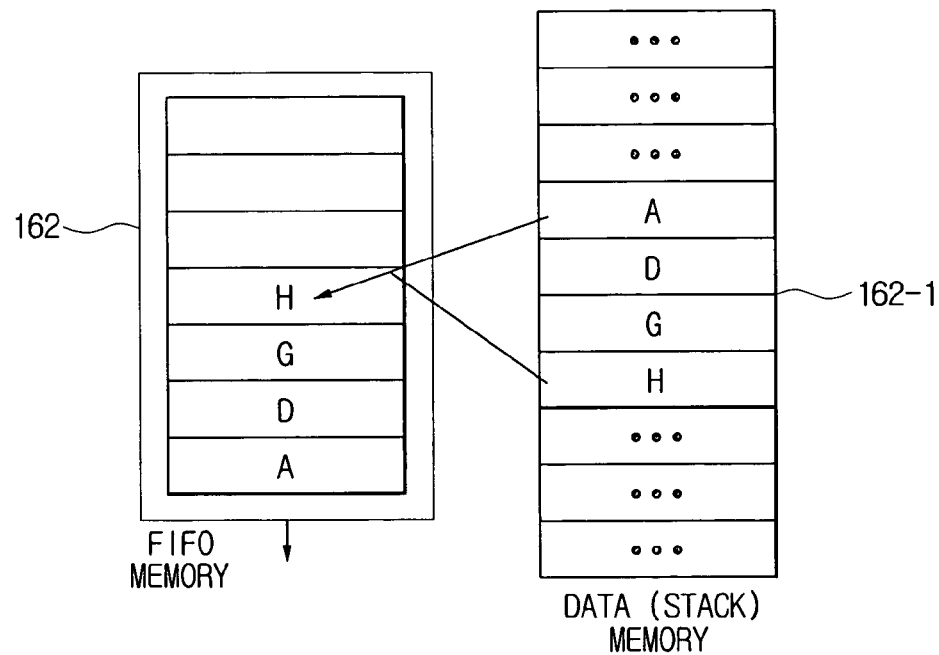
FIGS. 82A and 82B are views illustrating an example of the process in which first files are stored in FIFO memory and second files are stored sequentially according to an embodiment of the present invention.
Figure 82B:
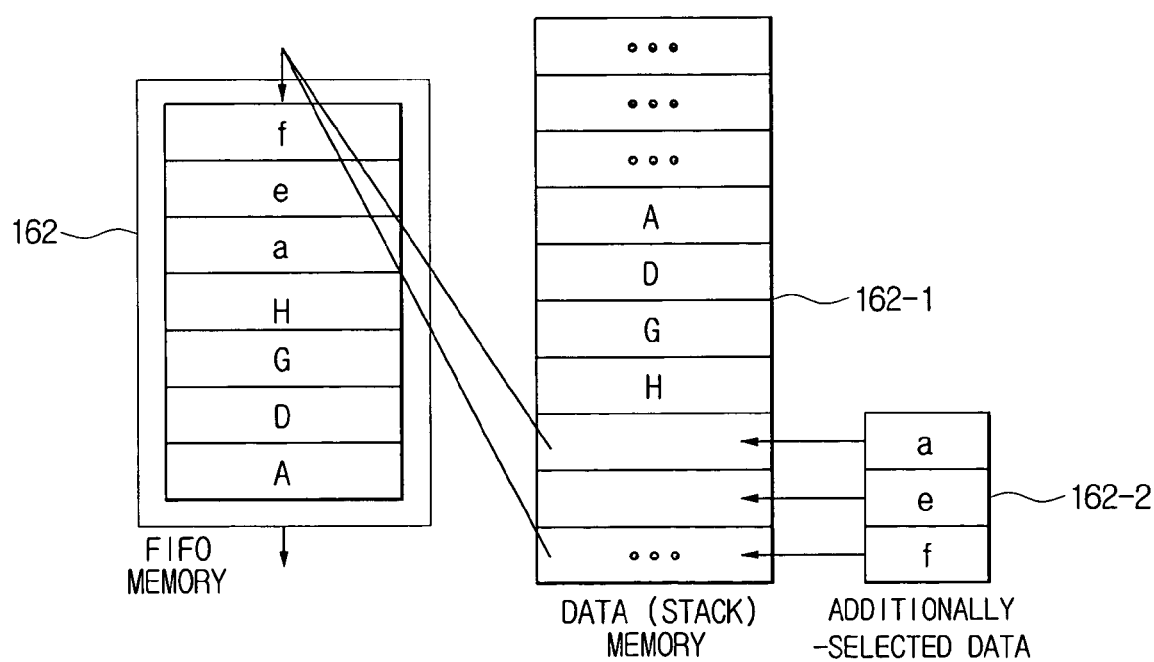

FIG. 82A shows the files selected from the data memory of the CPU 161 being stored as first files 162-1 in the FIFO memory 162 employing a FIFO technique. FIG. 82B shows the second files 162-2 being subsequently stored. Preferably, the FIFO memory 162 may be provided inside the main control unit 160. As shown, the first files 162-1 selected from the data memory of the CPU 161 are for the storage in the FIFO memory 162, and the second files 162-2, which are additionally selected, are for the storage from the data memory to the remaining area of the FIFO memory 162 in a sequential order. When the FIFO memory 162 is full, the files are output from the FIFO memory 162 by the order of input. For example, if the A, D, G and H files are selected and stored in the FIFO memory 162 as the first files 162-1, and then a, e and f files are selected and stored in the FIFO memory 162 as the second files 162-2, according to the FIFO technique, the first-come files (i.e., the A, D, G and H files) 162-1 are output from the FIFO memory 162 before the second-come files (i.e., the a, and f files) 162-2.

In FIGS. 82A to 83D, the first files are selected and displayed, and the second files are additionally selected and displayed. In other words, it is shown how the file storing in the FIFO memory 162 of FIGS. 83A and 83B is achieved.

Figure 83A:
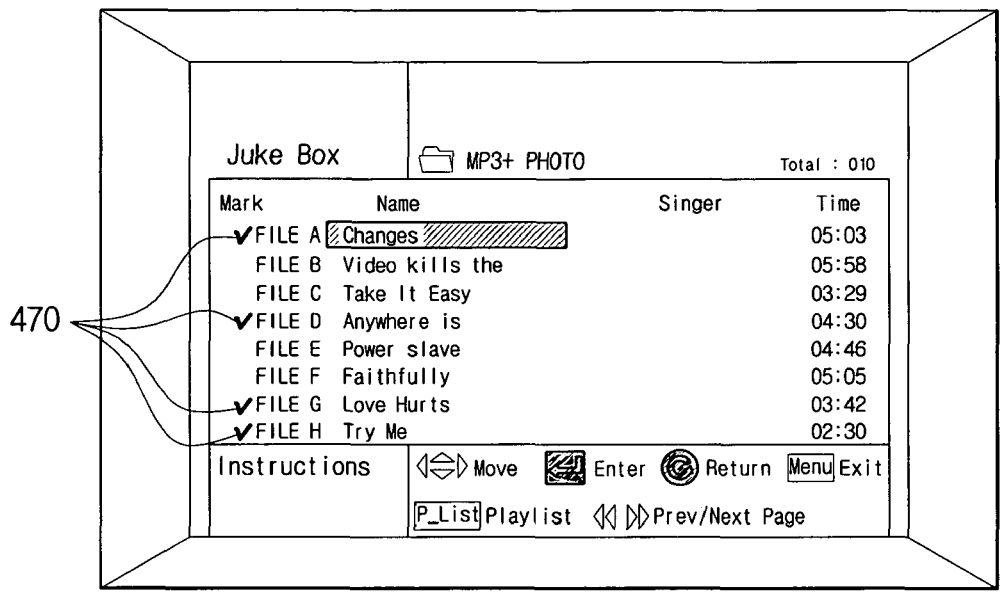
FIGS. 83A to 83D are flowcharts illustrating an example of the process in which, in sequential order, the first files are selected, stored and displayed, and the second files are selected, stored and displayed according to an embodiment of the present invention.
Figure 83B:
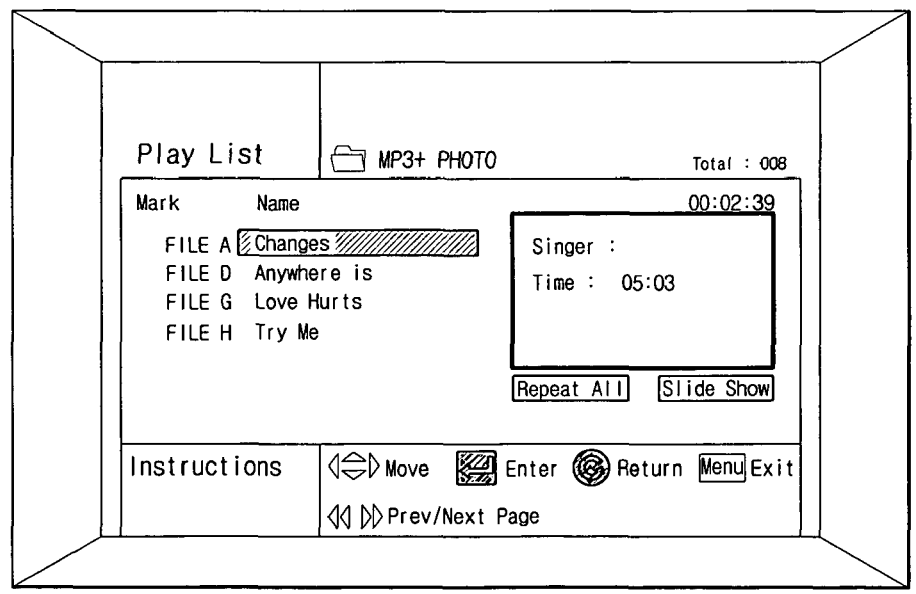
Figure 83C:
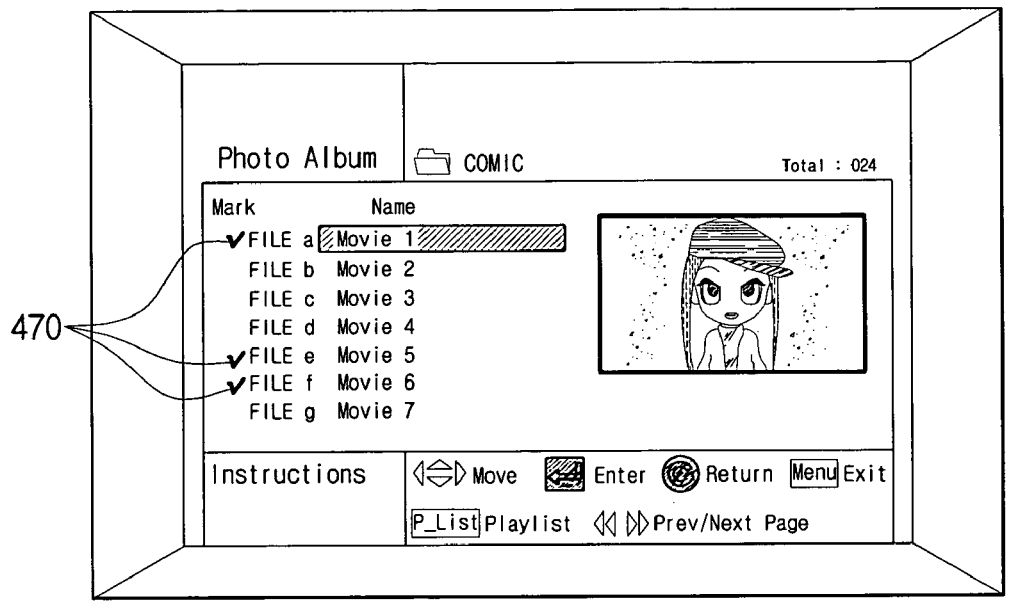
Figure 83D:
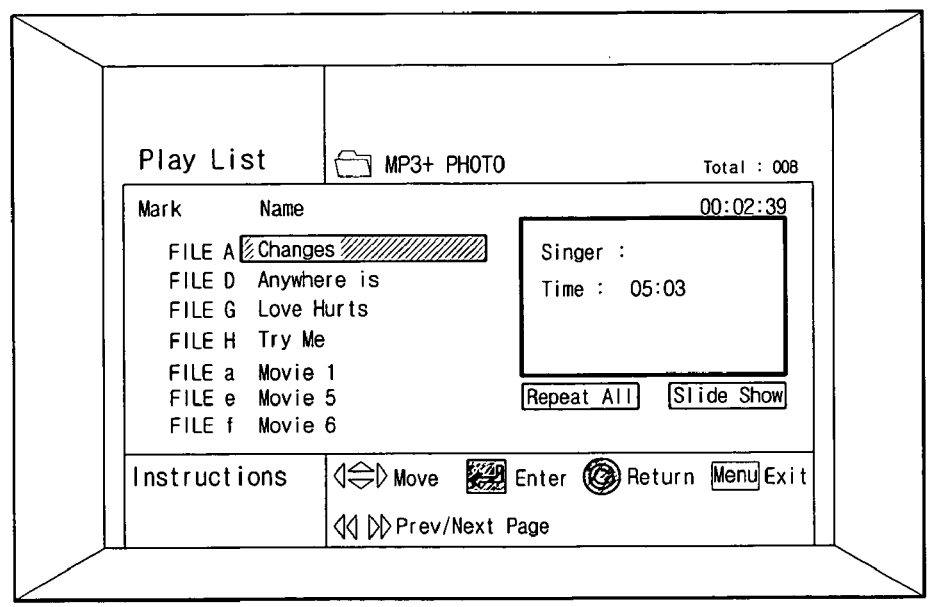

First, if at least one first file is selected from the first folder, the selection mark 470 is indicated at the left side of the selected file. The selection mark 470 can also be indicated other proper places. In FIG. 83A, A, D, G and H files are selected as the first files 162-1. Upon execution, the play list screen is displayed, and the first files 162-1 are displayed in the order intended by the user, or randomly as in FIG. 83B. If at least one second file is selected from the other type of medium, the selection mark is indicated at the left side of the selected file as in FIG. 83C. The selection mark can be indicated at other proper places as in FIG. 83A described above. In FIG. 83C, a, e and f files are selected as the second files 162-2. Upon execution, the play list screen is displayed such that the second files are additionally displayed and therefore, the first and second files are executed in an order intended by the user, or randomly as in FIG. 83D.

Figure 84:
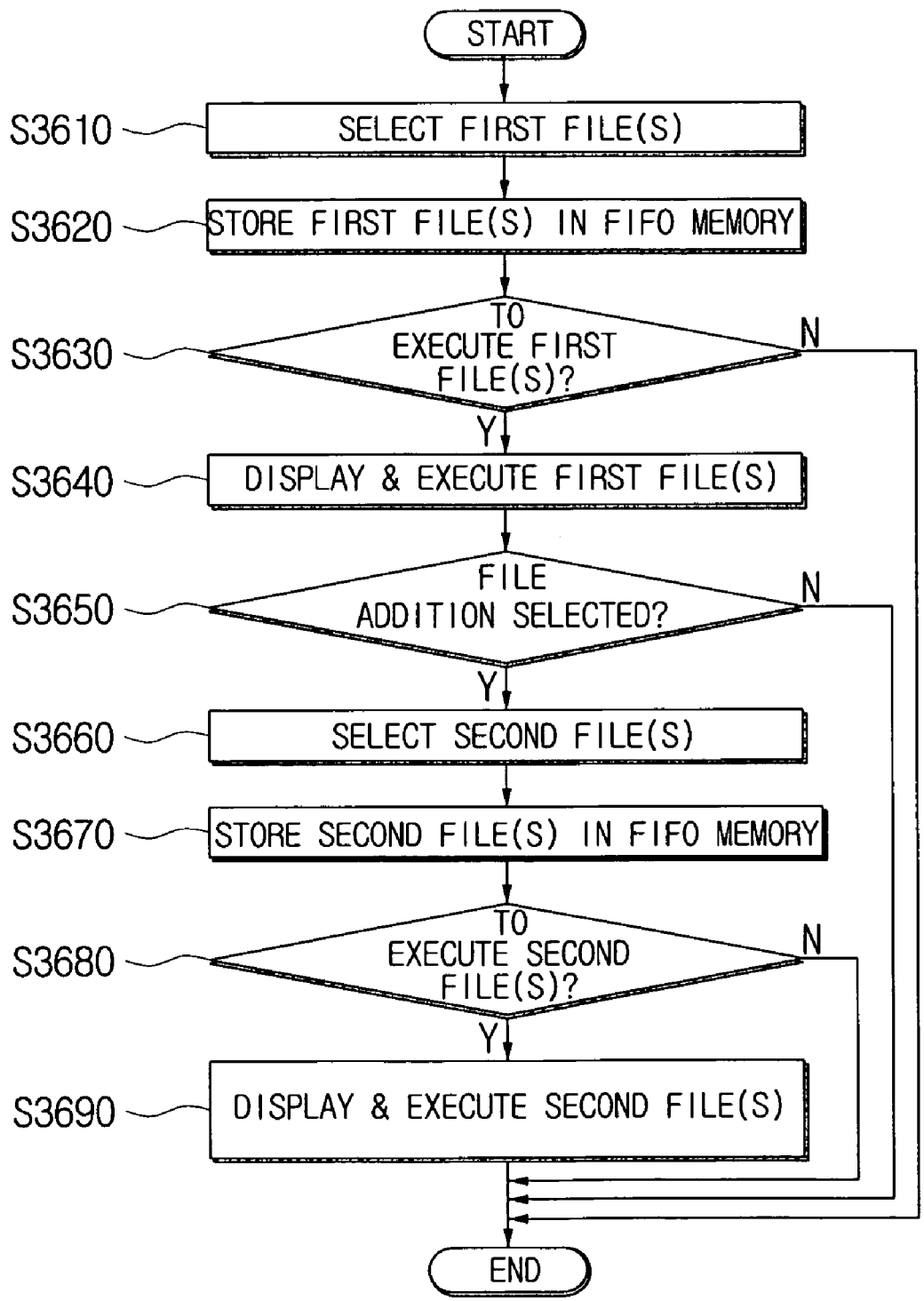
FIG. 84 is a flowchart illustrating an example of the process in which, in sequential order, the first files are selected and displayed and the second files are added to the first files and selected and displayed according to an embodiment of the present invention.

Hereinbelow, an image and sound recording/reproducing method, which is capable of displaying the list of files according to the twenty-second preferred embodiment of the present invention will be described in detail with reference to the accompanying drawings. FIG. 84 is the flowchart showing the process in which the first files are selected and displayed, and the second files are additionally selected and displayed.

If the first files are selected from the first folder (step S3610), the stack memory stores the first files (step S3620). If the execution command for the stored first files is input (step S3630), the first files are displayed in the play list and executed (step S3640). After that, if there is an input of command for additional selection of the files (step S3650), second files are selected from the second folder or from the other types of medium (step S3660), and the selected files are stored in the stack memory (step S3670). If a command for executing the stored second files is input (step S3680), the stored second files are additionally displayed in the play list and executed (step S3690).

Although the case where the video is displayed in the upper and lower areas of the screen is described in the above embodiment, the video may be displayed only in the upper area or the lower area.

With the above description, according to an embodiment of the present invention, in the functions of recording the image files in the recording medium and reproducing and editing the image files recorded in the recording medium, the user can easily select and manipulate the functions using the menu display, and can manage the recorded image files more effectively and search for the image files more easily.

Specifically, according to at least one embodiment, the present invention can perform the random access capable of displaying or reproducing the file selected by the user among a plurality of image files recorded in the recording medium by quickly reading the selected file, thereby enabling the file to be searched for more quickly.

According to at least one embodiment, the present invention can also correct the file name of the image file recorded in the recording medium to easily search for a desired file.

According to at least one embodiment, the present invention can also reproduce and display the moving picture files recorded in the recording medium on a file list menu as moving pictures to easily search for the image file recorded in the recording medium.

According to at least one embodiment, the present invention can also display the file list of image files recorded in a recording medium along with the icons according to kinds of image files, thereby easily illustrating to the user the kind of the image file.

According to at least one embodiment, the present invention can also continuously reproduce the image files recorded in the recording medium in the order of their storage in the recording medium. According to at least one embodiment, the present invention can also easily edit the image file. According to at least one embodiment, the present invention can also partially delete the moving picture.

According to at least one embodiment, the present invention can also enable the user to recognize the folder in which the presently displayed file is located more easily by providing a play list menu designed to enable the user to easily recognize the name of the folder in which the image file is recorded.

According to at least one embodiment, the present invention can also display the 'Play List' of the image file recorded in the recording medium on the screen, and easily and quickly select the file using the displayed 'Play List'. According to at least one embodiment, the present invention can also display the diverse still picture files while the music file is reproduced, thereby embodying the music replay and the slide show at the same time.

According to at least one embodiment, the present invention can also automatically reproduce the files irrespective of the kind of the file when the recording medium containing the files that can be automatically reproduced is inserted, thereby not performing the separate manipulation to easily reproduce the file recorded in the recording medium.

According to at least one embodiment, the present invention can also display the additional information on the music CD on the screen when reproducing the music CD, thereby allowing the user to acquire the information on the music CD and easily select the desired song.

According to at least one embodiment, the present invention can also skip the files having the same file name when the files recorded in the optical recording medium are copied into the mass storage magnetic recording medium.

According to at least one embodiment, the present invention can also compress and store the audio data having a CD-DA standard, thereby effectively using the recording medium.

According to at least one embodiment, the present invention can also adaptively adjust a size of the still picture based on a size of the predetermined display area and display the still picture in the predetermined display area. In doing so, the apparatus displays the still picture having the aspect ratio and/or display size suitable to the display area to embody the thumbnail providing a more natural visual effect.

According to at least one embodiment, the present invention can also provide the menu for enabling the user to easily select and manipulate functions supported by the image recording/reproducing apparatus.

According to at least one embodiment of the present invention, during the temporary recording of currently-viewing program by the time-delay viewing function, it is possible to return the program to the beginning at once through the use of hot keys as provided. Therefore, the user can view the temporarily-recorded program from the beginning without having to do complicated key manipulation with convenience.

According to at least one embodiment of the present invention, in recording image information using DVD, the title name is recorded in the user data area and the user data is recorded in the HDD. Accordingly, title name can be automatically provided with respect to the stored programs.

According to at least one embodiment of the present invention, respective files are sorted and stored in the memory area of the HDD according to the designation by the pointers, respectively. Because the size of the files and available capacity of the divided memory areas are respectively taken into account, the file display can be performed appropriately.

According to at least one embodiment of the present invention, flash memory can be used efficiently, and still icons stored in the HDD are used to create animation effect.

According to at least one embodiment of the present invention, a desired file can be selectively executed, and files in the other folder or other type of medium can be additionally selected and displayed.

While the present invention has been shown and described in detail, it should be understood by those skilled in the art that various changes, substitutions and alterations can be made hereto without departing from the spirit and scope of the invention as defined by the appended claims.

What is claimed is:

1. An image recording/reproducing apparatus which records and reproduces a plurality of still image files and sound files with respect to a recording medium and provides a display apparatus with a screen of play list indicating sound files being currently reproduced, the recording/reproducing apparatus comprising:
    a decoder for decoding the still image files and the sound files recorded in the recording medium;
    a memory for storing the still image files and the sound files as decoded; and
    a main control unit for performing a process operation such that,
        a display menu is displayed in a first predetermined area of the screen of play list, wherein the display menu comprises at least one instruction icon to both set a reproduction mode and command a reproduction of an alternating display such that the plurality of still image files recorded in the recording medium are alternately and automatically displayed, and
        when the instruction icon of the display menu is selected during the reproducing of the sound files stored in the memory, the plurality of still image files recorded in the same folder as the sound files in the recording medium are decoded and stored in the memory while the decoder is idle, and one or more files among the stored still image files are alternately displayed on a second predetermined area of the screen of play list indicating sound files as commanded by the selection of the instruction icon.

2. The image recording/reproducing apparatus of claim 1, wherein the main control unit further performs a process operation such that the plurality of still image files, which are recorded in the same folder as the sound files of the sound file list, are decoded when the instruction icon of the display menu is selected.

3. The image recording/reproducing apparatus of claim 1, wherein the main control unit further performs a random access capable of displaying or reproducing a file selected by a user from among a plurality of image files recorded in a recording medium by quickly reading the selected file.

4. The image recording/reproducing apparatus of claim 1, wherein the main control unit further corrects a name of an image file recorded in a recording medium to allow a user to easily search for a desired file.

5. The image recording/reproducing apparatus of claim 1, wherein the main control unit further reproduces and displays a plurality of moving picture files recorded in a recording medium on a file list menu as moving pictures to allow a user to easily search for the image file recorded in the recording medium.

6. The image recording/reproducing apparatus of claim 1, wherein the main control unit further displays a list of image files recorded in a recording medium along with a plurality of icons according to a kind of image file to illustrate the kind of image file.

7. The image recording/reproducing apparatus of claim 1, wherein the main control unit further continuously reproduces a plurality of image files recorded in a recording medium in an order of storage in the recording medium.

8. The image recording/reproducing apparatus of claim 1, wherein the main control unit further edits an image file.

9. The image recording/reproducing apparatus of claim 1, wherein the main control unit further partially deletes a moving picture.

10. The image recording/reproducing apparatus of claim 1, wherein the main control unit further enables a user to recognize a folder in which a presently displayed file is located by providing a play list menu.

11. The image recording/reproducing apparatus of claim 1, wherein the main control unit further displays a 'Play List' of an image file recorded in a recording medium on a screen, and selects the file using the displayed 'Play List'.

12. The image recording/reproducing apparatus of claim 1, wherein the main control unit further displays a plurality of diverse still picture files while a music file is reproduced to provide the music replay and the plurality of diverse still picture files at the same time.

13. The image recording/reproducing apparatus of claim 12, wherein the plurality of diverse still picture files are provided as a slide show.

14. The image recording/reproducing apparatus of claim 1, wherein the main control unit further automatically reproduces a plurality of files when a recording medium containing the files is inserted, independent of the kinds of files.

15. The image recording/reproducing apparatus of claim 1, wherein the main control unit further displays additional information on a music CD on a screen when reproducing the music CD to allow a user to acquire the information on the music CD and select a desired song.

16. The image recording/reproducing apparatus of claim 1, wherein the main control unit further skips and copies a plurality of files having a same file name when a plurality of files recorded in an optical recording medium are copied into a mass storage magnetic recording medium.

17. The image recording/reproducing apparatus of claim 1, wherein the main control unit further compresses and stores audio data having a CD-DA standard.

18. The image recording/reproducing apparatus of claim 1, wherein the main control unit further adaptively adjusts a size of a still picture based on a size of a predetermined display area and displays the still picture in the predetermined display area.

19. The image recording/reproducing apparatus of claim 18, wherein said displayed still picture is provided having at least one of an aspect ratio and a display size suitable to the display area.

20. The image recording/reproducing apparatus of claim 1, wherein the main control unit further provides a menu for enabling a user to easily select and manipulate functions supported by the image recording/reproducing apparatus.

21. The image recording/reproducing apparatus of claim 1, wherein the main control unit further reproduces a recorded program from a beginning, while also continuously recording an externally-received program during a time-delay viewing function.

22. The image recording/reproducing apparatus of claim 21, wherein the time-delay viewing function comprises a process operation such that an externally-received program is both recorded and reproduced at the same time.

23. The image recording/reproducing apparatus of claim 1, wherein the main control unit further automatically picks up a title name of a DVD program and records the picked-up title onto a user data area when copying the DVD program onto a HDD.

24. The image recording/reproducing apparatus of claim 1, wherein the main control unit further stores a plurality of files in an appropriate place of a divided HDD with pointers according to at least one attribute of the respective files, and discriminatingly displays at least one of a size of the files as stored and a remaining capacity of a memory area.

25. The image recording/reproducing apparatus of claim 1, wherein the main control unit further comprises:
   a flash memory for storing relevant link information, storing icon data in a HDD, and providing at least one animation effect where icons are moved by using the icon data stored in the HDD.

26. The image recording/reproducing apparatus of claim 1, wherein the main control unit further selects files of certain folders for display in a file list and selects files of other folders and different types of recording medium for additional display in the file list.

27. The image recording/reproducing apparatus of claim 1, wherein the main control unit further performs a process to decode a plurality of still image files which are recorded in a folder in which a plurality of sound files of a sound file list are also recorded.

28. The image recording/reproducing apparatus of claim 1, wherein when the instruction icon of the display menu is selected during the reproducing of the sound files stored in the memory, the plurality of still image files recorded in the same folder in the recording medium are decoded and stored in the memory while the decoder of the image and sound files is idle.

29. A control method for an image recording/reproducing apparatus which records and reproduces a plurality of still image files and sound files with respect to a recording medium and provides a display apparatus with the files, the control method comprising the steps of:
   applying a reproducing command to the recording medium with respect to the sound files;
   displaying a screen of play list indicating a list of sound files, and decoding and storing the sound files;
   displaying a display menu comprising at least one instruction icon to both set a reproduction mode and command a reproduction of an alternating display, in a first predetermined area of the screen of play list;
   selecting the instruction icon of the display menu such that the plurality of still image files recorded in the recording apparatus are alternately displayed while the stored sound files are reproduced as commanded by the selection of the instruction icon;
   decoding and storing the still image files recorded in the same folder as the sound files in the recording apparatus while a decoder of the image and sound files is idle while the stored sound files are reproduced; and
   alternately displaying the still image files on a second predetermined area of the screen of play list indicating sound files while the sound files are reproduced as commanded by the selection of the instruction icon.

30. The control method of claim 29, further comprising the step of:
   displaying a screen of period setting menu for setting a display period of the plurality of still image files when the instruction icon of the display menu of the screen of play list is selected; and
   displaying the plurality of still image files on the second predetermined area according to the set period.

31. A control method for an image recording and reproducing apparatus as claimed in claim 29, further comprising:
   displaying a screen of period setting menu when another instruction icon of the display menu of the screen of play list is selected, wherein the screen of period setting menu is provided for setting a display period of the plurality of still image files.

32. A control method for an image recording and reproducing apparatus as claimed in claim 29, further comprising:
   displaying the plurality of still image files on the second predetermined area according to the set period.

33. A control method for an image recording and reproducing apparatus as claimed in claim 29, further comprising:
   performing a random access capable of displaying or reproducing a file selected by a user from among a plurality of image files recorded in a recording medium by quickly reading the selected file.

34. A control method for an image recording and reproducing apparatus as claimed in claim 29, further comprising:
   correcting a name of an image file recorded in a recording medium to allow a user to easily search for a desired file.

35. A control method for an image recording and reproducing apparatus as claimed in claim 29, further comprising:
   reproducing and displaying a plurality of moving picture files recorded in a recording medium on a file list menu as moving pictures to allow a user to easily search for the image file recorded in the recording medium.

36. A control method for an image recording and reproducing apparatus as claimed in claim 29, further comprising:
   displaying a list of image files recorded in a recording medium along with a plurality of icons according to a kind of image file to illustrate the kind of image file.

37. A control method for an image recording and reproducing apparatus as claimed in claim 29, further comprising:
   continuously reproducing a plurality of image files recorded in a recording medium in an order of storage in the recording medium.

38. A control method for an image recording and reproducing apparatus as claimed in claim 29, further comprising editing an image file.

39. A control method for an image recording and reproducing apparatus as claimed in claim 29, further comprising partially deleting a moving picture.

40. A control method for an image recording and reproducing apparatus as claimed in claim 29, further comprising:
   enabling a user to recognize a folder in which a presently displayed file is located by providing a play list menu.

41. A control method for an image recording and reproducing apparatus as claimed in claim 29, further comprising:
   displaying a 'Play List' of an image file recorded in a recording medium on a screen and selecting the file using the displayed 'Play List'.

42. A control method for an image recording and reproducing apparatus as claimed in claim 29, further comprising:
   displaying a plurality of diverse still picture files while a music file is reproduced to provide the music replay and the plurality of diverse still picture files at the same time.

43. A control method for an image recording and reproducing apparatus as claimed in claim 42, further comprising providing the plurality of diverse still picture files as a slide show.

44. A control method for an image recording and reproducing apparatus as claimed in claim 29, further comprising:
automatically reproducing a plurality of files when a recording medium containing the files is inserted, independent of the kinds of files.

45. A control method for an image recording and reproducing apparatus as claimed in claim 29, further comprising:
displaying additional information on a music CD on a screen when reproducing the music CD to allow a user to acquire the information on the music CD and select a desired song.

46. A control method for an image recording and reproducing apparatus as claimed in claim 29, further comprising:
skipping and copying a plurality of files having a same file name when a plurality of files recorded in an optical recording medium are copied into a mass storage magnetic recording medium.

47. A control method for an image recording and reproducing apparatus as claimed in claim 29, further comprising compressing and storing audio data having a CD-DA standard.

48. A control method for an image recording and reproducing apparatus as claimed in claim 29, further comprising:
adaptively adjusting a size of a still picture based on a size of a predetermined display area; and
displaying the still picture in the predetermined display area.

49. A control method for an image recording and reproducing apparatus as claimed in claim 48, wherein said displayed still picture is provided having at least one of an aspect ratio and a display size suitable to the display area.

50. A control method for an image recording and reproducing apparatus as claimed in claim 29, further comprising:
providing a menu for enabling a user to easily select and manipulate functions supported by the image recording/reproducing apparatus.

51. A control method for an image recording and reproducing apparatus as claimed in claim 29, further comprising:
reproducing a recorded program from a beginning, while also continuously recording an externally-received program during a time-delay viewing function.

52. A control method for an image recording and reproducing apparatus as claimed in claim 51, wherein the time-delay viewing function comprises a process operation such that an externally-received program is both recorded and reproduced at the same time.

53. A control method for an image recording and reproducing apparatus as claimed in claim 29, further comprising:
automatically picking up a title name of a DVD program; and
recording the picked-up title onto a user data area when copying the DVD program onto a HDD.

54. A control method for an image recording and reproducing apparatus as claimed in claim 29, further comprising:
storing a plurality of files in an appropriate place of a divided HDD with pointers according to at least one attribute of the respective files; and
discriminatingly displaying at least one of a size of the files as stored and a remaining capacity of a memory area.

55. A control method for an image recording and reproducing apparatus as claimed in claim 29, further comprising:
storing relevant link information in a flash memory;
storing icon data in a HDD; and
providing at least one animation effect where icons are moved by using the icon data stored in the HDD.

56. A control method for an image recording and reproducing apparatus as claimed in claim 29, further comprising:
selecting files of certain folders for display in a file list; and
selecting files of other folders and different types of recording medium for additional display in the file list.

57. A control method for an image recording and reproducing apparatus as claimed in claim 29, further comprising:
performing a process to decode a plurality of still image files which are recorded in a folder in which a plurality of sound files of a sound file list are also recorded when the display menu is selected.

\* \* \* \* \*